(12) United States Patent
Jung et al.

(10) Patent No.: US 10,157,407 B2
(45) Date of Patent: Dec. 18, 2018

(54) FINANCIER-FACILITATED GUARANTY PROVISIONING

(71) Applicant: Elwha LLC, a limited liability corporation of the State of Delaware, Bellevue, WA (US)

(72) Inventors: Edward K. Y. Jung, Bellevue, WA (US); Richard T. Lord, Gig Harbor, WA (US); Robert W. Lord, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 831 days.

(21) Appl. No.: 14/167,637

(22) Filed: Jan. 29, 2014

(65) Prior Publication Data

US 2015/0120501 A1  Apr. 30, 2015

Related U.S. Application Data

(63) Continuation-in-part of application No. 14/154,699, filed on Jan. 14, 2014, which is a continuation-in-part of application No. 14/145,811, filed on Dec. 31, 2013, now Pat. No. 9,818,105, which is a continuation-in-part of application No. 14/098,232, filed on Dec. 5, 2013, which is a continuation-in-part of application No. 14/095,489, filed on Dec. 3, 2013, which is a continuation-in-part of application No.
(Continued)

(51) Int. Cl.
*G06Q 30/00* (2012.01)
*G06Q 30/06* (2012.01)
*H04L 29/06* (2006.01)

(52) U.S. Cl.
CPC ......... *G06Q 30/0613* (2013.01); *H04L 63/10* (2013.01)

(58) Field of Classification Search
CPC ............... G06Q 30/0613; G06Q 40/02; G06Q 30/0609; G06Q 30/0637; H04L 63/10
USPC .......................... 705/39, 26.41, 26.35, 26.82
See application file for complete search history.

(56) References Cited

U.S. PATENT DOCUMENTS 6,226,619 B1   5/2001  Halperin et al.
6,405,177 B1 * 6/2002  DiMattina .............. G06Q 30/06
                                                        705/26.41
(Continued)

FOREIGN PATENT DOCUMENTS

JP      2004-341597     12/2004
KR      2012/0010869    2/2012
WO      WO 2013/124290  8/2013

OTHER PUBLICATIONS

"Models and issues in data stream systems" published in ACM PODS Jun. 3-6, 2002 Madison, Wisconsin, USA, authors: Brian Babcock, Shivnath Babu, Mayur Datar, Rajeev Motwani, Jennifer Widom from Department of Computer Science, Stanford University, Stanford, CA 94305 , extracted from Internet on Apr. 4, 2018.*
(Continued)

*Primary Examiner* — Yogesh C Garg

(57) ABSTRACT

Disclosed herein are example embodiments for financier-facilitated guaranty provisioning. For certain example embodiments, at least one device, such as a server device of a financier: (i) may discover at least one authorization request corresponding to at least one product transaction; or (ii) may provide at least one proffered guaranty transaction to at least one guarantor. However, claimed subject matter is not limited to any particular described embodiments, implementations, examples, or so forth.

43 Claims, 38 Drawing Sheets

Related U.S. Application Data

14/074,490, filed on Nov. 7, 2013, which is a continuation-in-part of application No. 14/066,580, filed on Oct. 29, 2013, now Pat. No. 9,934,498.

(56) References Cited

U.S. PATENT DOCUMENTS

| | | |
|---|---|---|
| 7,415,435 B1 | 8/2008 | Weiss et al. |
| 7,698,227 B1 | 4/2010 | Hamilton |
| 7,725,331 B2 * | 5/2010 | Schurenberg ......... G06Q 10/10 705/2 |
| 7,725,375 B2 | 5/2010 | Shepherd |
| 7,747,535 B2 | 6/2010 | Mikan et al. |
| 7,801,808 B1 * | 9/2010 | Mattison ............... G06Q 10/10 705/26.8 |
| 7,917,437 B1 | 3/2011 | Glasberg |
| 8,166,068 B2 | 4/2012 | Stevens |
| 8,290,513 B2 | 10/2012 | Forstall et al. |
| 8,374,917 B1 | 2/2013 | Trandal et al. |
| 8,428,964 B2 | 4/2013 | Picken |
| 8,473,382 B2 | 6/2013 | Jung et al. |
| 8,504,470 B1 | 8/2013 | Chirehdast |
| 8,554,670 B1 | 10/2013 | Blank et al. |
| 8,660,943 B1 | 2/2014 | Chirehdast |
| 8,706,648 B2 | 4/2014 | Bhola et al. |
| 9,119,027 B2 | 8/2015 | Sharon et al. |
| 9,167,304 B2 | 10/2015 | McDevitt |
| 9,300,676 B2 | 3/2016 | Madhu et al. |
| 9,406,067 B1 | 8/2016 | Robinson et al. |
| 2001/0049636 A1 | 12/2001 | Hudda et al. |
| 2002/0010638 A1 | 1/2002 | Fischer |
| 2002/0040344 A1 | 4/2002 | Preiser et al. |
| 2002/0048369 A1 | 4/2002 | Ginter et al. |
| 2002/0178112 A1 | 11/2002 | Goeller et al. |
| 2003/0023541 A1 | 1/2003 | Black et al. |
| 2003/0036993 A1 * | 2/2003 | Parthasarathy ........ G06Q 40/00 705/38 |
| 2003/0065805 A1 | 4/2003 | Barnes, Jr. |
| 2003/0183689 A1 * | 10/2003 | Swift ..................... G06Q 20/02 235/380 |
| 2003/0187796 A1 | 10/2003 | Swift et al. |
| 2003/0191719 A1 | 10/2003 | Ginter et al. |
| 2004/0024692 A1 | 2/2004 | Turbeville et al. |
| 2004/0064351 A1 | 4/2004 | Mikurak |
| 2004/0073519 A1 | 4/2004 | Fast |
| 2004/0210527 A1 | 10/2004 | Woda et al. |
| 2004/0215560 A1 | 10/2004 | Amalraj et al. |
| 2005/0049979 A1 | 3/2005 | Collins et al. |
| 2005/0149438 A1 | 7/2005 | Williams |
| 2005/0192884 A1 | 9/2005 | Raines |
| 2005/0246252 A1 | 11/2005 | Wallace et al. |
| 2005/0279827 A1 | 12/2005 | Mascavage et al. |
| 2007/0033113 A1 | 2/2007 | Trew |
| 2007/0067373 A1 | 3/2007 | Higgins et al. |
| 2007/0087756 A1 | 4/2007 | Hoffberg |
| 2007/0162308 A1 | 7/2007 | Peters |
| 2007/0174164 A1 | 7/2007 | Biffle et al. |
| 2007/0174208 A1 | 7/2007 | Black et al. |
| 2007/0192144 A1 | 8/2007 | Hauer et al. |
| 2007/0192198 A1 | 8/2007 | Schwarz |
| 2007/0220575 A1 | 9/2007 | Cooper et al. |
| 2007/0266421 A1 | 11/2007 | Vaidya et al. |
| 2008/0052224 A1 * | 2/2008 | Parker ................... G06Q 40/02 705/38 |
| 2008/0052235 A1 | 2/2008 | Mascavage et al. |
| 2008/0071664 A1 | 3/2008 | Silverman et al. |
| 2008/0109296 A1 | 5/2008 | Leach et al. |
| 2008/0133391 A1 | 6/2008 | Kurian et al. |
| 2008/0133402 A1 | 6/2008 | Kurian et al. |
| 2008/0154625 A1 | 6/2008 | Serbanescu |
| 2008/0162346 A1 | 7/2008 | Aaron et al. |
| 2008/0208681 A1 | 8/2008 | Hammad et al. |
| 2008/0215481 A1 | 9/2008 | Schnall |
| 2008/0221947 A1 | 9/2008 | Megdal et al. |
| 2008/0222038 A1 | 9/2008 | Eden et al. |
| 2008/0262956 A1 * | 10/2008 | De La Motte ......... G06Q 40/04 705/37 |
| 2008/0281726 A1 | 11/2008 | Gupta |
| 2008/0288299 A1 | 11/2008 | Schultz |
| 2009/0012898 A1 | 1/2009 | Sharma et al. |
| 2009/0030832 A1 | 1/2009 | Chien |
| 2009/0117883 A1 | 5/2009 | Coffing et al. |
| 2009/0228307 A1 | 9/2009 | Sorbe |
| 2009/0271287 A1 | 10/2009 | Halpern |
| 2009/0271342 A1 | 10/2009 | Eder |
| 2009/0289106 A1 | 11/2009 | Bishop et al. |
| 2009/0307778 A1 | 12/2009 | Mardikar |
| 2010/0005021 A1 * | 1/2010 | Ezekiel ................. G06Q 40/04 705/37 |
| 2010/0042534 A1 * | 2/2010 | Moran ................... G06Q 40/00 705/38 |
| 2010/0228651 A1 * | 9/2010 | Becerra ................. G06Q 30/04 705/34 |
| 2010/0250424 A1 | 9/2010 | Torres |
| 2010/0276484 A1 | 11/2010 | Banerjee et al. |
| 2010/0287103 A1 | 11/2010 | Mason |
| 2010/0289659 A1 | 11/2010 | Verbil |
| 2010/0323715 A1 | 12/2010 | Winters |
| 2011/0035318 A1 | 2/2011 | Hargrove et al. |
| 2011/0040691 A1 | 2/2011 | Martinez et al. |
| 2011/0072497 A1 | 3/2011 | Vishik et al. |
| 2011/0112957 A1 | 5/2011 | Ingram et al. |
| 2011/0162038 A1 | 6/2011 | Chunilal |
| 2011/0191150 A1 | 8/2011 | Blackhurst et al. |
| 2011/0191160 A1 | 8/2011 | Blackhurst et al. |
| 2011/0191162 A1 * | 8/2011 | Blackhurst ......... G06Q 30/0239 705/14.39 |
| 2011/0208822 A1 | 8/2011 | Rathod |
| 2011/0246306 A1 | 10/2011 | Blackhurst et al. |
| 2011/0251922 A1 | 10/2011 | Cavagnaro |
| 2011/0258118 A1 | 10/2011 | Ciurea |
| 2011/0276396 A1 | 11/2011 | Rathod |
| 2011/0320341 A1 | 12/2011 | Kremen |
| 2011/0320342 A1 | 12/2011 | Kremen |
| 2012/0011056 A1 | 1/2012 | Ward et al. |
| 2012/0022944 A1 | 1/2012 | Volpi |
| 2012/0029990 A1 | 2/2012 | Fisher |
| 2012/0030109 A1 | 2/2012 | Dooley Maley et al. |
| 2012/0030110 A1 | 2/2012 | Prakash et al. |
| 2012/0066128 A1 | 3/2012 | Mumm et al. |
| 2012/0072311 A1 | 3/2012 | Khan |
| 2012/0078727 A1 | 3/2012 | Lee |
| 2012/0084131 A1 | 4/2012 | Bergel et al. |
| 2012/0084349 A1 | 4/2012 | Lee et al. |
| 2012/0157062 A1 | 6/2012 | Kim et al. |
| 2012/0159647 A1 | 6/2012 | Sanin et al. |
| 2012/0166261 A1 | 6/2012 | Velusamy et al. |
| 2012/0188996 A1 | 7/2012 | Roka |
| 2012/0191594 A1 | 7/2012 | Welch et al. |
| 2012/0197793 A1 | 8/2012 | Grigg et al. |
| 2012/0215681 A1 | 8/2012 | Jenkins et al. |
| 2012/0215717 A1 | 8/2012 | Arnott et al. |
| 2012/0221357 A1 | 8/2012 | Krause et al. |
| 2012/0233009 A1 | 9/2012 | Fougner et al. |
| 2012/0239479 A1 | 9/2012 | Amara et al. |
| 2012/0245963 A1 | 9/2012 | Peak et al. |
| 2012/0245971 A1 | 9/2012 | Reichman et al. |
| 2012/0253913 A1 | 10/2012 | Richard |
| 2012/0259776 A1 | 10/2012 | Bajaj et al. |
| 2012/0270560 A1 | 10/2012 | Moshir et al. |
| 2012/0271692 A1 | 10/2012 | Huang et al. |
| 2012/0271946 A1 | 10/2012 | Choti et al. |
| 2012/0290329 A1 | 11/2012 | Ross |
| 2012/0290389 A1 | 11/2012 | Greenough et al. |
| 2012/0295580 A1 | 11/2012 | Corner |
| 2012/0302256 A1 | 11/2012 | Pai et al. |
| 2012/0303425 A1 | 11/2012 | Katzin et al. |
| 2012/0310836 A1 | 12/2012 | Eden et al. |
| 2013/0006844 A1 | 1/2013 | Kremen |
| 2013/0006845 A1 | 1/2013 | Kremen |
| 2013/0031162 A1 | 1/2013 | Willis et al. |
| 2013/0036001 A1 | 2/2013 | Wegner et al. |
| 2013/0046561 A1 | 2/2013 | Sorbe |
| 2013/0046692 A1 | 2/2013 | Grigg et al. |

(56) References Cited

U.S. PATENT DOCUMENTS

| | | |
|---|---|---|
| 2013/0054447 A1 | 2/2013 | Ross et al. |
| 2013/0073366 A1 | 3/2013 | Heath |
| 2013/0073387 A1 | 3/2013 | Heath |
| 2013/0085877 A1 | 4/2013 | Ruhrig |
| 2013/0091058 A1 | 4/2013 | Huster |
| 2013/0103577 A1 | 4/2013 | Lawson et al. |
| 2013/0110597 A1 | 5/2013 | Blair et al. |
| 2013/0110598 A1 | 5/2013 | Blair et al. |
| 2013/0117832 A1 | 5/2013 | Gandhi et al. |
| 2013/0144785 A1 | 6/2013 | Karpenko et al. |
| 2013/0151415 A1 | 6/2013 | Ruckart |
| 2013/0185189 A1 | 7/2013 | Stewart |
| 2013/0185206 A1 | 7/2013 | Leggett et al. |
| 2013/0191247 A1 | 7/2013 | Huang et al. |
| 2013/0212004 A1 | 8/2013 | Itwaru |
| 2013/0218753 A1 | 8/2013 | Oikonomidis |
| 2013/0226687 A1 | 8/2013 | Perry et al. |
| 2013/0226798 A1 | 8/2013 | Orttung et al. |
| 2013/0239185 A1 | 9/2013 | Orttung et al. |
| 2013/0239217 A1 | 9/2013 | Kindler et al. |
| 2013/0282546 A1 | 10/2013 | Kadiwar |
| 2013/0282565 A1 | 10/2013 | Barta et al. |
| 2013/0297493 A1 | 11/2013 | Linden et al. |
| 2013/0317966 A1 | 11/2013 | Bass et al. |
| 2014/0040086 A1 | 2/2014 | Abbatiello et al. |
| 2014/0058938 A1 | 2/2014 | McClung, III |
| 2014/0067650 A1 | 3/2014 | Gardiner et al. |
| 2014/0067656 A1 | 3/2014 | Cohen Ganor et al. |
| 2014/0067675 A1 | 3/2014 | Leyva et al. |
| 2014/0081729 A1 | 3/2014 | Ocher |
| 2014/0081750 A1 | 3/2014 | Hosp |
| 2014/0108140 A1 | 4/2014 | Crawford |
| 2014/0122225 A1 | 5/2014 | Vashtimal et al. |
| 2014/0164058 A1 | 6/2014 | Hammock et al. |
| 2014/0172679 A1 | 6/2014 | Shimko |
| 2014/0201100 A1 | 7/2014 | Rellas et al. |
| 2014/0214819 A1 | 7/2014 | Aitchison |
| 2014/0229376 A1 | 8/2014 | Kaminsky et al. |
| 2014/0258110 A1 | 9/2014 | Davis et al. |
| 2014/0273822 A1* | 9/2014 | Gutierrez ............ H04W 76/10 455/41.1 |
| 2014/0274122 A1 | 9/2014 | Tseng et al. |
| 2014/0279543 A1 | 9/2014 | Ruhrig |
| 2015/0019427 A1 | 1/2015 | Murphy et al. |
| 2015/0120530 A1 | 4/2015 | Jung et al. |
| 2015/0278773 A1 | 10/2015 | Rolf et al. |
| 2017/0109749 A1 | 4/2017 | Rosano |
| 2017/0178143 A1 | 6/2017 | Ovick et al. |
| 2017/0193441 A1 | 7/2017 | Fordyce, III et al. |
| 2017/0286953 A1 | 10/2017 | Hammad et al. |
| 2017/0323354 A1 | 11/2017 | Martell |

OTHER PUBLICATIONS

Fodor's Travel Forums; "Do you notify your credit card company when you travel?"; bearing a date of Sep. 22-24,2006; created on Oct. 26, 2016; 5 pages; located at: http://www.fodors.com/community/profile/sweetsailing.

Google; "Google Wallet training video"; bearing a date of Sep. 21, 2011; created on Oct. 26, 2016; 4 pages; located at: https://www.youtube.com/watch?v=hLbmy4XQsMo.

PCT International Search Report; International App. No. PCT/US2014/062648; dated Jan. 27, 2015; pp. 1-4.

PCT International Search Report; International App. No. PCT/US2014/062639; dated Feb. 5, 2015; pp. 1-4.

Extended European Search Report; European App. No. EP 14 85 9208; dated Mar. 17, 2017 (received by our Agent on Mar. 24, 2017) pp. 1-7.

Murphy, Kate; "Web Photos That Reveal Secrets, Like Where You Live"; The New York Times; Aug. 11, 2010; pp. 1-5; located at: http://www.nytimes.com/2010/08/12/technology/personaltech/12basics.html.

Schiffner, Bill; "Could you fall victim to crime simply by geotagging location info to your photos?"; Digital Trends; Jul. 22, 2013; pp. 1-6; located at: https://www.digitaltrends.com/photography/could-you-fall-victim-to-crime-simply-by-geotagging-location-info-to-your-photos/.

Babcock et al.; "Models and Issues in Data Stream Systems"; ACM PODS Jun. 3-6, 2002 Madison, Wisconsin, USA; pp. 1-16.

* cited by examiner

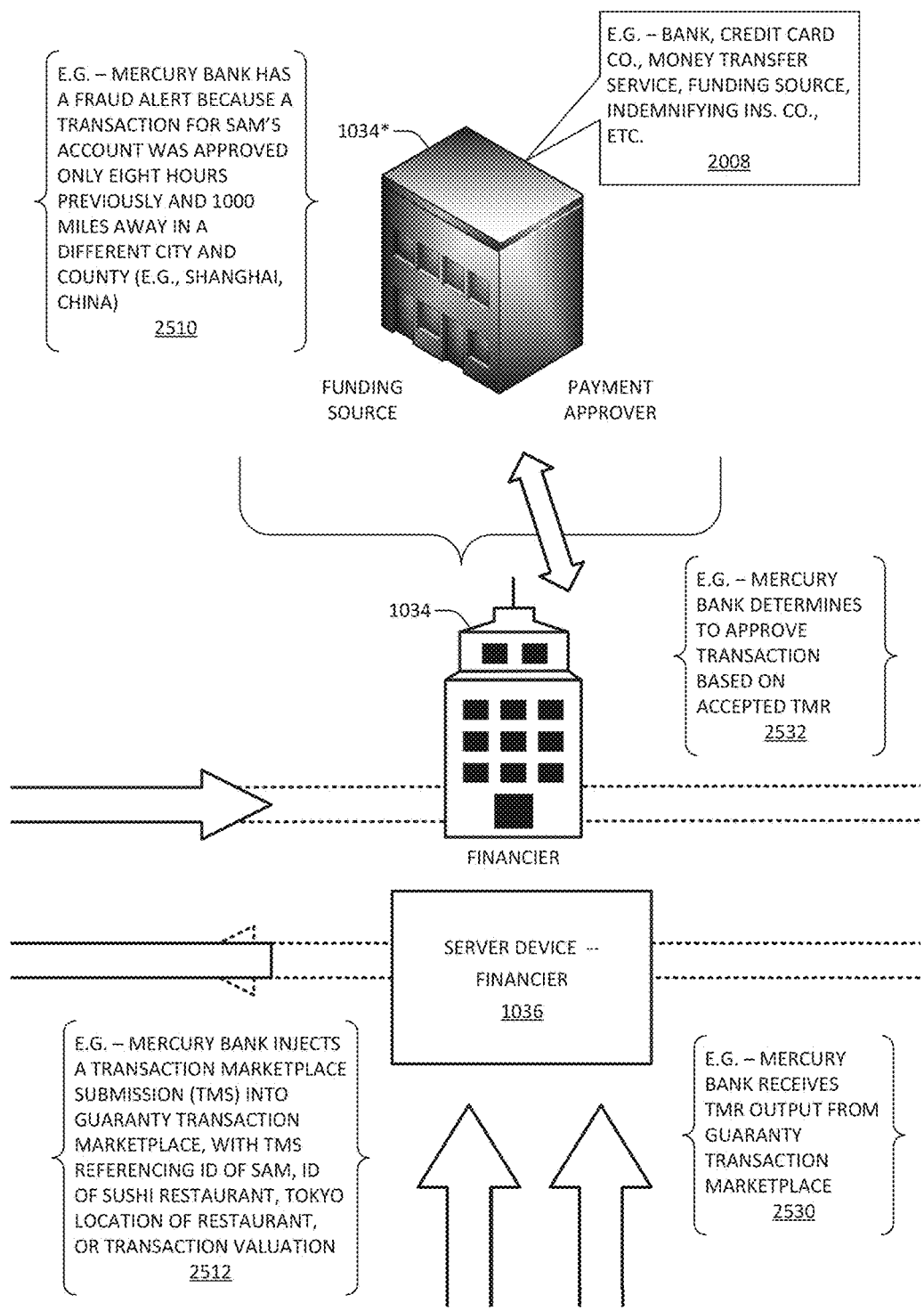

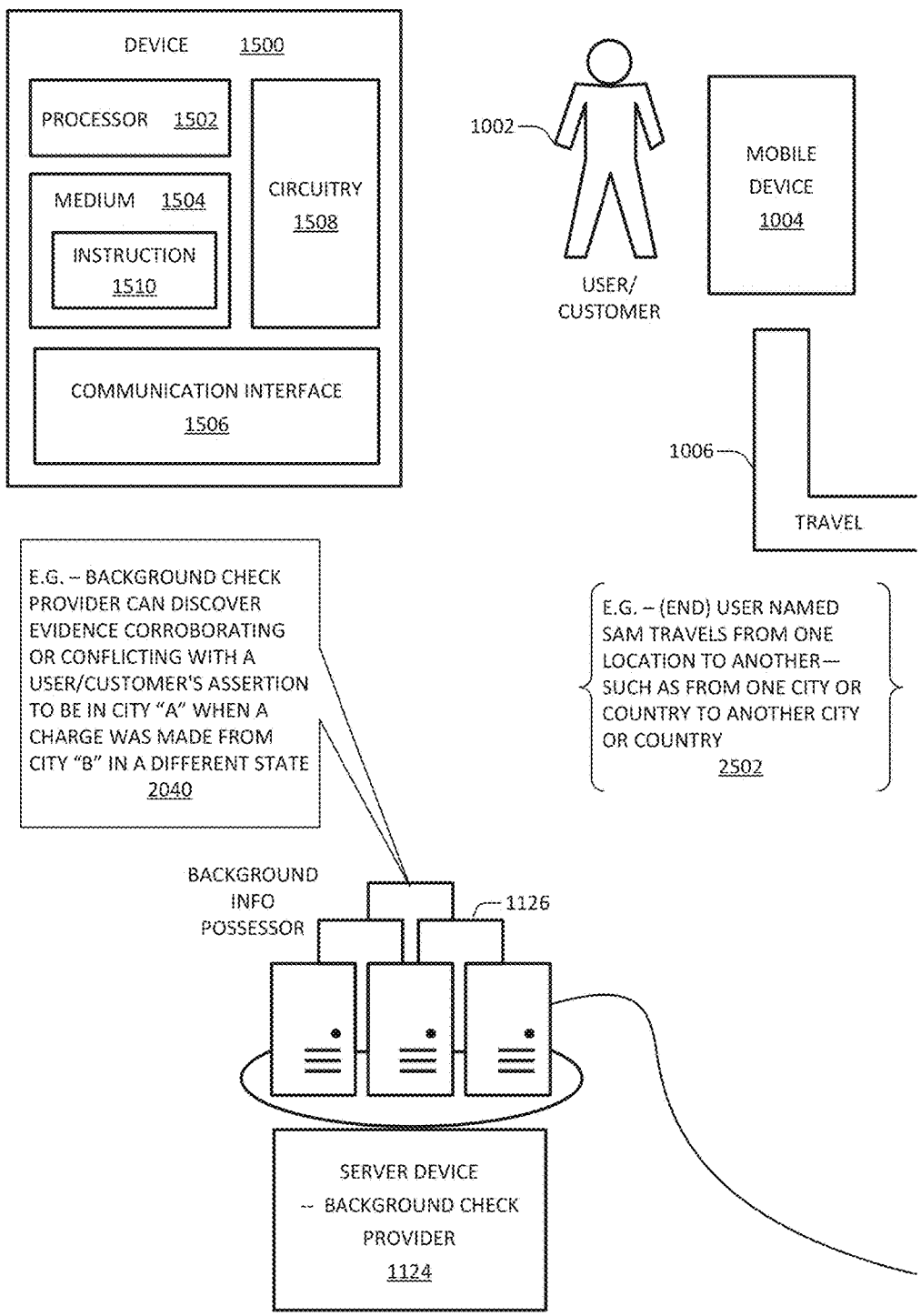

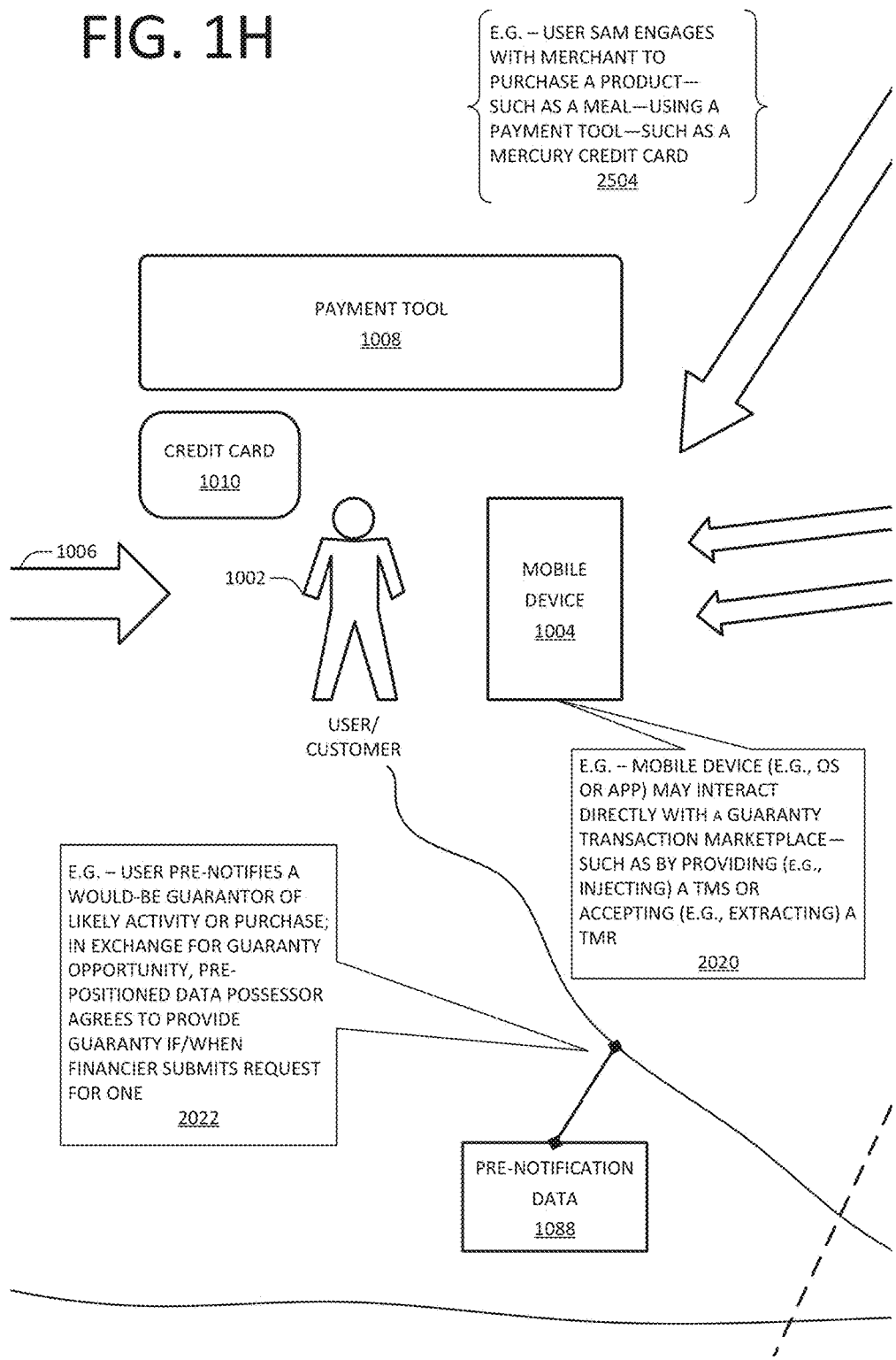

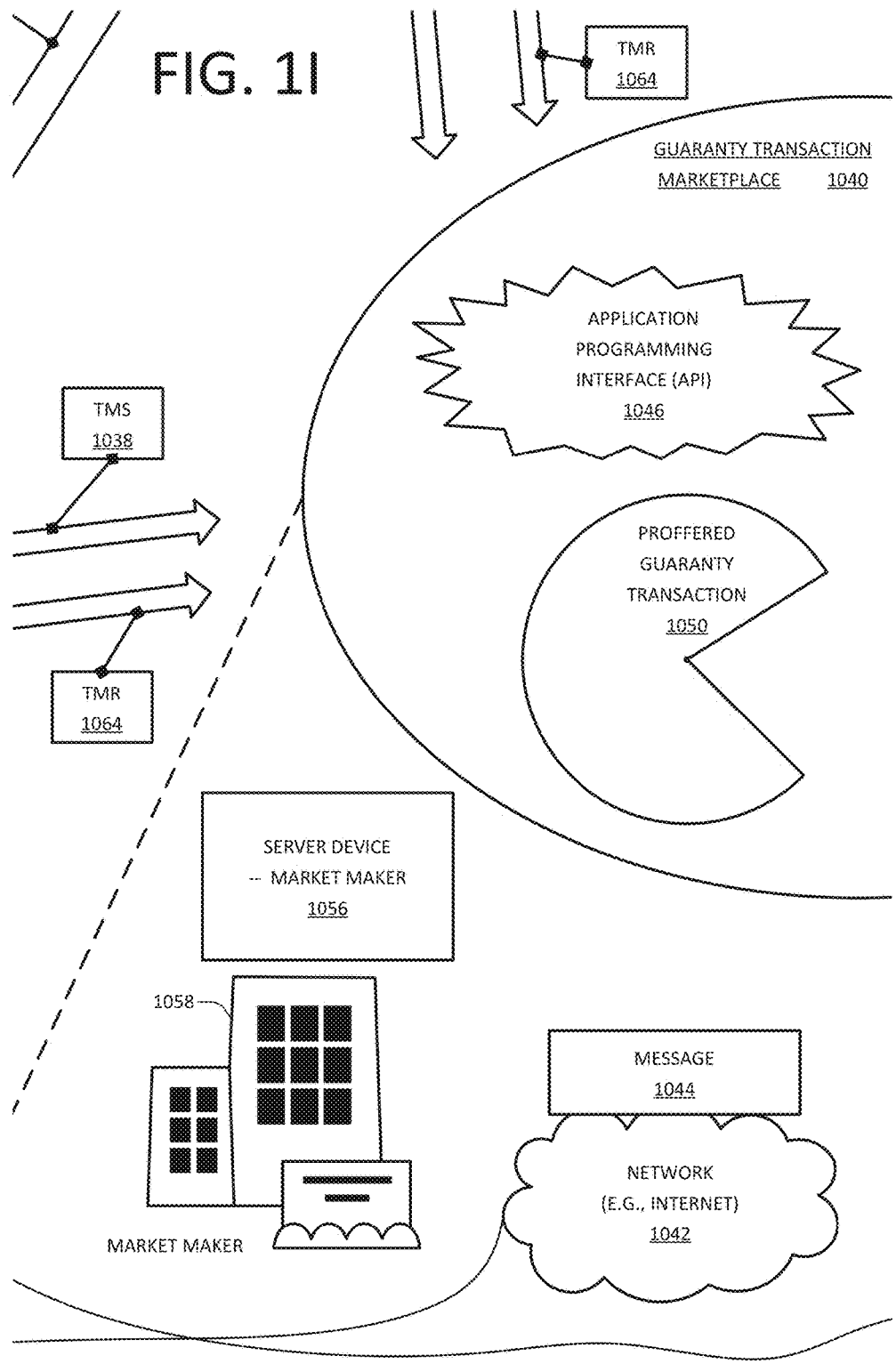

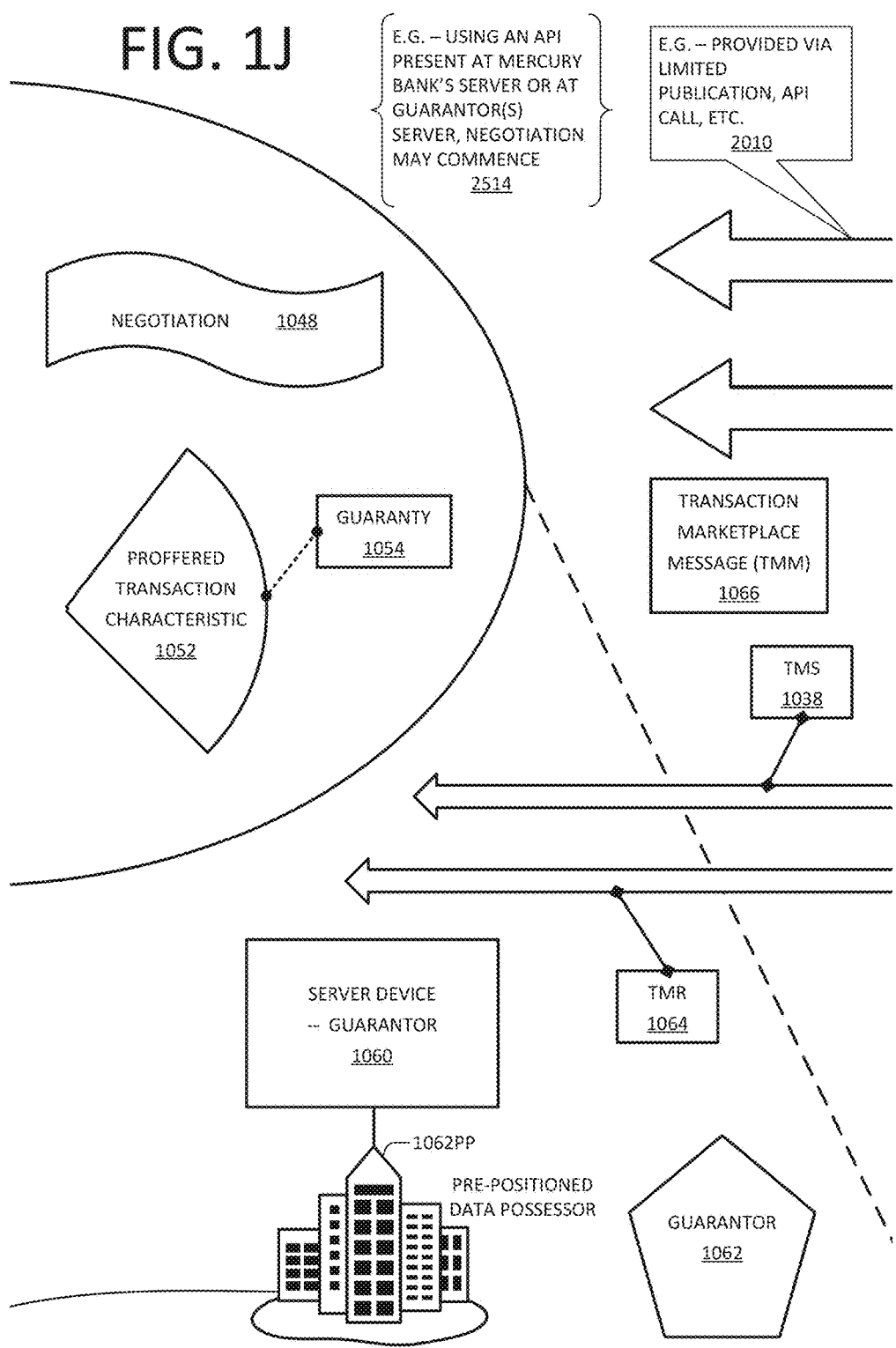

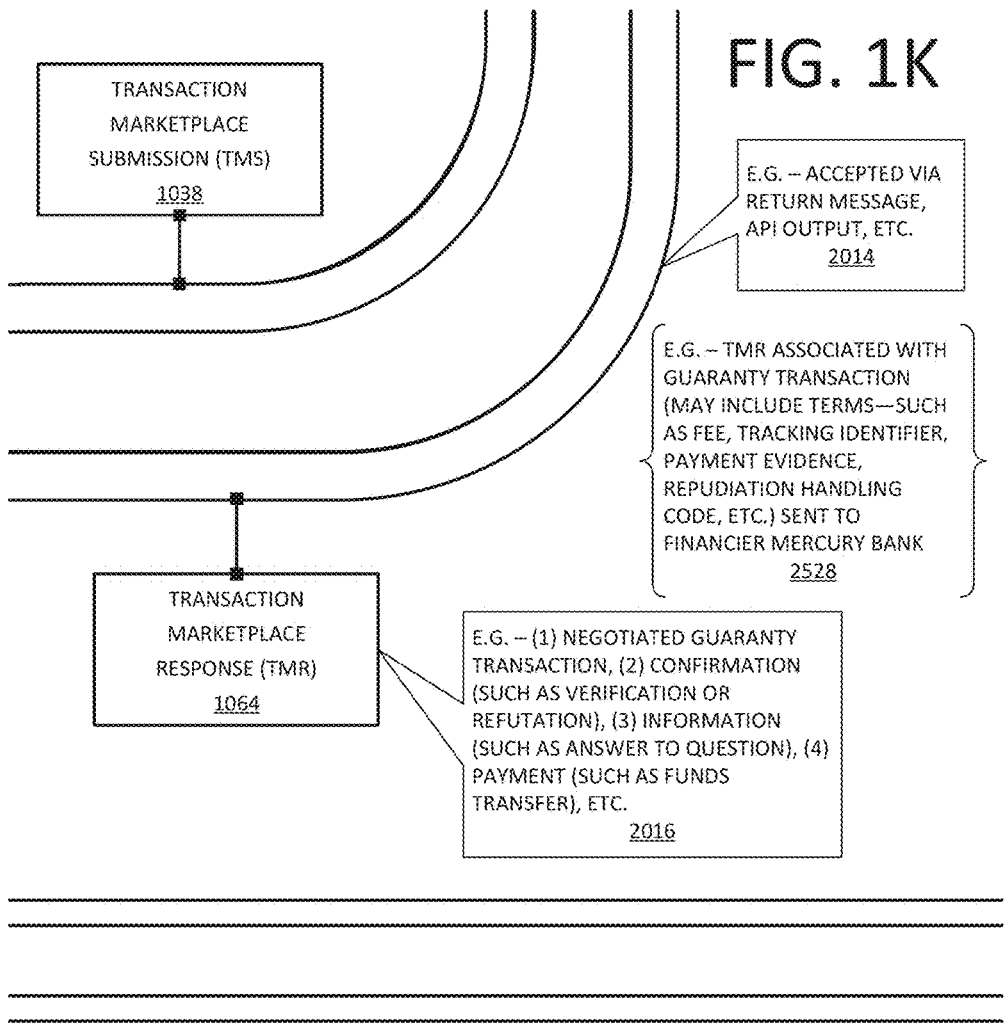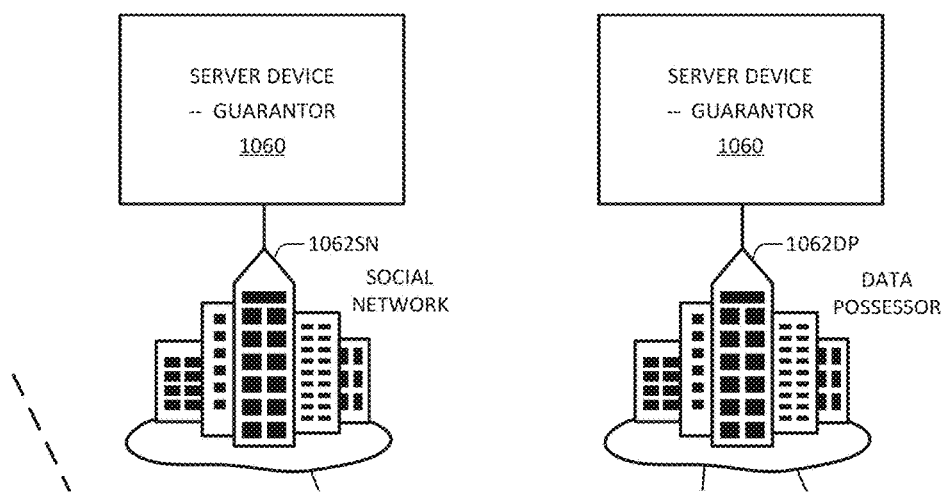

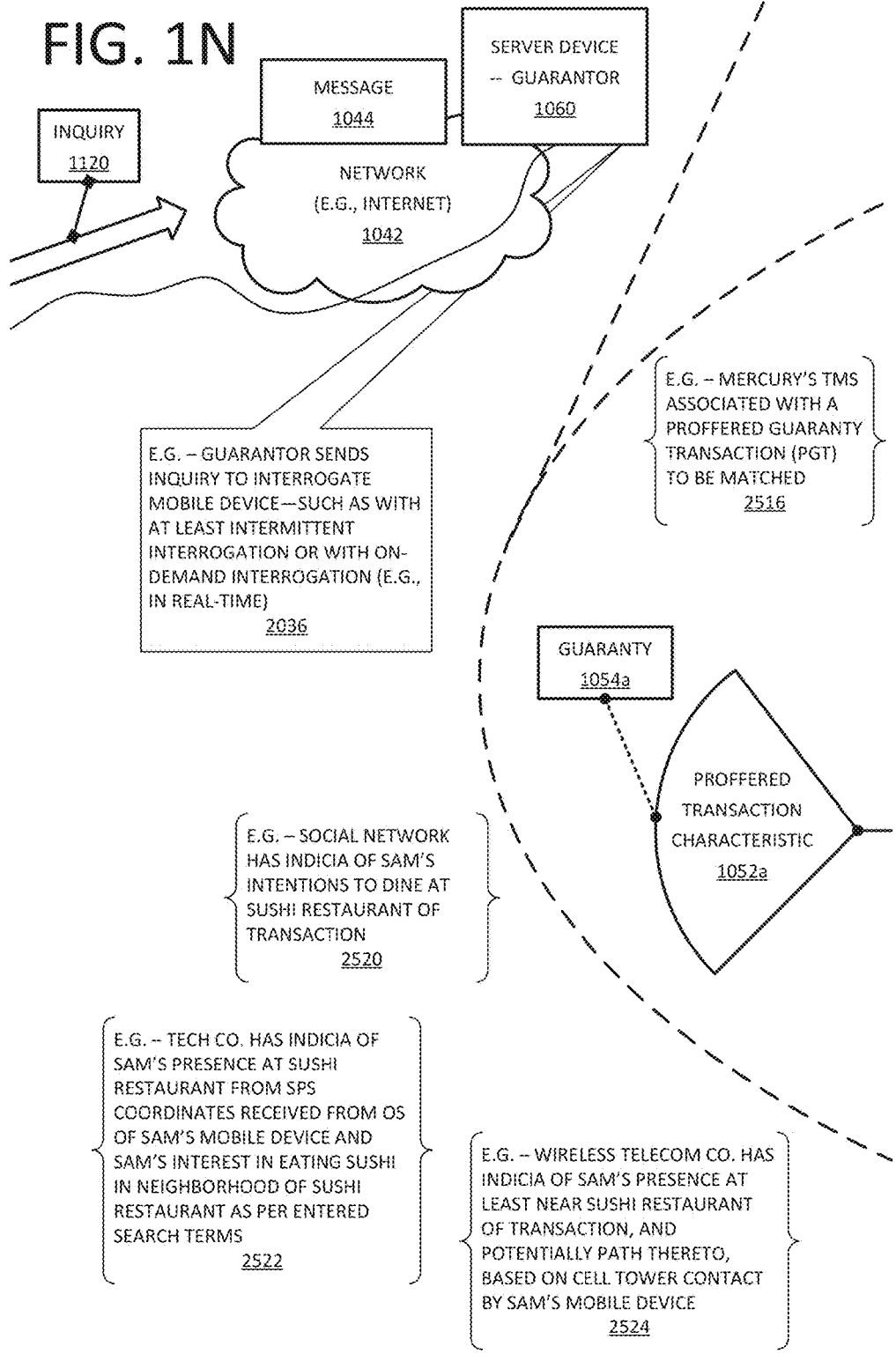

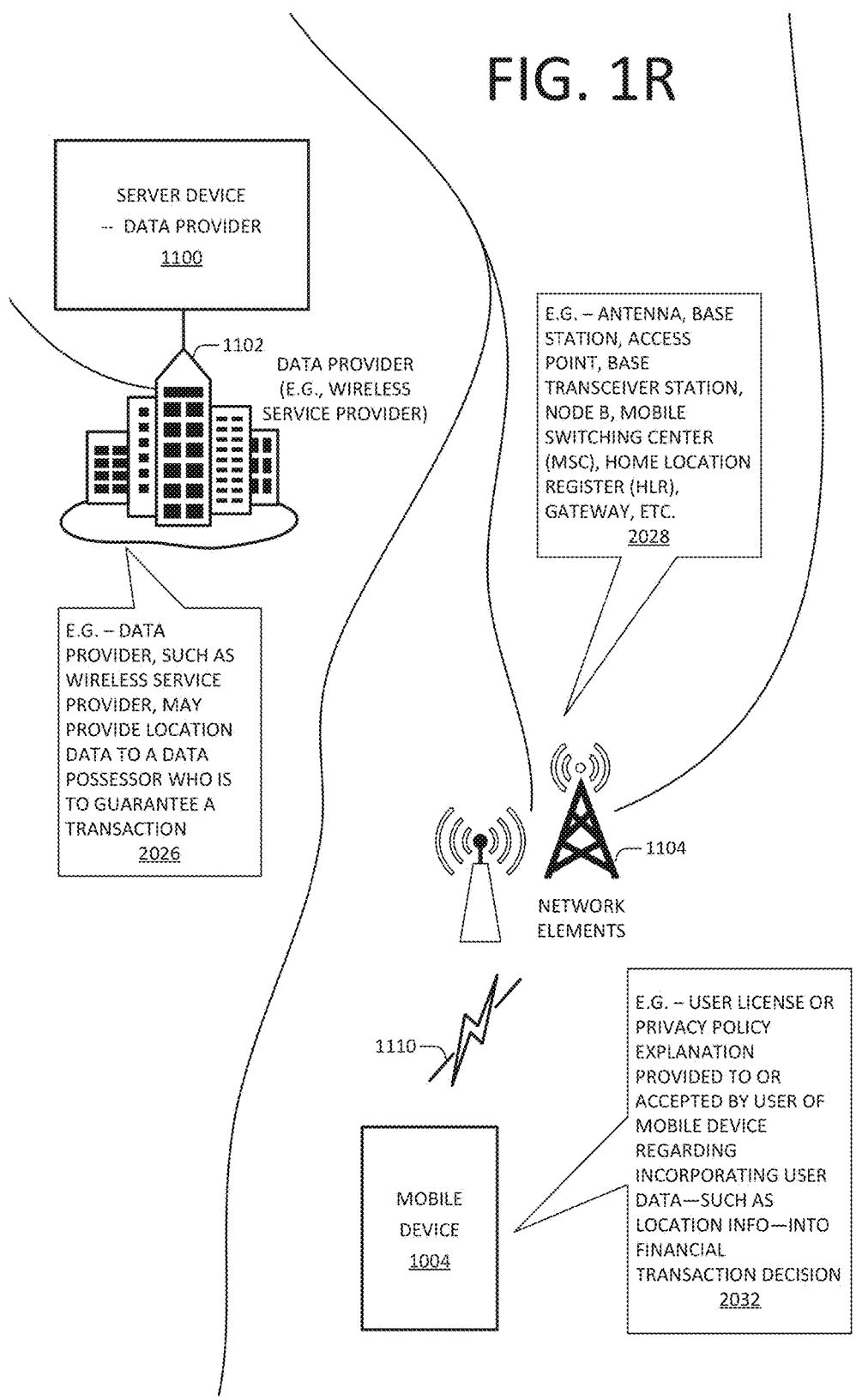

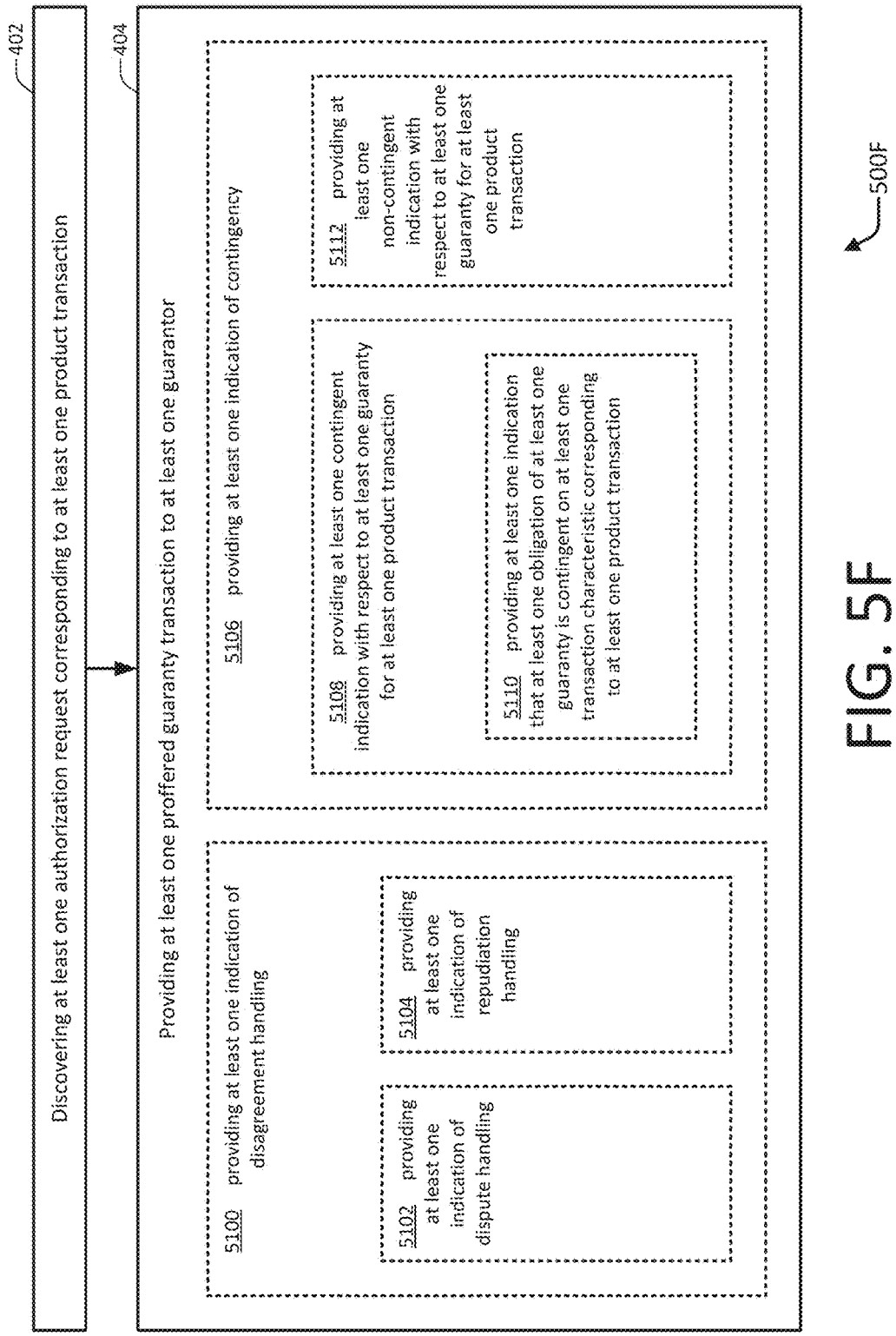

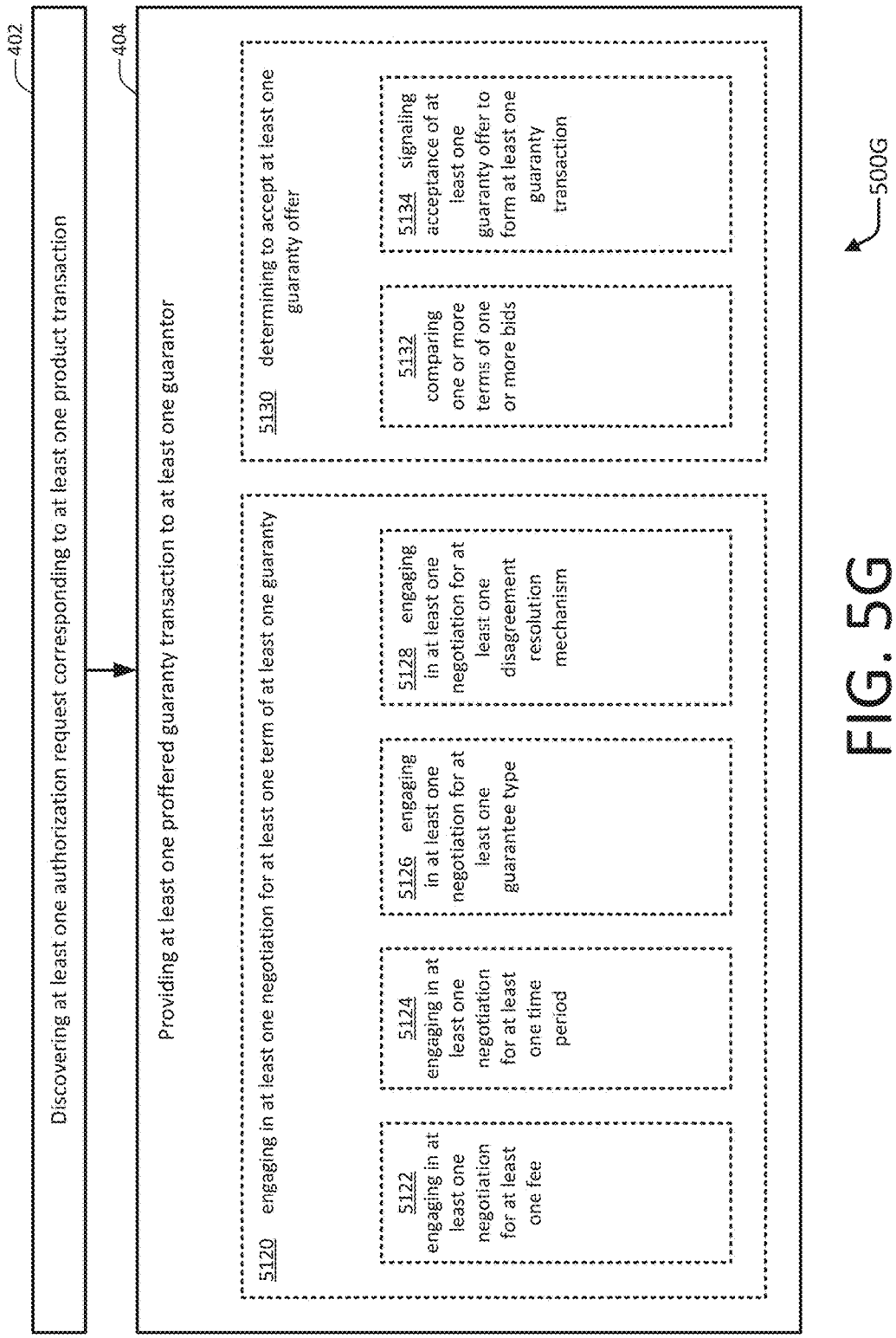

FINANCIER-FACILITATED GUARANTY PROVISIONING

CROSS-REFERENCE TO RELATED APPLICATIONS

The present application is related to and/or claims the benefit of the earliest available effective filing date(s) from the following listed application(s) (the "Priority applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority application(s)). In addition, the present application is related to the "Related applications," if any, listed below.

PRIORITY APPLICATIONS (1) For purposes of the USPTO extra-statutory requirements, the present application constitutes a continuation-in-part of U.S. patent application Ser. No. 14/066,580, entitled "Facilitating Guaranty Provisioning for an Exchange", naming Edward K. Y. Jung, Richard T. Lord, and Robert W. Lord as inventors, filed 29 Oct. 2013, which is currently co-pending or is an application of which a currently co-pending application is entitled to the benefit of the filing date.

(2) For purposes of the USPTO extra-statutory requirements, the present application constitutes a continuation-in-part of U.S. patent application Ser. No. 14/074,490, entitled "Vendor-Facilitated Guaranty Provisioning", naming Edward K. Y. Jung, Richard T. Lord, and Robert W. Lord as inventors, filed 7 Nov. 2013, which is currently co-pending or is an application of which a currently co-pending application is entitled to the benefit of the filing date.

(3) For purposes of the USPTO extra-statutory requirements, the present application constitutes a continuation-in-part of U.S. patent application Ser. No. 14/095,489, entitled "Guaranty Provisioning via Social Networking", naming Edward K. Y. Jung, Richard T. Lord, and Robert W. Lord as inventors, filed 3 Dec. 2013, which is currently co-pending or is an application of which a currently co-pending application is entitled to the benefit of the filing date.

(4) For purposes of the USPTO extra-statutory requirements, the present application constitutes a continuation-in-part of U.S. patent application Ser. No. 14/098,232, entitled "Guaranty Provisioning via Internetworking", naming Edward K. Y. Jung, Richard T. Lord, and Robert W. Lord as inventors, filed 5 Dec. 2013, which is currently co-pending or is an application of which a currently co-pending application is entitled to the benefit of the filing date.

(5) For purposes of the USPTO extra-statutory requirements, the present application constitutes a continuation-in-part of U.S. patent application Ser. No. 14/145,811, entitled "Guaranty Provisioning via Wireless Service Purveyance", naming Edward K. Y. Jung, Richard T. Lord, and Robert W. Lord as inventors, filed 31 Dec. 2013, which is currently co-pending or is an application of which a currently co-pending application is entitled to the benefit of the filing date.

(5) For purposes of the USPTO extra-statutory requirements, the present application constitutes a continuation-in-part of U.S. patent application Ser. No. 14/154,699, entitled "Mobile Device-Facilitated Guaranty Provisioning", naming Edward K. Y. Jung, Richard T. Lord, and Robert W. Lord as inventors, filed 14 Jan. 2014, which is currently co-pending or is an application of which a currently co-pending application is entitled to the benefit of the filing date.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority applications section of the ADS and to each application that appears in the Priority applications section of this application.

All subject matter of the Priority applications and the Related applications and of any and all parent, grandparent, great-grandparent, etc. applications of the Priority applications and the Related applications, including any priority claims, is incorporated herein by reference to the extent such subject matter is not inconsistent herewith.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

BRIEF DESCRIPTION OF THE FIGURES

In accordance with 37 C.F.R. 1.84(h)(2)

the views on the several sheets . . . [are] so arranged that the complete figure can be assembled" from "partial views drawn on separate sheets . . . linked edge to edge," in that (i) a "smaller scale view" is "included showing the whole formed by the partial views and indicating the positions of the parts shown," see 37 C.F.R. 1.84(h)(2), and (ii) the partial-view

Figures 1, 1A:
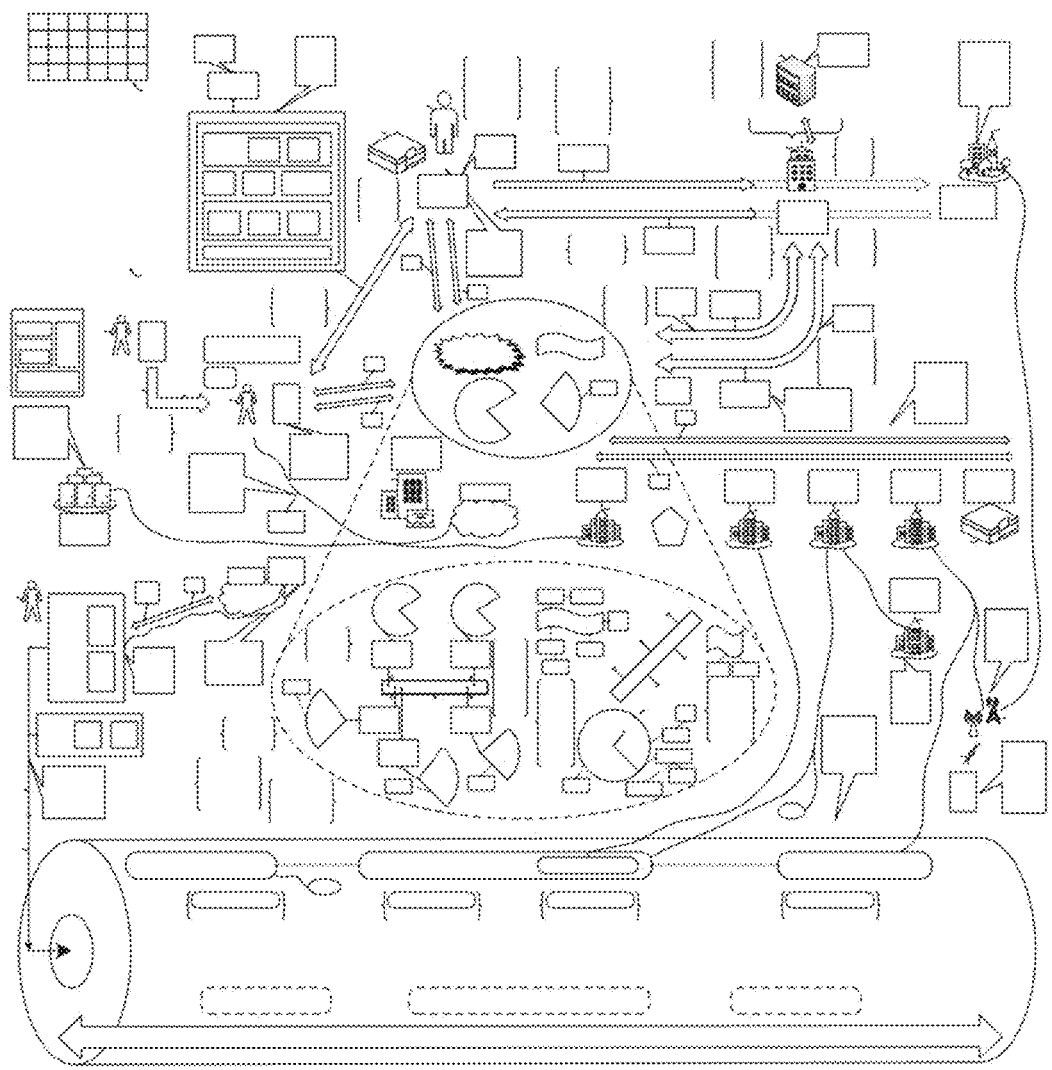
FIG. 1 shows "a view of a large machine or device in its entirety . . . broken into partial views . . . extended over several sheets" labeled FIG. 1A through FIG. 1X (Sheets 1-24). The "views on two or more sheets form, in effect, a single complete view, [and]
FIGS. 1A to 1X are ordered alphabetically, by increasing column from left to right, as shown in the following table.
Figure 1B:
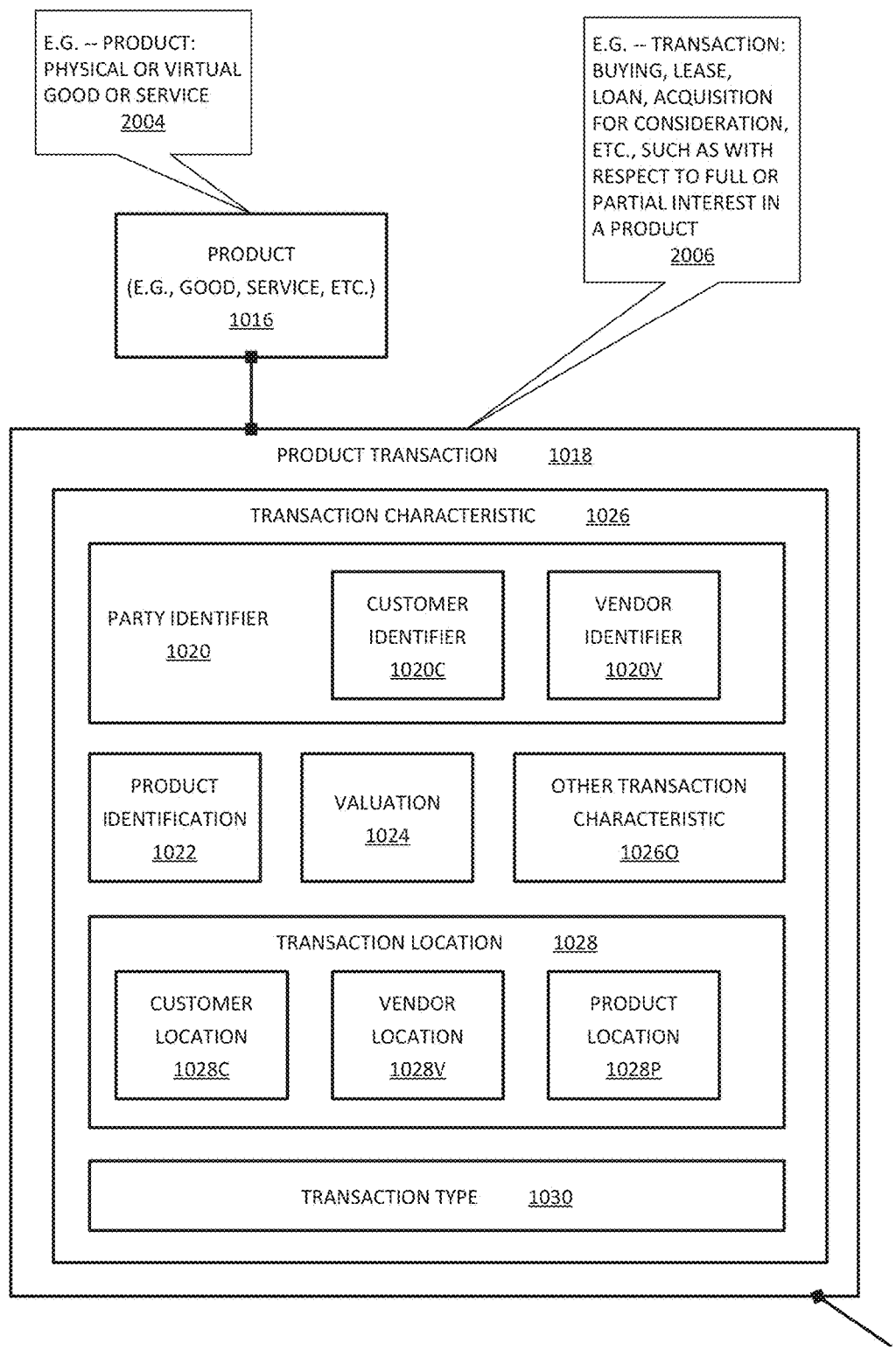
Figure 1C:
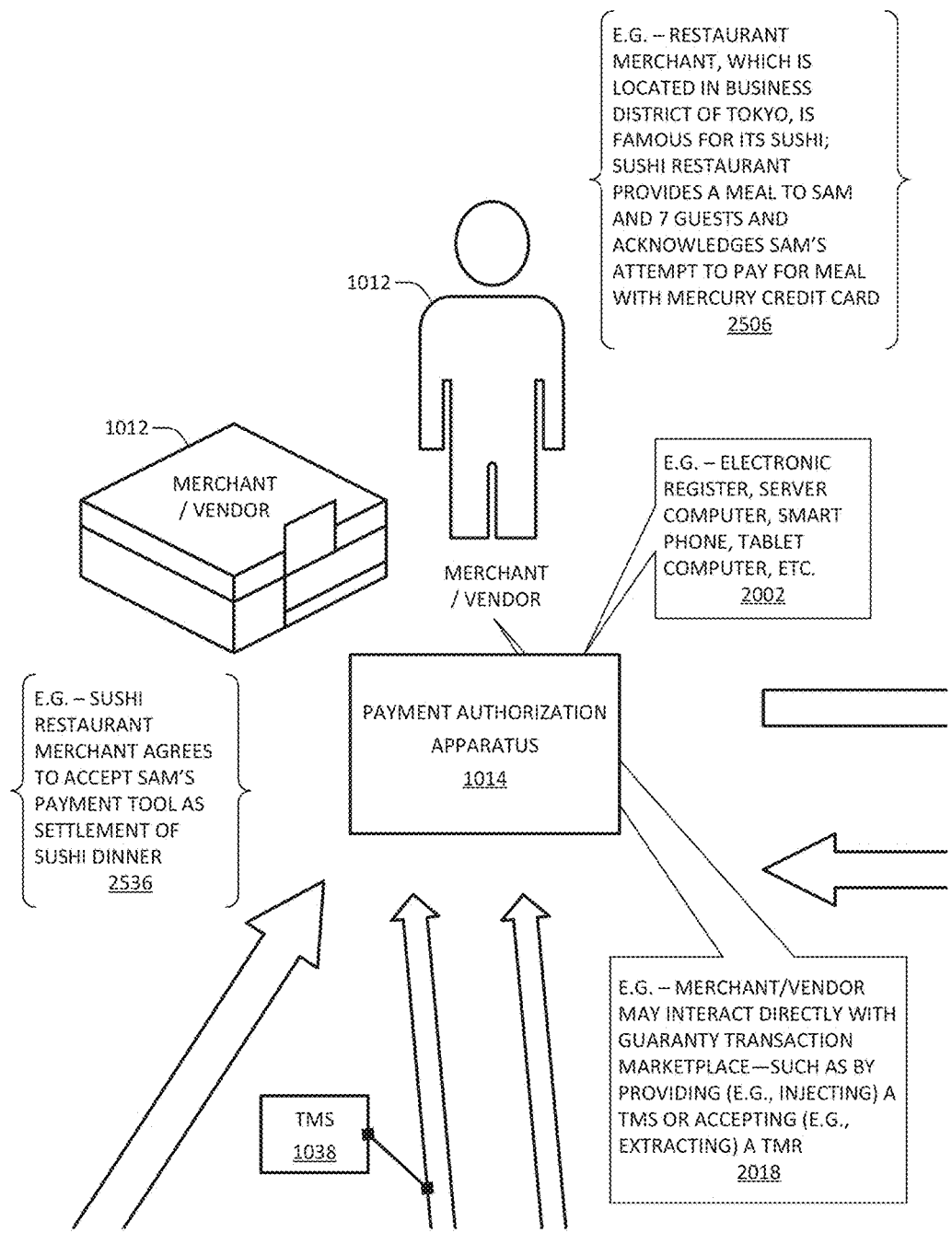
Figure 1D:
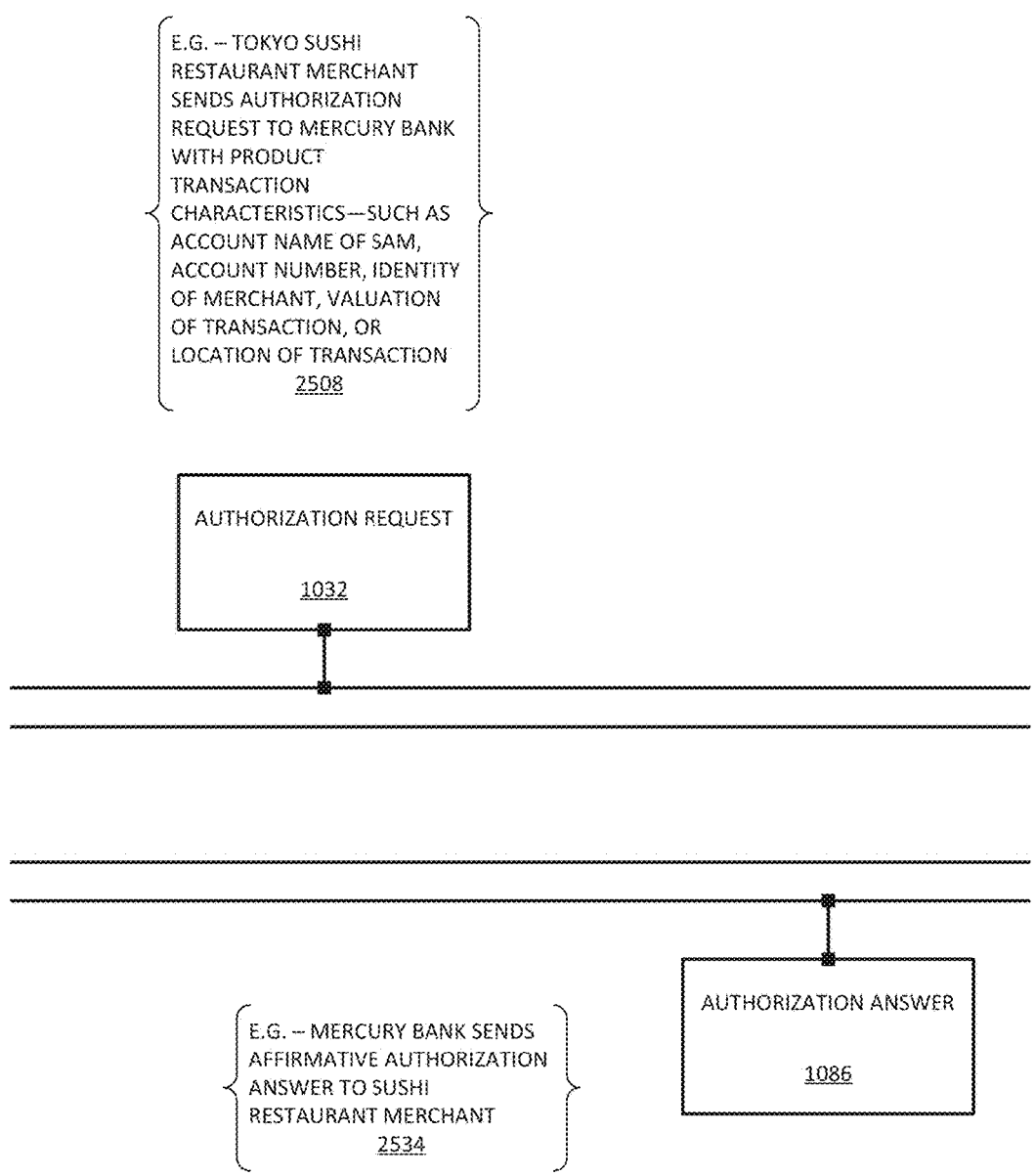
Figure 1F:
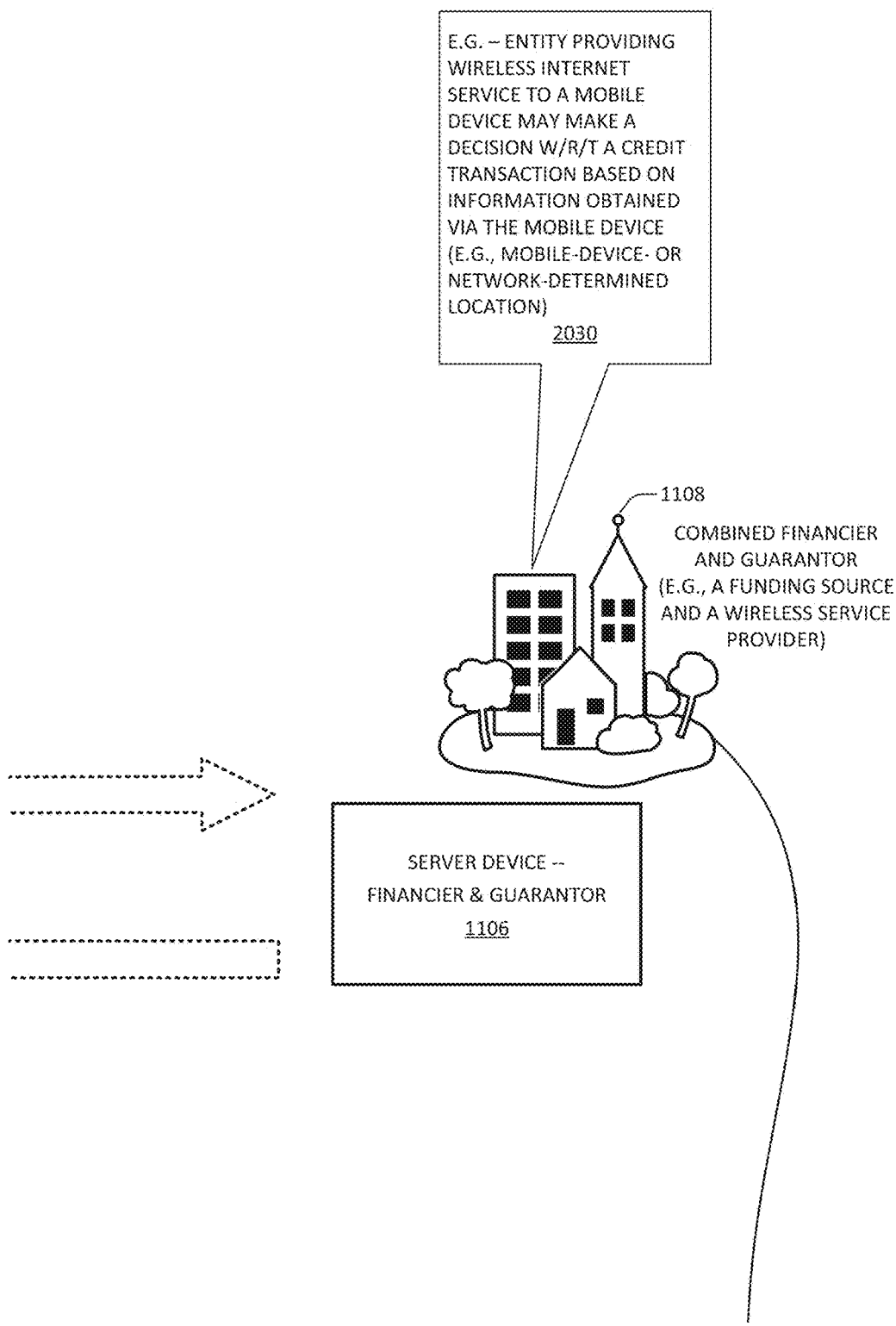
Figure 1L:
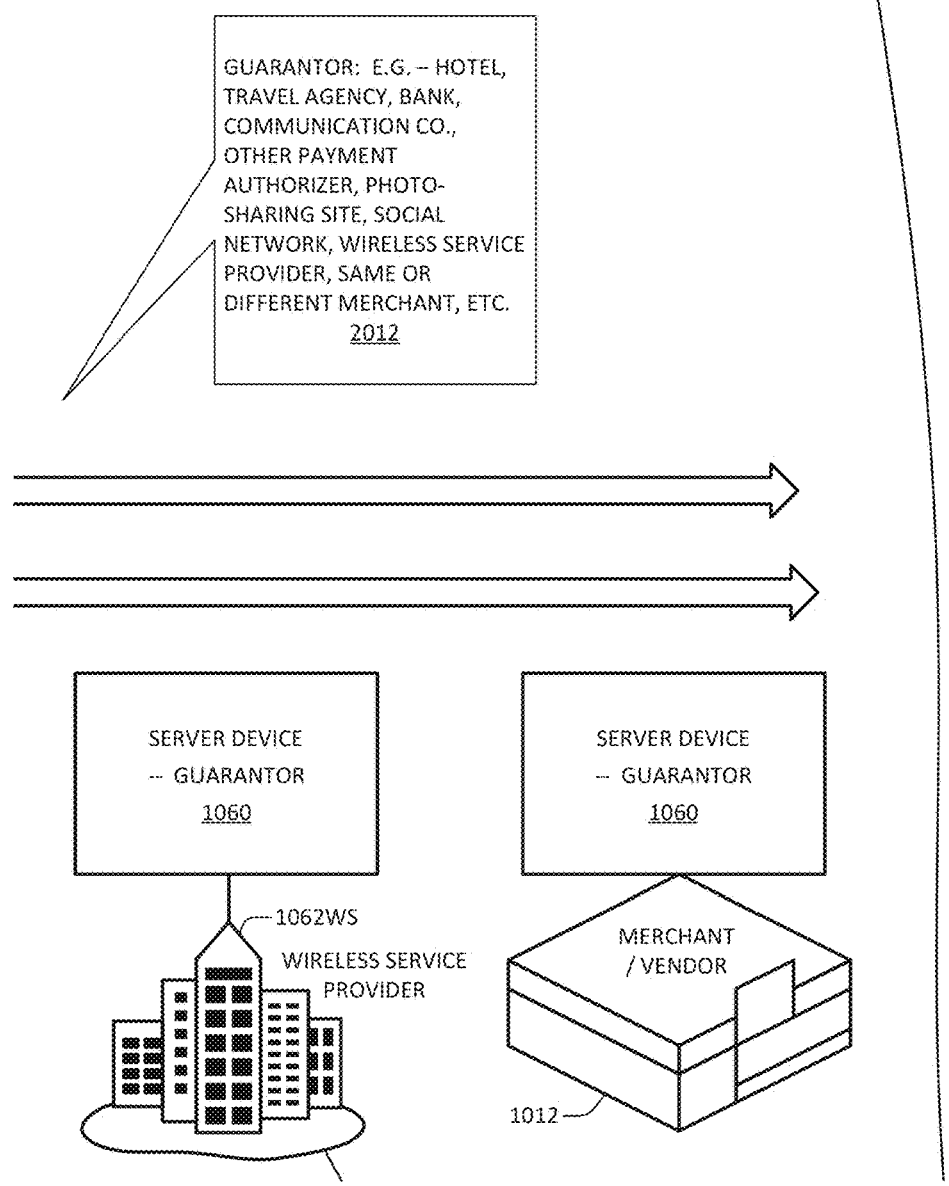
Figure 1M:
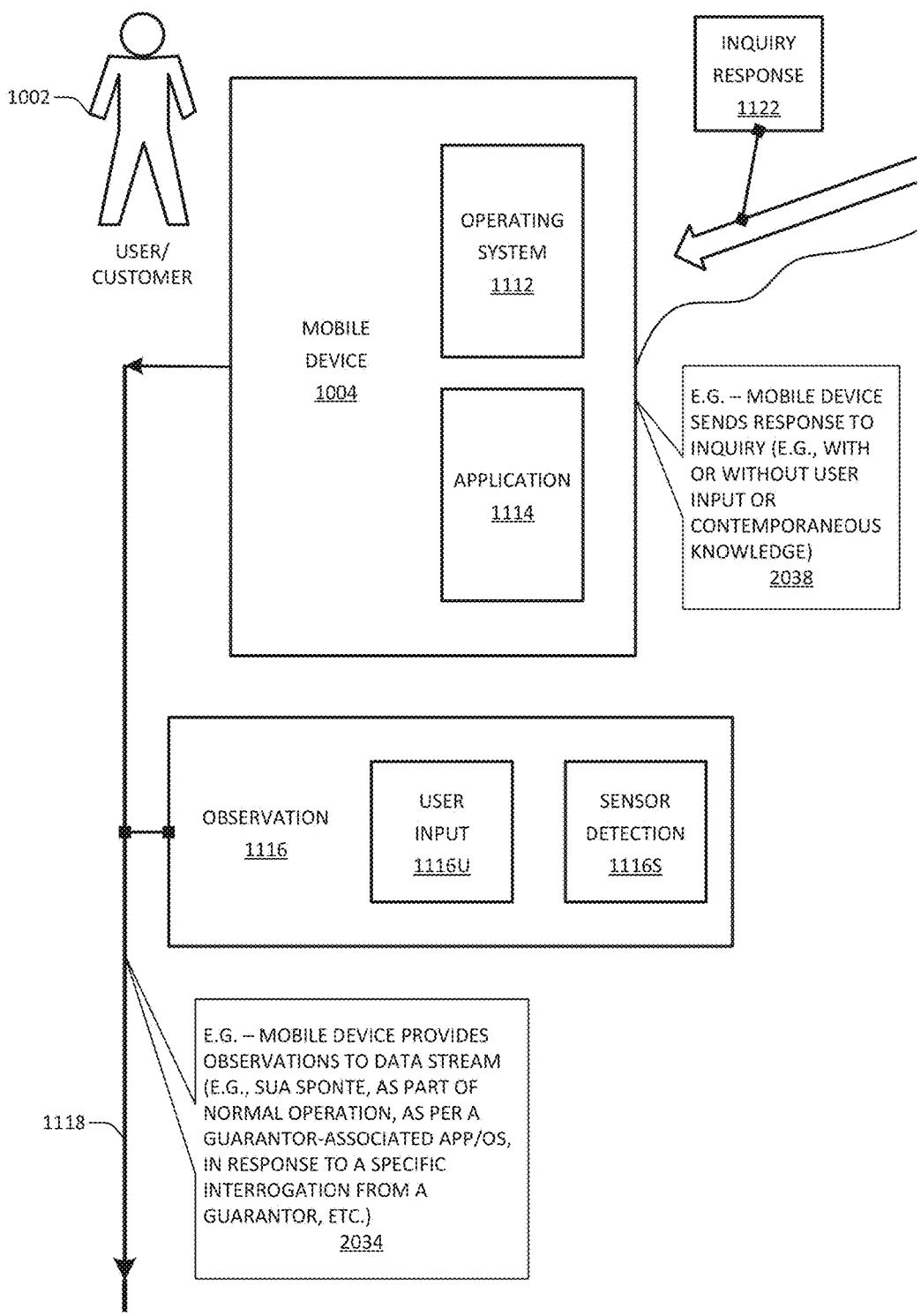
Figure 10:
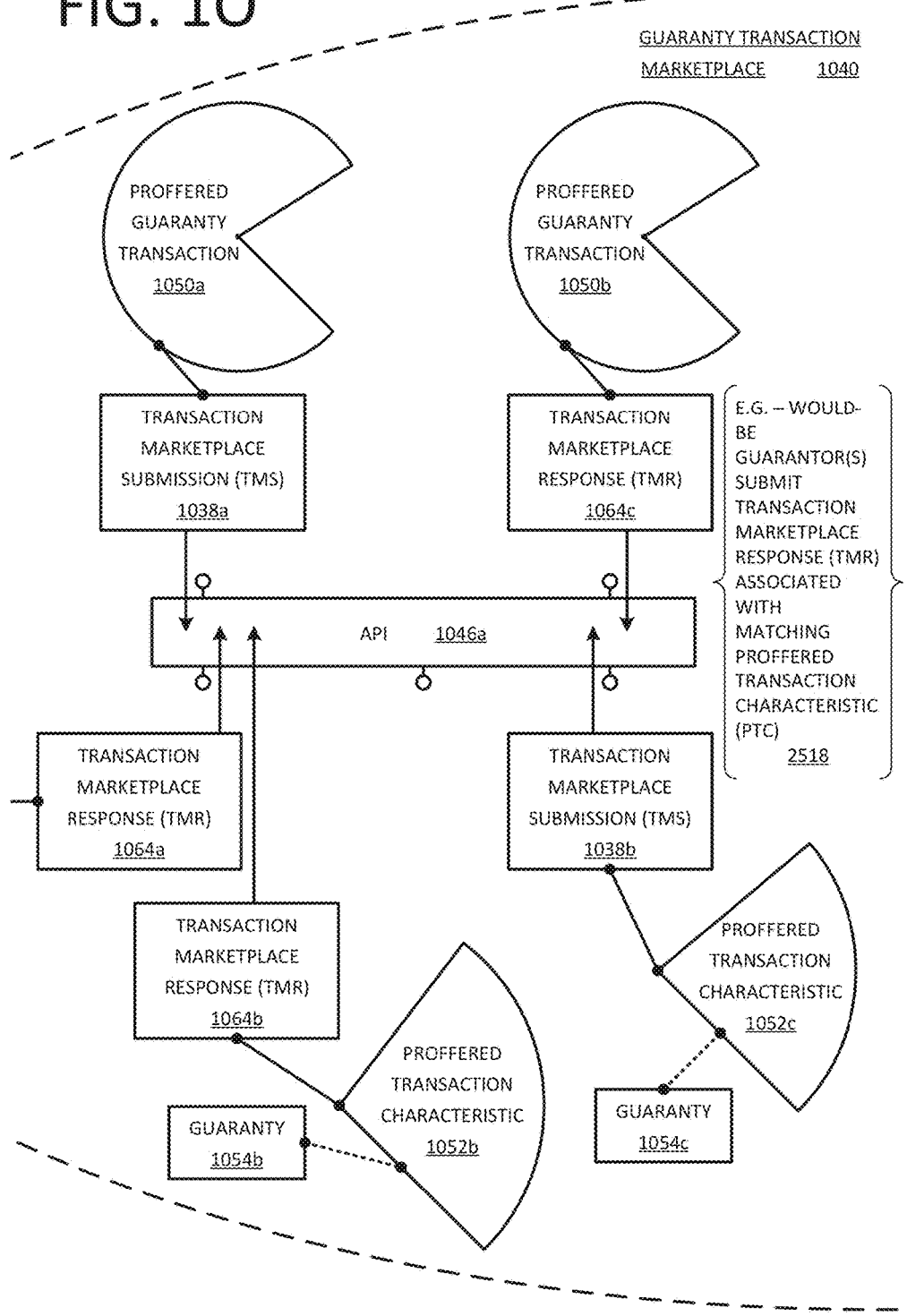
Figure 1P:
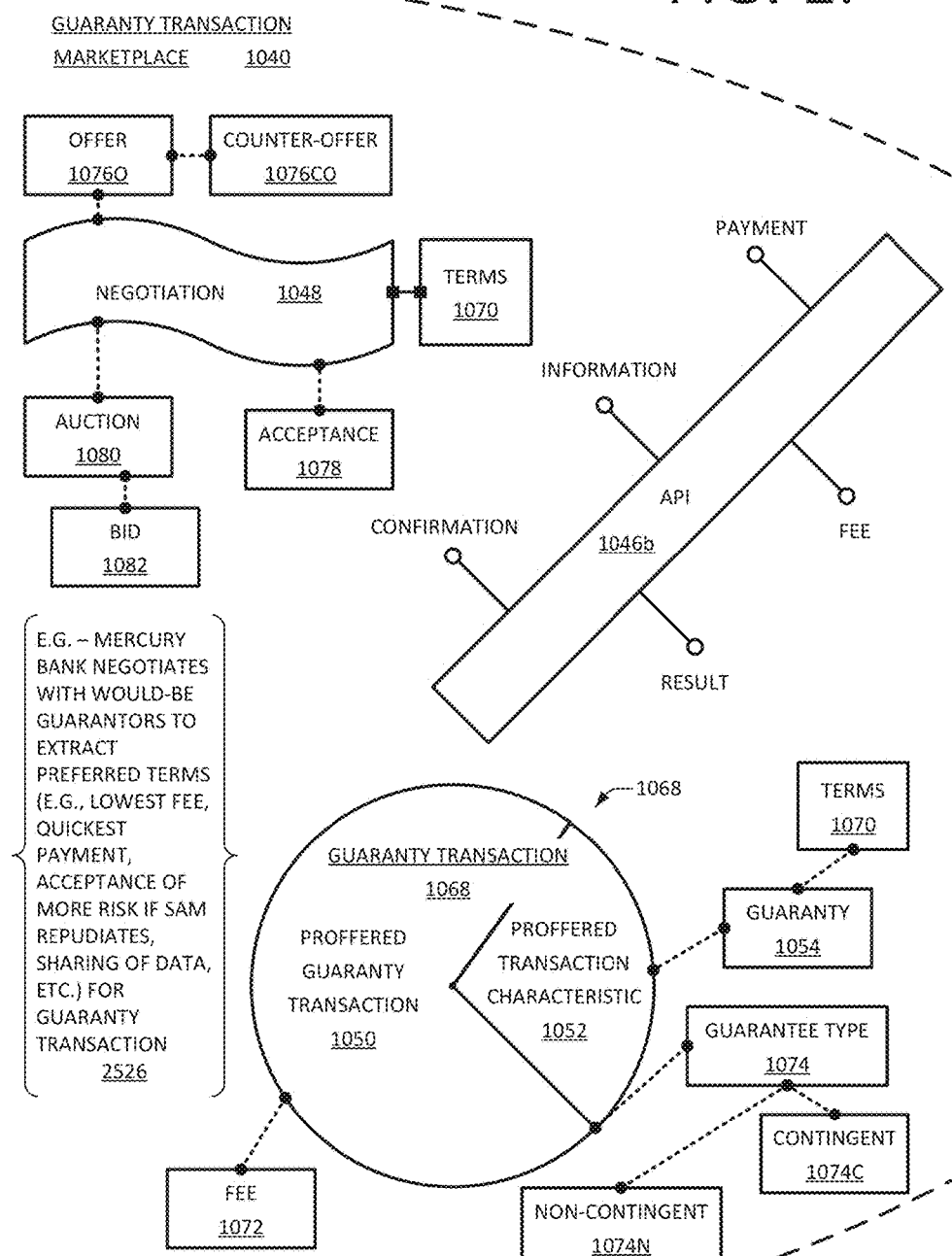
Figure 1Q:
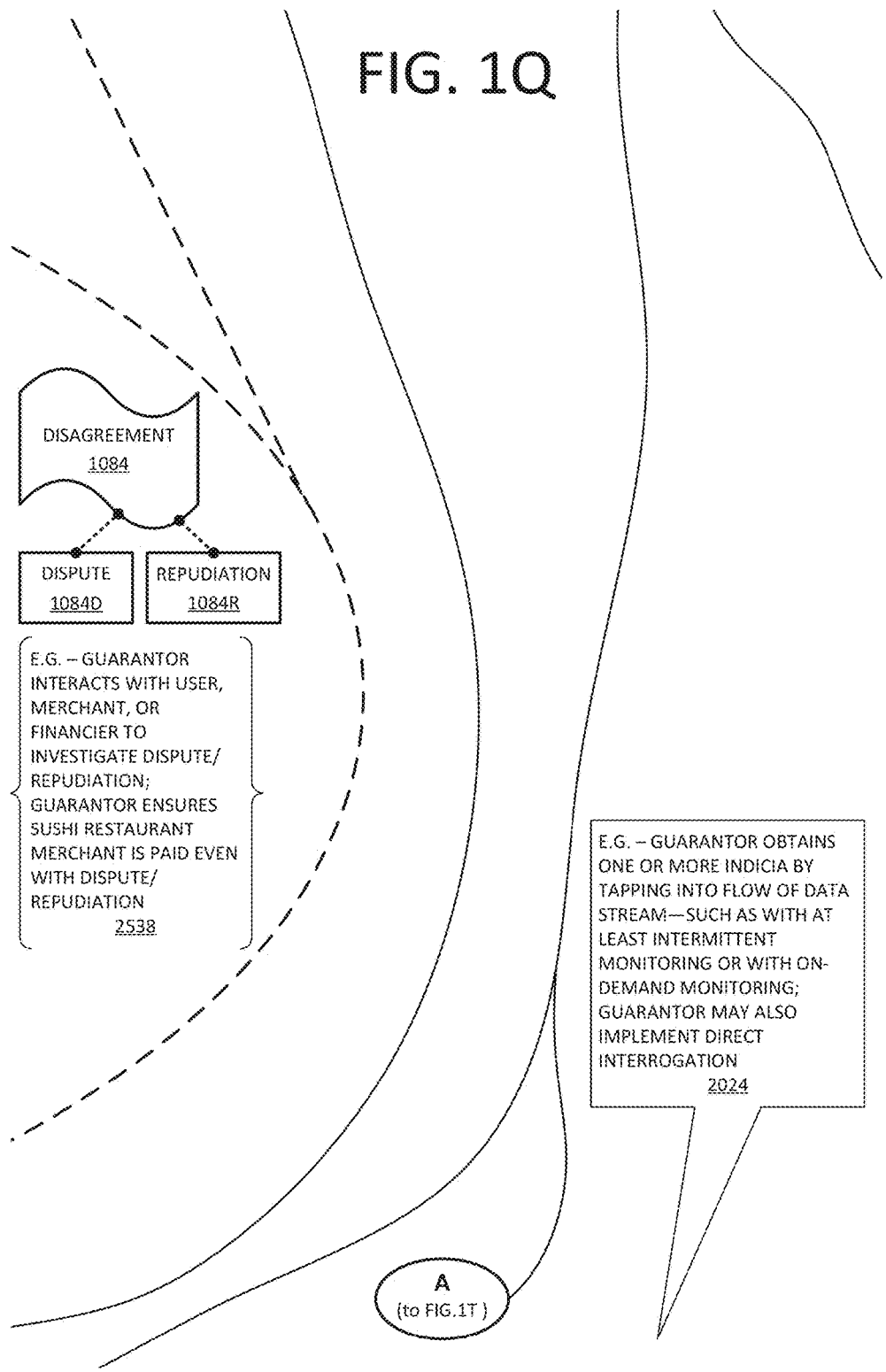
Figure 1S:
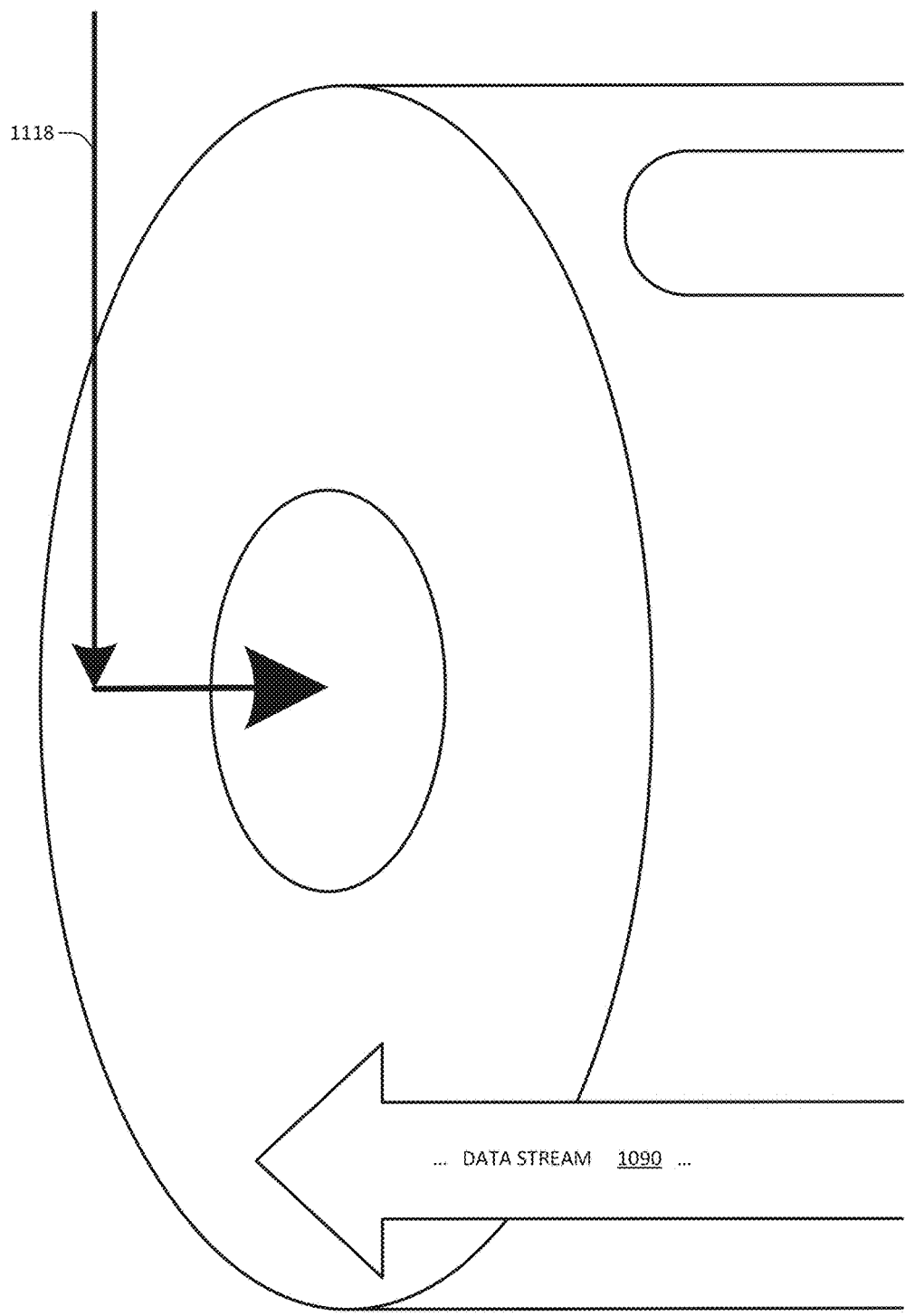
Figure 1T:
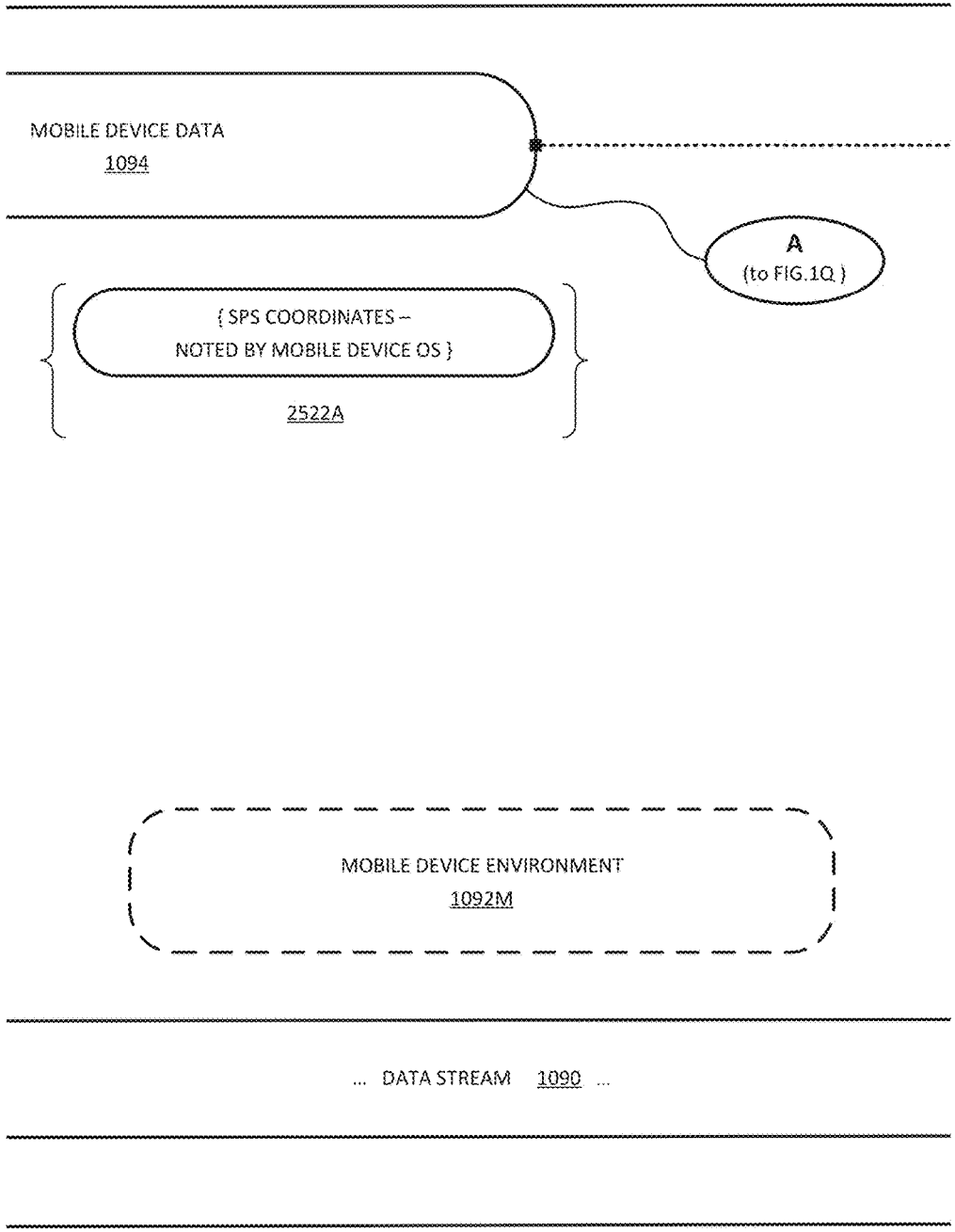
Figure 1U:
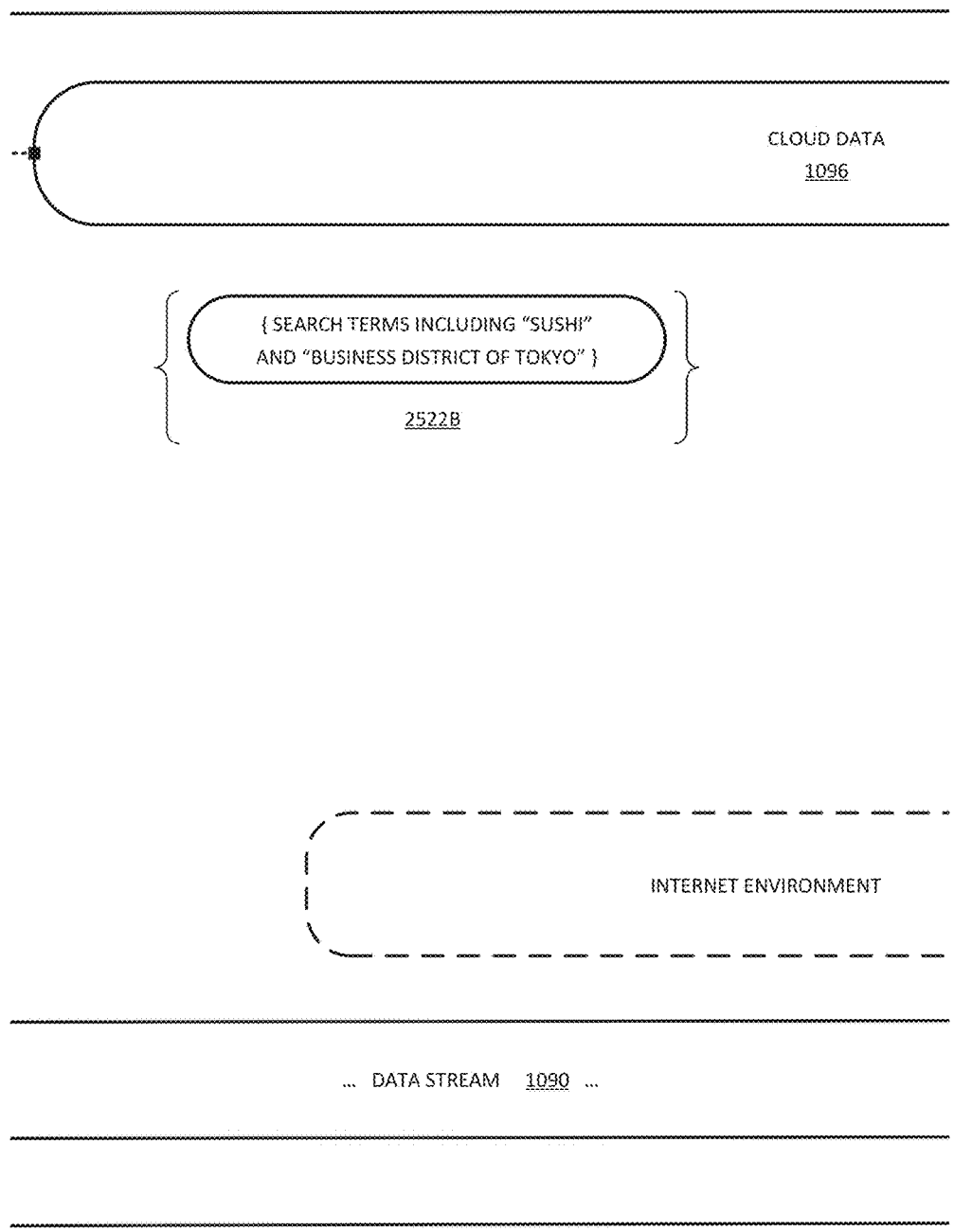
Figure 1V:
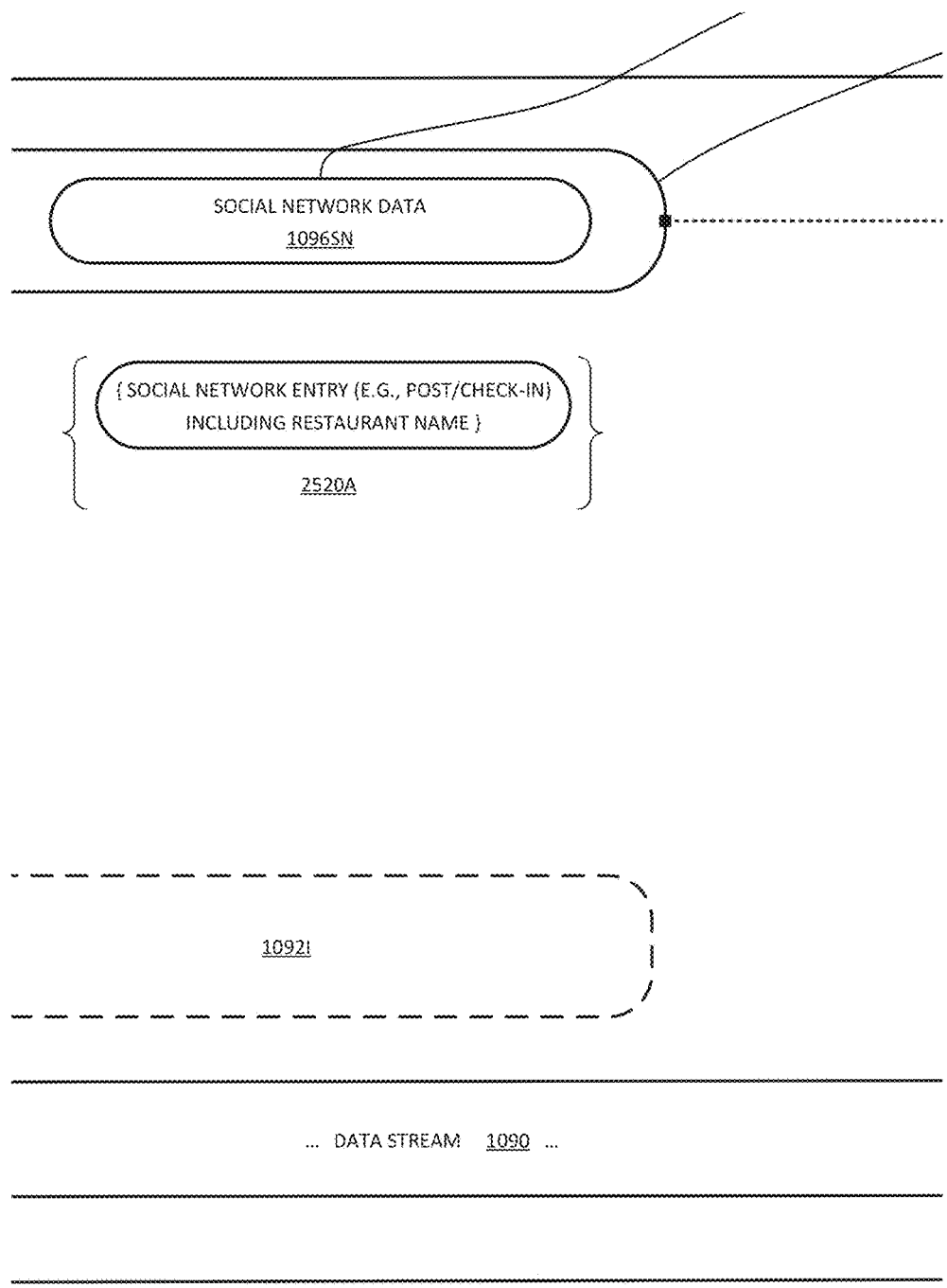
Figure 1W:
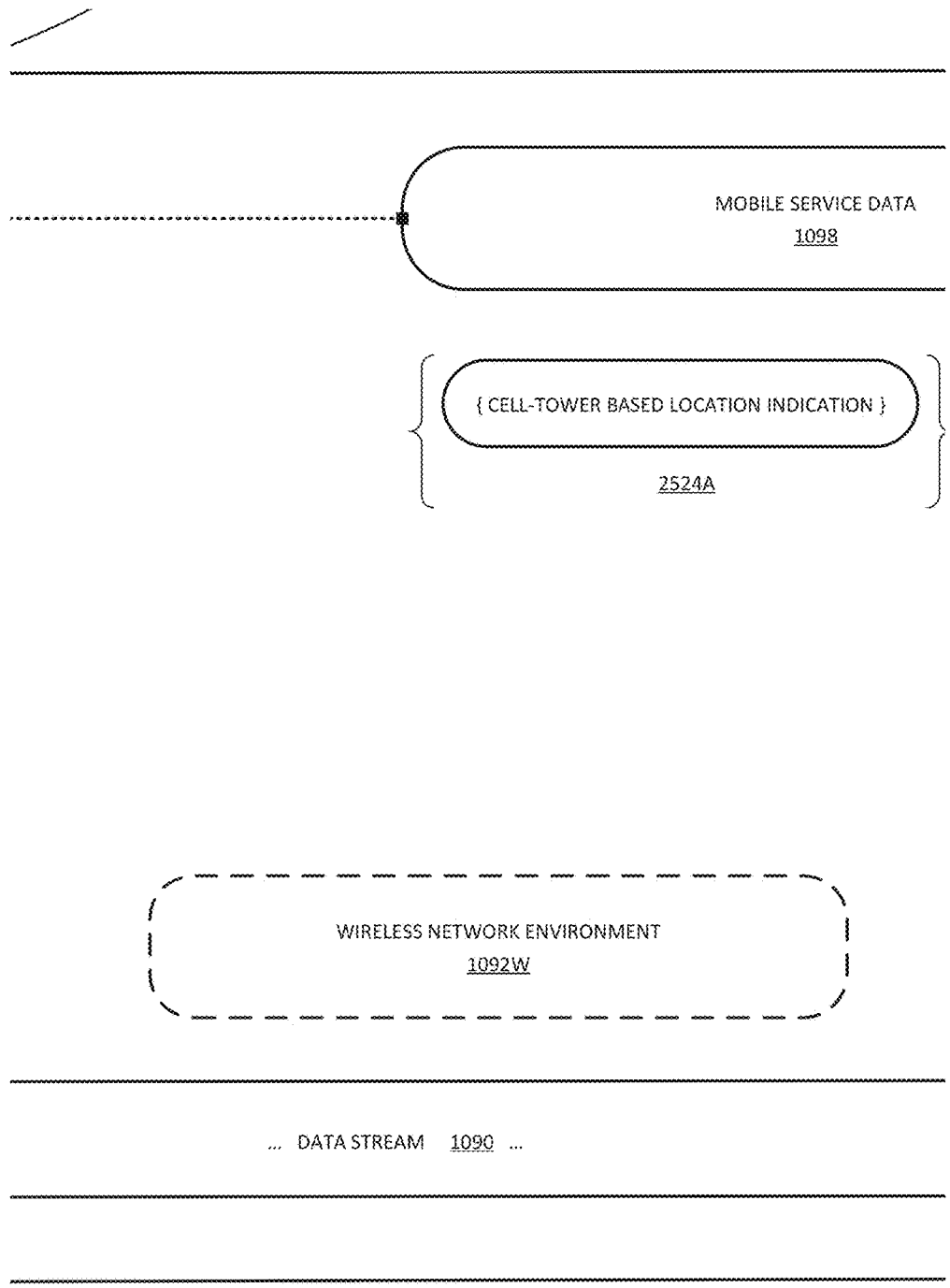
Figure 1X:
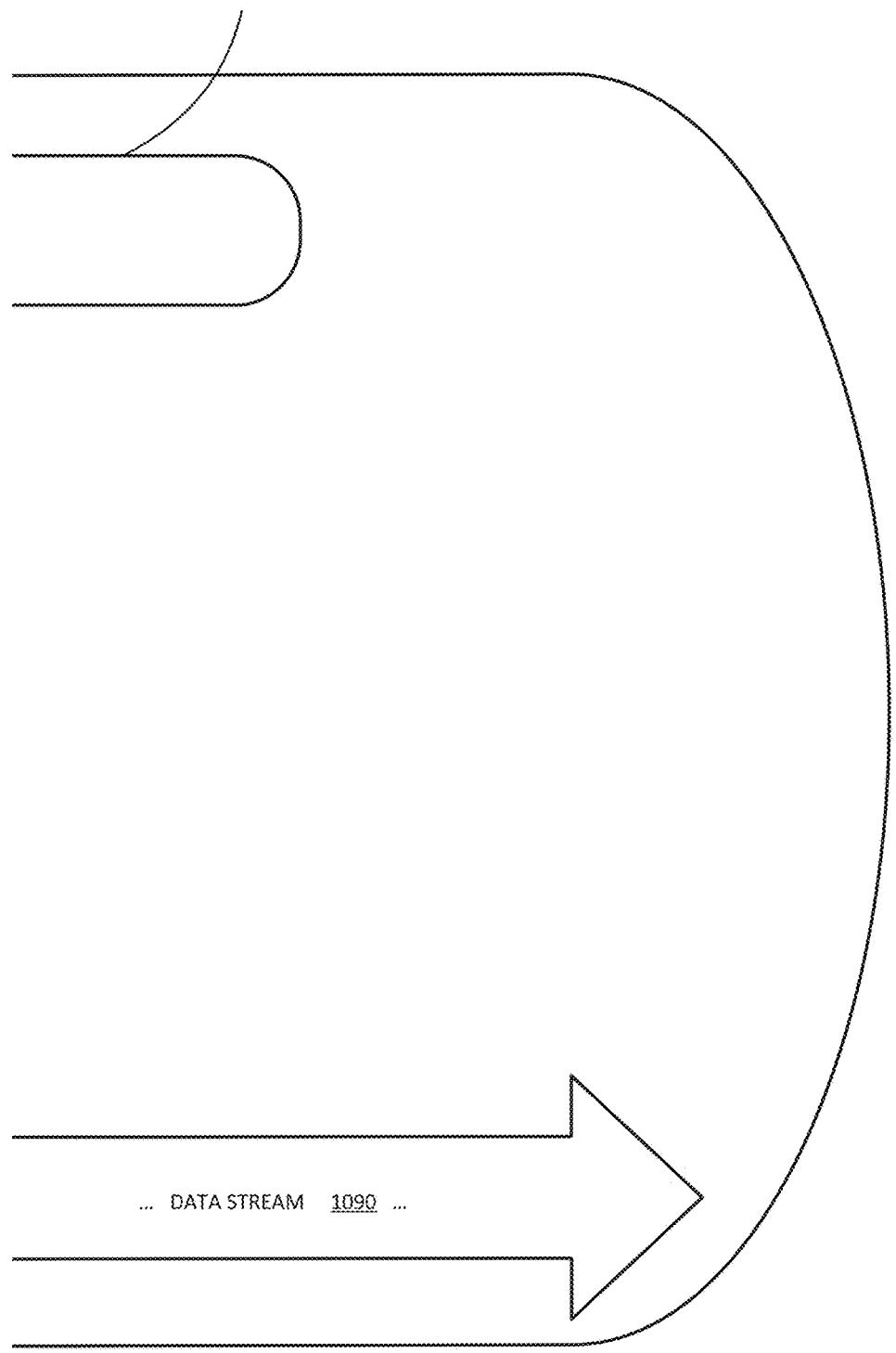

| FIG. 1A | FIG. 1B | FIG. 1C | FIG. 1D | FIG. 1E | FIG. 1F |
| FIG. 1G | FIG. 1H | FIG. 1I | FIG. 1J | FIG. 1K | FIG. 1L |
| FIG. 1M | FIG. 1N | FIG. 1O | FIG. 1P | FIG. 1Q | FIG. 1R |
| FIG. 1S | FIG. 1T | FIG. 1U | FIG. 1V | FIG. 1W | FIG. 1X |

FIG. 1 is a block diagram indicative of a spatial relationship or interconnectedness between or among drawing sheets that respectively correspond to FIGS. 1A-1X, which together depict at least an example enviro-system or affiliated processes related to certain example embodiments.

FIG. 1A is a schematic diagram of a miniaturized image or "smaller scale view" of FIGS. 1B-1X.

FIGS. 1B-1X are individual schematic diagrams of "partial views drawn on separate sheets" that may be combined to form a joint schematic diagram or "large machine or device" illustrating example implementations for facilitating guaranty provisioning for an exchange or financier-facilitated guaranty provisioning in accordance with certain example embodiments.

Figure 2:
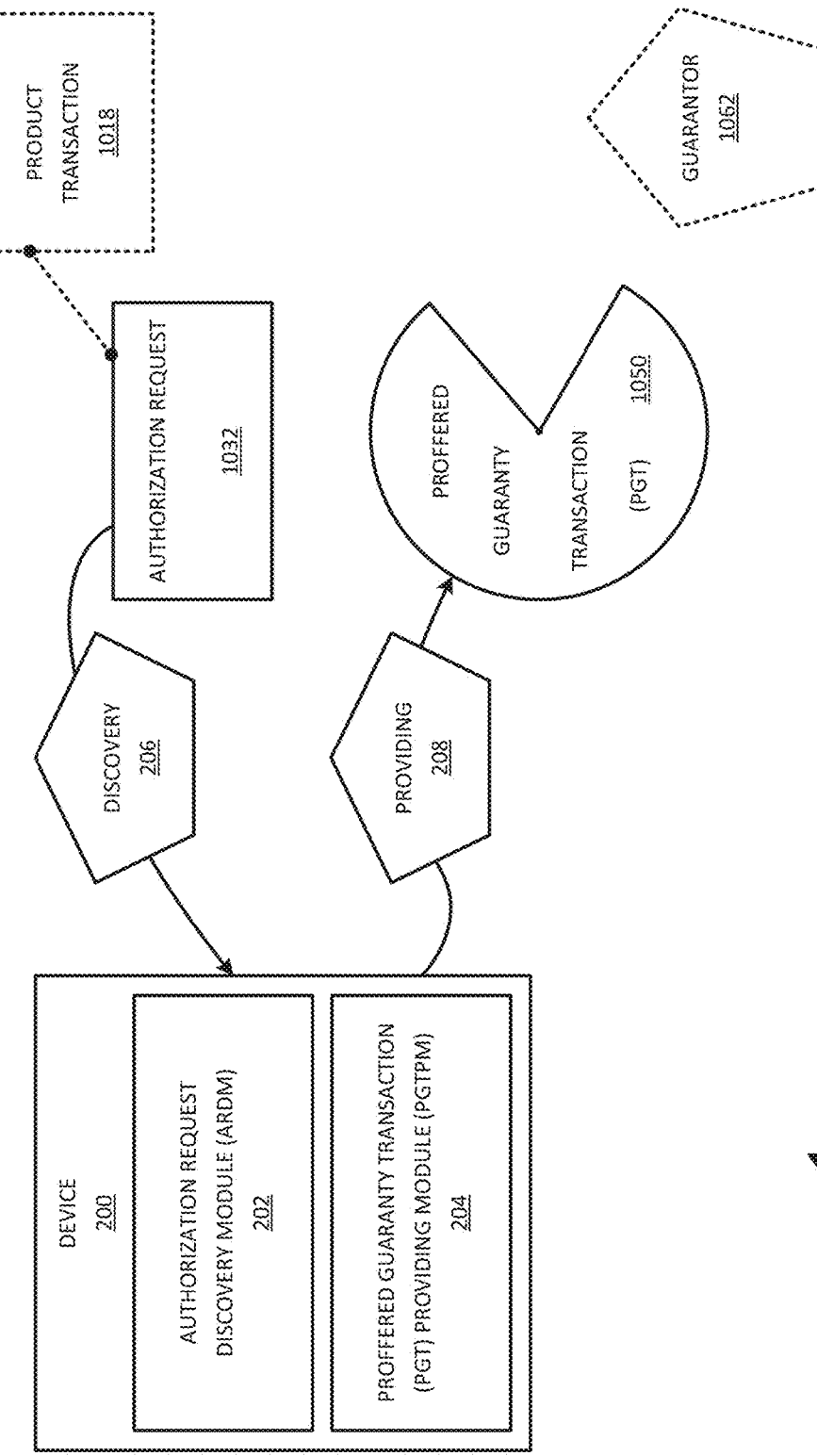

FIG. 2 is a schematic diagram that includes at least one example device, such as a server device, that is capable of handling scenarios for financier-facilitated guaranty provisioning in accordance with certain example embodiments.

FIGS. 3A-3E are schematic diagrams 300A-300E that include at least one example device and that depict example scenarios for financier-facilitated guaranty provisioning in accordance with certain example embodiments.

Figure 4:
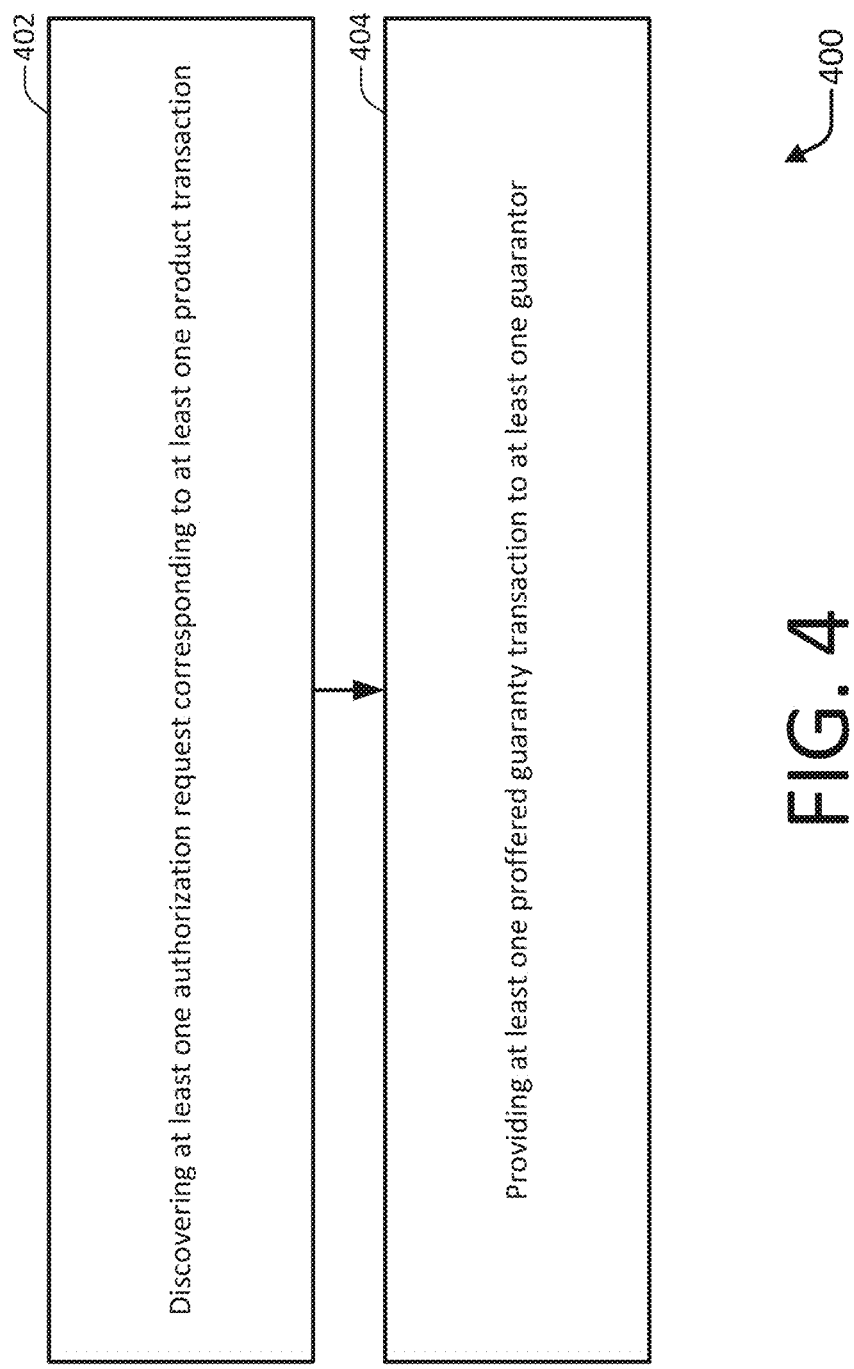

FIG. 4 is a flow diagram illustrating an example method for at least one device with regard to financier-facilitated guaranty provisioning in accordance with certain example embodiments.

FIGS. 5A-5G depict example additions or alternatives for a flow diagram of FIG. 4 in accordance with certain example embodiments.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In a commercial realm, two or more parties may engage in a transaction in which goods or services are exchanged for consideration, such as other goods or services, an accepted monetary unit (e.g., dollars, BitCoins, yuan/renminbi, or a combination thereof, etc.), a credit obligation (e.g., a promise to pay in the future a good, a service, a monetary unit, or a combination thereof, etc.), some combination thereof, or so forth. For example, a person may exchange $5.45 for a caffeinated beverage. In a financial arena, a first party's credit obligation to a second party may be guaranteed by a third party. For example, a parent may agree to make payments on a car loan if a child fails to do so. A guarantee for a credit obligation at least apparently attributable to a first party may be offered to reassure a second party that it is sufficiently likely to be paid so that a credit-extending transaction between the first party and the second party may be consummated. In an event that a first party fails to meet a credit obligation to a second party (e.g., due to fraud by a fourth party, due to insolvency or recalcitrance of the first party, due to a misunderstanding by any party, or a combination thereof, etc.), the second party may be able to rely on the guaranteeing third party to meet the credit obligation established by the first party.

For certain example embodiments, a guarantor may provide a guaranty on behalf of a first entity, such as a purchaser, to a second entity, such as a store owner. For certain example implementations, provision of a guaranty may be at least partially dependent on data obtained by a guarantor independent of the second entity. For example, one or more characteristics of a proposed transaction between a first entity and a second entity may be sent to a potential guarantor. A potential guarantor may already possess or may obtain one or more indicia associated with a first entity that corroborate, support, lend credence to, abide by a behavioral fingerprint that comports with, or a combination thereof, etc. a likelihood that the first entity is or would be desirous of engaging in a proposed transaction including the first entity and a second entity or of procuring a product appurtenant to a proposed transaction. For certain example implementations, a potential guarantor may obtain one or more indicia from a data stream associated with a first entity, such as a data stream produced by or accessible via a mobile device of the first entity. For example, a potential guarantor may have access to a search history, a current location, a social network posting, or a combination thereof, etc. corresponding to a first entity. If a likelihood that a first entity is or would be desirous of engaging in an identified proposed transaction is determined to be sufficiently high (e.g., meets a determined threshold, matches a certain number of characteristics, comports with a behavioral fingerprint, or a combination thereof, etc.), then a potential guarantor may signal to a second entity a willingness to provide a guaranty for the proposed transaction on behalf of the first entity with the second entity as a beneficiary. However, claimed subject matter is not limited to any particular described embodiments, implementations, examples, or so forth.

For certain example embodiments, a guarantor may provide a guaranty on behalf of a first entity, such as a dining guest, to benefit a second entity, such as a restaurant or credit card company. For certain example implementations, a server device of a potential guarantor may receive a message from a server device of a credit card company. A message from a server device of a credit card company may identify at least one characteristic of a proposed credit transaction between a first entity and a second entity. For example, a credit card company may identify an identity of a first entity and a location of a second entity. In response to a message from a server device of a credit card company, a potential guarantor, which is able to secure at least one indication that a mobile device of an identified first entity is present at a location of a second entity, may proffer a guaranty to the credit card company. For certain example implementations, a proffered guaranty may be contingent at least partially on at least one identified transaction characteristic being falsified. For example, a guarantor may become responsible for paying at least a portion of a valuation of a transaction after data has been presented evidencing a falsity of a contingent transaction characteristic. For instance, a guarantor may be responsible for paying a total cost for a meal at a restaurant if an identified first entity or a credit card company presents evidence that the identified first entity was in a different city than a city of the restaurant at the time a meal of a guaranteed transaction was served. For such a contingent example, a guarantor may not be responsible to a second entity or to a credit card company if an identified first entity was present at a restaurant of the second entity at a time of a guaranteed transaction but subsequently declines to pay for a meal. However, claimed subject matter is not limited to any particular described embodiments, implementations, examples, or so forth.

FIG. 1 is a block diagram 1000 indicative of a spatial relationship or interconnectedness between or among drawing sheets that respectively correspond to FIGS. 1A-1X, which together depict at least an example enviro-system or affiliated processes related to certain example embodiments. As shown, FIG. 1 illustrates a grid of rectangles representing drawing sheets. The grid includes four rows (e.g., starting with FIG. 1A, FIG. 1G, FIG. 1M, and FIG. 1S from top to bottom) having six columns each (e.g., row one having FIGS. 1A-1F, row two having FIGS. 1G-1L, row three having FIGS. 1M-1R, and row four having FIGS. 1S-1X).

FIG. 1A is a miniaturized image 1000A of a schematic diagram of FIGS. 1B-1X. Generally, a comparison of miniaturized image 1000A FIG. 1A to FIGS. 1B-1X, in view of FIG. 1, reveals a number of illustrated aspects. First, a top row (starting at FIG. 1B) illustrates, inter alia and moving from left to right, a product transaction 1018, a merchant/vendor 1012 and a payment authorization apparatus 1014, a financier 1034, a combined financier and guarantor 1108, etc. Second, the next row (starting at FIG. 1G) illustrates, inter alia and moving from left to right, a device 1500 that is capable of being transformed into a special-purpose computing apparatus by implementation of one or more instructions, a user/customer 1002, a mobile device 1004, a guaranty transaction marketplace 1040 that may be associated with at least one application programming interface (API) 1046, a transaction marketplace submission (TMS) 1038, a transaction marketplace response (TMR) 1064, one or more guarantors 1062 (e.g., 1062PP, 1062SN, 1062DP, 1062WS, etc. Third, the next to bottom row (starting at FIG. 1M) illustrates, inter alia and moving from left to right, a mobile device 1004 interacting with at least a portion of a guaranty system (e.g., a guarantor 1062, a guaranty transaction marketplace 1040, or a combination thereof, etc.), an exploded view of a guaranty transaction marketplace 1040 that may be associated with one or more proffered guaranty transactions 1050 or one or more proffered transaction characteristics 1052 to establish at least one guaranty transaction 1068 corresponding to at least one guaranty 1054, a data provider 1102, one or more network elements 1104, etc. Fourth, the bottom row (starting at FIG. 1S) illustrates, inter alio and moving from left to right, a data stream 1090 that may be associated with mobile device data 1094, cloud data 1096, mobile service data 1098, a combination thereof, or so forth.

For certain example embodiments, a merchant 1012 (e.g., of FIG. 1C) or a financier 1034 or 1108 (e.g., of FIG. 1E or 1F) may attempt to secure a guaranty 1054 (e.g., of FIG. 1J or 1P) from at least one potential guarantor 1062 or 1108 (e.g., of FIG. 1F, 1J, 1K, or 1L) for a proposed product transaction 1018 (e.g., of FIG. 1B) involving at least merchant 1012 or a customer 1002 (e.g., an attempted purchaser that may succeed or may fail with regard to a desired or contemplated purchase) (e.g., of FIG. 1G, 1H, or 1M). A potential guarantor 1062 or 1108 may be empowered to tap into a data stream 1090 (e.g., of FIG. 1S, 1T, 1U, 1V, 1W, or 1X) associated with at least one mobile device 1004 (e.g., of FIG. 1G, 1H, 1M, or 1R) of a customer 1002 to obtain one or more indicia that may corroborate at least one transaction characteristic 1026 (e.g., of FIG. 1B) of a proposed product transaction 1018. For certain example implementations, a merchant 1012 or a financier 1034 or 1108 may interact or communicate with a potential guarantor 1062 or 1108 in accordance with a guaranty transaction marketplace 1040 (e.g., of FIG. 1I, 1J, 1N, 1O, 1P, or 1Q) via at least one application programming interface (API) 1046/1046a/1046b (e.g., of FIG. 1I, 1O, or 1P) by at least one of providing or accepting at least one of a transaction marketplace submission (TMS) 1038/1038a/1038b or a transaction marketplace response (TMR) 1064/1064a/1064b/1064c (e.g., of FIG. 1C, 1I, 1J, 1K, or 1O). Accordingly, a proffered guaranty transaction 1050/1050a/1050b (e.g., of FIG. 1I, 1O, or 1P) from a merchant 1012 or a financier 1034 or 1108 may be matched with a proffered transaction characteristic 1052/1052a/1052b/1052c (e.g., of FIG. 1J, 1N, 1O, or 1P) from a would-be guarantor 1062 or 1108 to establish a guaranty transaction 1068 (e.g., of FIG. 1P), which guaranty transaction 1068 may be at least partially contingent on a veracity of at least one particular transaction characteristic 1026. However, claimed subject matter is not limited to any particular described embodiments, implementations, examples, or so forth.

Multiple and various independent or interrelated example embodiments are described herein below with reference to one or more of any of FIGS. 1B-1X. However, claimed subject matter is not limited to any particular described embodiments, implementations, examples, or so forth. With reference to FIG. 1G, a user/customer 1002 is shown proximate to or may be associated with at least one mobile device 1004. As used herein, unless context or an express notation indicates otherwise, a customer may be interchangeably substituted for a user of a personal device, such as an end-user of a mobile device 1004 or an end-user of a non-mobile device (e.g., a desktop computer, a home entertainment appliance, a home server, or a combination thereof, etc.) (a non-mobile device is not explicitly illustrated in FIG. 1G). For certain example implementations, a user/customer 1002 may comprise or include at least one person, at least one human, at least one legal entity, at least one robotic entity or agent, a group of people, some combination thereof, or so forth. For certain example implementations, a mobile device 1004 may comprise or include a mobile phone, a tablet, a slate computer, a phablet, a portable gaming device, a smartphone, a notebook computer, a user equipment (UE), a mobile station (MS), a laptop computer, an ultra-book, a portable navigation device, a tablet-notebook convertible, a wearable computing device such as a so-called smart watch or intelligent glasses, an electronic device having wireless communication capabilities that is typically carried by or with a person on a regular basis such as daily, a vehicle having navigation or communication capabilities, some combination thereof, or so forth. As indicated by travel arrow 1006, a user 1002 may transport, move, carry, relocate, or a combination thereof, etc. a mobile device 1004 from one location to another location. As shown, travel arrow 1006 extends from FIG. 1G to FIG. 1H.

With reference to FIG. 1H, a user 1002 may change location from time-to-time as indicated by travel arrow 1006. For certain example embodiments, a user 1002 may possess, be associated with, have access to, or a combination thereof, etc. at least one payment tool 1008. For certain example implementations, a payment tool 1008 may comprise or include a credit card 1010 (of any size or shape, of general usage or on a vendor-specific basis, or a combination thereof, etc.), a mobile device 1002, a smart card, a debit card, a pre-paid card (general usage or vendor-specific), a keychain dongle, a smart wallet, or a combination thereof, etc. By way of example only, a payment tool 1008 or a user 1002 that is associated therewith may present an indication (e.g., a code, a signal, a positive bit in a field of a message, a press of a button, a verbal expression, or a combination thereof, etc.) that a product transaction may be consummated in relation to at least one guaranty, such as an indication that pursuing a guaranty is acceptable or is requested, an indication of a preferred or likely guarantor, an indication of an appropriate guaranty transaction marketplace, some combination thereof, or so forth. As a result of movement by a user 1002 (or movement by a merchant/vendor 1012), user 1002 may eventually reach a location that is part of or is at least proximate to a site (e.g., a business premises) of a merchant/vendor 1012, which is shown in FIG. 1C.

With reference to FIG. 1C, a merchant/vendor 1012 is depicted as a building or a person. As used herein, unless context or an express notation indicates otherwise, a vendor may be interchangeably substituted for a merchant having goods or services to sell to customers. For certain example implementations, a merchant/vendor 1012 may comprise or include an individual human, a group of people, a legal entity, a partnership, a corporation, a cart, a kiosk, a building, a suite or stall, a physical store, a virtual store, some combination thereof, or so forth. In FIG. 1C, a merchant/vendor 1012 is shown proximate to or may be associated with at least one payment authorization apparatus 1014 (e.g., at a point of sale (POS), remote from a purchase location, as part of a server farm, or a combination thereof, etc.). For certain example implementations, as indicated at a blurb 2002, a payment authorization apparatus 1014 may comprise or include at least one electronic register, at least one credit card acceptance or credit authorization machine (e.g., that has independent communication capability or that is physical or wirelessly coupled to another device having a communication capability), at least one server computer, a server farm, a server blade, server functionality that is leased or purchased from a cloud computing system, a tablet computer, a smartphone, an electronic device adapted to accept or process purchases, some combination thereof, or so forth. A payment authorization apparatus 1014 may facilitate a purchase of at least one product 1016 in conjunction with a product transaction 1018 (e.g., both of FIG. 1B).

With reference to FIG. 1B, at least one product 1016 is illustrated in association with at least one product transaction 1018. For certain example implementations, as indicated at a blurb 2004, a product 1016 may comprise or include a virtual good, a physical good, a virtual service, a physical service, some combination thereof, or so forth. For certain example embodiments, as indicated at a blurb 2006, a product transaction 1018, such as for a purchase of at least one product 1016, may comprise or include an acquisition for or using consideration (e.g., an exchange of value), buying, bartering for, a lease of, a loan of, access to, or a combination thereof, etc. with respect to a full or a partial interest in at least one product 1016. For certain example implementations, a product transaction 1018 may include or be associated with at least one transaction characteristic 1026. By way of example but not limitation, a transaction characteristic 1026 may describe, identify, specify, explain, indicate a correspondence of, or a combination thereof, etc. at least one aspect of a product transaction 1018.

For certain example implementations, a transaction characteristic 1026 may comprise or include or be associated with at least one party identifier 1020 (e.g., a name, a code, a number, a picture, a username, an email address, a credit card number, a store number, a company title, an account identifier, or a combination thereof, etc.), at least one product identification 1022 (e.g., a name, a code, a number, an image, a stock keeping unit (SKU), a description, a catalog number, a make or model, or a combination thereof, etc.), at least one valuation 1024 (e.g., a monetary value, a trade value, a number of units, a bartering equivalence, or a combination thereof, etc.), at least one other transaction characteristic 1026O (e.g., a product category, a number of people served, special requests, delivery terms, contingencies, a guaranty indication (e.g., a code, a signal, a positive bit in a field of a message, or a combination thereof, etc. to indicate that a product transaction may be consummated in relation to at least one guaranty, such as an indication that pursing a guaranty is acceptable or is requested, an indication of a preferred or likely guarantor, an indication of an appropriate guaranty transaction marketplace, one or more requested terms for a guaranty, or a combination thereof, etc.), a transaction identification, a characteristic not shown, or a combination thereof, etc.), at least one transaction location 1028 (e.g., a physical location, a virtual location, an address, a city, a store name, a URL, at least one satellite positioning system (SPS) coordinate, a neighborhood, a website name, or a combination thereof, etc.), at least one transaction type 1030 (e.g., buying, leasing, borrowing, acquiring a partial interest in, bartering, acquiring access to at least a share of, in-person, identification presented, via the internet, or a combination thereof, etc.), some combination thereof, or so forth. By way of example but not limitation, a party identifier 1020 may comprise or include at least one customer identifier 1020C, at least one vendor identifier 1020V, some combination thereof or so forth. By way of example but not limitation, a transaction location 1028 may comprise or include at least one customer location 1028C, at least one vendor location 1028V, at least one product location 1028P, some combination thereof, or so forth.

With reference to FIGS. 1C, 1D, and 1E, a merchant 1012 may communicate at least one authorization request 1032 (e.g., of FIG. 1D) to a financier 1034 (e.g., of FIG. 1E). For certain example embodiments, if a customer 1002 is attempting to use a payment tool 1008 (e.g., of FIG. 1H) that relies at least partially on authorization derived from (e.g., confirmation from, approval by, imprimatur of, or a combination thereof, etc.) another party, a payment authorization apparatus 1014 of a merchant 1012 may send an authorization request 1032 to a server device 1036 of a financier 1034. For certain example implementations, an authorization request 1032 may comprise or include one or more transaction characteristics 1026 for a product transaction 1018 (e.g., of FIG. 1B). For certain example implementations, a server device, including but not limited to a server device 1036 of a financier 1034, may comprise or include a server computer, a server blade, a virtualized server, a rack of servers, a container of servers, at least a portion of a web server farm, a computer functioning as a server, at least a portion of purchased or leased computing resources (e.g., an implementation of cloud computing), some combination thereof, or so forth. For certain example implementations, as indicated by a blurb 2008, a financier 1036 may comprise or include an initial, intermediate, final, or a combination thereof, etc. entity that is capable of providing at least partial payment authorization for a product transaction 1018 on behalf of a customer 1002, such as a payment approver, a funding source, an identifier, or a combination thereof, etc. By way of example but not limitation, a financier 1034 may comprise or include a bank, a credit card company, a credit/financing division of a corporation, a money transfer service, an internet-based payment service (e.g., PayPal, Google Wallet, Amazon Payments, or a combination thereof, etc.), an entity making decisions for an electronic wallet, an escrow company, an insurance company contracting with a bank or credit card company, a company that performs services or acts in a role at least similar or analogous to the above-identified entities, some combination thereof, or so forth.

With reference to FIGS. 1E, 1K, 1J, and 1I, a financier 1034 may communicate at least one transaction marketplace submission (TMS) 1038 (e.g., of FIG. 1K) via at least one network 1042 using at least one message 1044 (e.g., both of FIG. 1I). For certain example implementations, a network 1042 may comprise or include at least one wireless network, at least one wired network, at least one public network, at least one private network, at least one internet, at least one intranet, at least one infrastructure network, at least one ad hoc network, at least one cellular network, at least one packet-switched network, at least one circuit switched network, at least one virtual network, some combination thereof, or so forth. For certain example implementations, a message 1044 may comprise or include at least one packet, at least one signal, some communicated electric or magnetic data, encapsulated information, at least one encrypted message, at least one unencrypted message, at least one Boolean value, one or more alphanumeric characters, at least one code, an email, a file, a TMS 1038, a transaction marketplace response (TMR) 1064, a transaction marketplace message (TMM) 1066, an inquiry 1120 (e.g., of FIG. 1N), an inquiry response 1122 (e.g., of FIG. 1M), an observation 1116 (e.g., of FIG. 1M), mobile device data 1094 or cloud data 1096 or mobile service data 1098 (e.g., of FIGS. 1S-1X), some combination thereof, or so forth.

With continuing reference to FIGS. 1E, 1K, 1J, and 1I, a financier 1034 may provide at least one TMS 1038 (e.g., of FIG. 1K) to at least one guaranty transaction marketplace 1040 (e.g., of FIGS. 1J and 1I). For certain example embodiments, as indicated by a blurb 2010 (e.g., of FIG. 1J), a TMS 1038 may be provided to guaranty transaction marketplace 1040 via a limited form of publication (e.g., send to multiple parties, post to a site or area with limited or pre-qualified access, or a combination thereof, etc.), an application programming interface (API) call, some combination thereof, or so forth. As illustrated by an elliptical shape formed from a solid line across FIGS. 1I and 1J, an example guaranty transaction marketplace 1040 may include, involve, be related to, entail, utilize, correspond to, or a combination thereof, etc. one or more aspects, characteristics, facets, or a combination thereof, etc. Examples may include, but are not limited to, at least one application programming interface (API) 1046, at least one negotiation 1048, at least one proffered guaranty transaction 1050, at least one proffered transaction characteristic 1052, at least one guaranty 1054, some combination thereof, or so forth. For certain example implementations, a proffered guaranty transaction 1050 may comprise or include or correspond to at least a portion of a product transaction 1018 (e.g., of FIG. 1B); one or more identified transaction characteristics 1026 (e.g., of FIG. 1B) that are known, unknown, requested, to be guaranteed, to be supplied, or a combination thereof, etc.; an indication that at least one guaranty is desired or being pursued or would be welcome; some combination thereof; or so forth. For certain example implementations, a proffered transaction characteristic 1052 may comprise or include or correspond to an indication of at least one transaction characteristic 1026 that is available, determinable, known, capable of being supplied; a value of at least one transaction characteristic 1026 that is available, determinable, known, capable of being supplied, or a combination thereof, etc.; a guaranty 1054 that may be offered or made available for a fee; a guaranty 1054 that may be offered without a contingency; a guaranty 1054 that may be offered contingent on a veracity of at least one transaction characteristic 1026; some combination thereof; or so forth. A guaranty 1054 may comprise or include or correspond to a guarantee, an assurance, a promise, an agreement, one or more terms therefor, or a combination thereof, etc. to provide some level of reimbursement, compensation, payment on behalf of another's obligation, monetary value, or a combination thereof, etc. if a product transaction is disputed or repudiated (or otherwise subject to a disagreement) in whole or in part on a non-contingent basis, on a contingent basis (e.g., if a particular asserted or guaranteed transaction characteristic is falsified), some combination thereof, or so forth. Proffered guaranty transaction 1050, proffered transaction characteristic 1052, and guaranty 1054 are addressed further herein, particularly with reference to at least FIGS. 1N, 1O, 1P, and 1Q that depict an exploded view of a guaranty transaction marketplace 1040 with an elliptical shape formed from dashed lines.

For certain example embodiments, a guaranty transaction marketplace 1040 may enable at least one negotiation 1048 (e.g., presentation of an offer, presentation of a counter-offer, discussion of one or more terms, an acceptance, a refusal, suggested term alterations, bidding, an auction, a reverse auction, or a combination thereof, etc.) to be conducted, accomplished, effectuated, or a combination thereof, etc. via at least one API 1046. At least a portion of an API 1046 may be realized, constituted, implemented, or a combination thereof, etc. at least partially at, by, or using a server device 1036 of a financier 1034, a server device 1056 of a market maker 1058, a server device 1060 of a guarantor 1062, a server device 1106 of a combination financier and guarantor (e.g., of FIG. 1F), another server device that interacts with a guaranty system, a mobile device that interacts with a guaranty system, some combination thereof, or so forth. A market maker 1058, if present or utilized, may function to create a guaranty transaction marketplace 1040 for use by a customer 1002, a vendor 1012, a financier 1034 or 1108, a guarantor 1062 or 1108, some combination thereof, or so forth. A market maker 1058 may comprise or include, by way of example but not limitation, a vendor 1012, a financier 1034, a guarantor 1062, a neutral third (or fourth) party, or a combination thereof, etc. that establishes, operates, implements, or a combination thereof, etc. an exchange, a mechanism to facilitate matches to form guaranty transactions 1068 (e.g., of FIG. 1P), a secure bazaar, some combination thereof, or so forth.

With reference to FIGS. 1J, 1K, and 1L, at least one server device 1060 for a guarantor 1062 is illustrated as having access to at least one guaranty transaction marketplace 1040 (e.g., as indicated by at least one of two double-ended arrows extending from FIG. 1J across FIG. 1K and to FIG. 1L). For certain example embodiments, a guarantor 1062 may comprise or include at least one pre-positioned data possessor 1062PP, at least one social network 1062SN, at least one data possessor 1062DP, at least one wireless service provider 1062WS, at least one combined funding source and wireless service provider as an example of a combined financier and guarantor 1108 (e.g., of FIG. 1F), some combination thereof, or so forth. Additionally or alternatively, a guarantor 1062 may comprise or include at least one merchant/vendor 1012. For certain example implementations, as indicated at a blurb 2012, a guarantor 1062 may comprise or include at least one hotel, at least one travel agency, at least one bank, at least one communication company, at least one other payment authorizer, at least one photo-sharing site, at least one social network, at least one wireless service provider, a same merchant as is involved in a product transaction, at least one merchant that differs from one involved in a product transaction, some combination thereof, or so forth. For certain example embodiments, a guarantor 1062 may communicate at least one transaction marketplace response (TMR) 1064 (e.g., of FIG. 1J) via at least one network 1042 using at least one message 1044 (e.g., both of FIG. 1I). A guarantor 1062 may provide at least one TMR 1064 (e.g., of FIG. 1J) to at least one guaranty transaction marketplace 1040 (e.g., of FIGS. 1J and 1I). For certain example embodiments, a TMR 1064 may be provided in response to (e.g., based on an analysis of, in order to answer, after, to match a noted transaction characteristic of, or a combination thereof, etc.) a TMS 1038. By way of example only, a transaction marketplace message (TMM) 1066 may comprise or include a TMS 1038, a TMR 1064, some combination thereof, or so forth.

With reference to FIGS. 1N, 1O, 1P, and 1Q, an exploded view of an example guaranty transaction marketplace 1040 is illustrated by an elliptical shape formed from a dashed line. An API 1046*a* is shown at FIG. 1O. Although API 1046*a* is depicted apart or separate from hardware elements in FIG. 1O, an API 1046—such as an API 1046*a*—may be realized, constituted, implemented, or a combination thereof, etc. at least partially at, by, or using a server device 1036 of a financier 1034, a server device 1056 of a market maker 1058, a server device 1060 of a guarantor 1062, another server device or a mobile device that interacts with a guaranty system, some combination thereof, or so forth. As illustrated, API 1046*a* may receive or issue one or more inputs or outputs, which may include but are not limited to: a TMS 1038*a*, a TMS 1038*b*, a TMR 1064*a*, a TMR 1064*b*, or a TMR 1064*c*. For certain example implementations, a TMS 1038 may at least reference (e.g., include, be associated with, provide a link to, identify, or a combination thereof, etc.) at least one proffered guaranty transaction 1050 or at least one proffered transaction characteristic 1052. For certain example implementations, a TMR 1064 may at least reference (e.g., include, be associated with, provide a link to, identify, or a combination thereof, etc.) at least one proffered guaranty transaction 1050 or at least one proffered transaction characteristic 1052. As illustrated, a TMS 1038*a* may reference at least a proffered guaranty transaction 1050*a*, a TMS 1038*b* may reference at least a proffered transaction characteristic 1052*c*, a TMR 1064*a* may reference at least a proffered transaction characteristic 1052*a*, a TMR 1064*b* may reference at least a proffered transaction characteristic 1052*b*, or a TMR 1064*c* may reference at least a proffered guaranty transaction 1050*b*. For certain example implementations, a proffered transaction characteristic 1052 may at least reference (e.g., include, be associated with, provide a link to, identify, or a combination thereof, etc.) at least one guaranty 1054. As illustrated, a proffered transaction characteristic 1052*a* may reference at least a guaranty 1054*a*, a proffered transaction characteristic 1052*b* may reference at least a guaranty 1054*b*, or a proffered transaction characteristic 1052*c* may reference at least a guaranty 1054*c*. Although illustrated with a proffered transaction characteristic 1052 at least referencing a guaranty 1054, a guaranty 1054 may alternatively or additionally be at least referenced by a proffered guaranty transaction 1050, by both a proffered transaction characteristic 1052 and a proffered guaranty transaction 1050, by neither a proffered transaction characteristic 1052 nor a proffered guaranty transaction 1050, or so forth.

With reference to FIGS. 1N and 1O, multiple TMS 1038 and TMR 1064 are shown. For certain example embodiments, at least one of a TMS 1038 or a TMR 1064 may be injected into a guaranty transaction marketplace 1040 by at least one of a financier 1034 or a guarantor 1062. In one illustrated example, a financier 1034 (e.g., of FIG. 1E) may provide a TMS 1038*a* that at least references a proffered guaranty transaction 1050*a* to a guaranty transaction marketplace 1040 via an API 1046*a*. A first guarantor 1062 (e.g., of FIG. 1J, 1K, or 1L) may responsively provide a TMR 1064*a* that at least references a proffered transaction characteristic 1052*a*, which may match a transaction characteristic that is indicated by proffered guaranty transaction 1050*a*, to guaranty transaction marketplace 1040 via API 1046*a*. A second guarantor 1062 (e.g., of FIG. 1J, 1K, or 1L) may responsively provide a TMR 1064*b* that at least references a proffered transaction characteristic 1052*b*, which may also match a same or a different transaction characteristic that is indicated by proffered guaranty transaction 1050*a*, to guaranty transaction marketplace 1040 via API 1046*a*. By way of example only, proffered guaranty transaction 1050*a* may indicate that a product transaction 1018 involves Kevin Jorgensen, Ralph's Sporting Goods, and a pogo stick; proposed transaction characteristic 1052*a* may indicate that Kevin Jorgensen has a smartphone that is located no more than 50 meters from a Ralph's Sporting Goods store; and proposed transaction characteristic 1052*b* may indicate that Kevin Jorgensen has five social network members to which he is linked (e.g., that are friends) that have been posting about using pogo sticks during the last 14 days.

In another illustrated example, a guarantor 1062 (e.g., of FIG. 1J, 1K, or 1L) may provide a TMS 1038*b* that at least references a proffered transaction characteristic 1052*c*, which may pertain to a particular user 1002, a particular merchant 1012, a particular location, a type of payment tool, a kind of good, a category of service, or a combination thereof, etc., to a guaranty transaction marketplace 1040 via an API 1046*a*. A financier 1034 (e.g., of FIG. 1E) may responsively provide a TMR 1064*c* that at least references a proffered guaranty transaction 1050*b*, which may match a transaction characteristic—such as user, merchant, location, type of payment tool, kind of good, category of service, or a combination thereof, etc.—that is indicated by proffered transaction characteristic 1052*c*, to guaranty transaction marketplace 1040 via API 1046*a*. By way of example only, proffered transaction characteristic 1052*c* may indicate that a would-be guarantor knows or is able to determine a location of a particular individual, say Sally Wilde, with sufficient certainty that the would-be guarantor may be willing to provide a guaranty 1054*c* for a product transaction involving Sally Wilde; proffered guaranty transaction 1050*b* may indicate that a financier is seeking a guaranty (e.g., guaranty 1054*c*) for a product transaction involving Sally Wilde.

With reference to FIG. 1P, a guaranty transaction 1068 is illustrated, by way of example, as a circular shape formed from at least one proffered guaranty transaction 1050 or at least one proffered transaction characteristic 1052. For certain example implementations, a guaranty transaction 1068 may be established, agreed to, formed, or a combination thereof, etc. if at least one proffered guaranty transaction 1050 is matched to a proffered transaction characteristic 1052, or vice versa. For certain example implementations, a guaranty transaction 1068 may be established, agreed to, formed, or a combination thereof, etc. if at least one negotiation 1048 results in or reaches a point that one or more terms 1070 corresponding to at least one financier 1034 or 1108 match one or more terms 1070 corresponding to at least one guarantor 1062 or 1108. As shown, a guaranty transaction 1068 may at least reference at least one fee 1072, at least one guaranty 1054, at least one guarantee type 1074, some combination thereof, or so forth. For certain example implementations, a fee 1072 may comprise or include a value being actually or effectively transferred from a financier 1034 to a guarantor 1062 in exchange for a guaranty 1054. Example forms of a fee 1072 may comprise or include, but are not limited to, at least one monetary payment, at least one credit or debit allocation, one or more program points, some data disclosure or sharing, advertising allowance or obligation, priority processing, prominent placement, a discount (e.g., on a valuation of a product transaction), some combination thereof, or so forth. Although illustrated with a proffered guaranty transaction 1050 at least referencing a fee 1072, a fee 1072 may alternatively or additionally be at least referenced by a proffered transaction characteristic 1052, by both a proffered transaction characteristic 1052 and a proffered guaranty transaction 1050, by neither a proffered transaction characteristic 1052 nor a proffered guaranty transaction 1050, or so forth. Additionally or alternatively, a fee 1072 may develop for a guaranty transaction 1068 overall as a result of a negotiation 1048 over one or more terms 1070, as a consequence of one or more rules or guidelines of a guaranty transaction marketplace 1040, some combination thereof, or so forth.

For certain example embodiments, a guaranty transaction 1068, a proffered transaction characteristic 1052, a proffered guaranty transaction 1050, or a combination thereof, etc. may correspond to or at least reference at least one guarantee type 1074, which may define, categorize, describe, indicate, or a combination thereof, etc. a type of guaranty 1054 ascribed to at least guaranty transaction 1068. Examples of a guarantee type 1074 may comprise or include, but are not limited to, a non-contingent guarantee type 1074N, a contingent guarantee type 1074C, some combination thereof, or so forth. For certain example implementations, a non-contingent guarantee 1074N may obligate a guarantor 1062 to ensure that a merchant 1012 or a financier 1034 is paid or made whole regardless of a reason for non-payment by a customer 1002 (e.g., of FIG. 1G, 1H, or 1M). For certain example implementations, a contingent guarantee 1074C may obligate a guarantor to be responsible for payment if at least one condition, reason, justification, event, or a combination thereof, etc. occurs, is demonstrated, is evidenced, is proven to a given level of certainty, some combination thereof, or so forth. Examples of a contingency may comprise or include, but are not limited to, a customer 1002 disputes 1084D a product transaction 1018 (e.g., of FIG. 1B) with a vendor 1012 (e.g., of FIG. 1C) due to an alleged breach by vendor 1012 or an alleged failure of an associated product 1016, a user 1002 repudiates 1084R a product transaction 1018 due to allegedly having not participated in or authorized at least a portion of the transaction, a user 1002 or a financier 1034 demonstrates that user 1002 did not request or authorize a product transaction 1018, a user 1002 or a financier 1034 provides evidence that a transaction characteristic 1026 that a guarantor 1062 corroborated is (or was at a time of a product transaction) false, some combination thereof, or so forth.

For certain example embodiments, one or more terms 1070, such as a contingent 1074C or a non-contingent 1074N guarantee type 1074, may be negotiated as part of at least one negotiation 1048 between or among at least one financier 1034 and one or more potential guarantors 1062. One or more additional or alternative terms 1070 may be subject to negotiation 1048. Examples for at least one term 1070 may comprise or include, but are not limited to, a fee 1072 (e.g., size, delivery mode, delivery timing, type, or a combination thereof, etc.), amount of reimbursement or payment (e.g., percentage of valuation 1024 (e.g., of FIG. 1B)), timing of fee or reimbursement payment (e.g., immediately, within 30 days, upon customer repudiation, after investigation of a disagreement, or a combination thereof, etc.), what or how much data may be exchanged (e.g., transaction characteristic missing, confirmation by guarantor of transaction characteristic asserted by financier—which may involve less disclosure by a guarantor, missing transaction characteristic supplied by guarantor—which may involve a greater disclosure by a guarantor, or a combination thereof, etc.), how a disagreement—such as a dispute or a repudiation—is handled (e.g., automated, manually, order of events, who handles, mediator or arbitrator as decider, or a combination thereof, etc.), who handles a disagreement (e.g., financier, merchant, guarantor, background check provider, or a combination thereof, etc.), whether it is a separate guaranty or part of a bundle of guaranties, granularity or specificity (e.g., SPS coordinates versus zip code with respect to location, Italian food versus two-frequently-patronized Italian restaurants with respect to dining preference, or a combination thereof, etc.), some combination thereof, or so forth.

For certain example implementations, a negotiation 1048 may include, entail, facilitate, or a combination thereof, etc. the communicating, making, providing, accepting, establishing, presenting, or a combination thereof, etc. of at least one offer 1076O, at least one counter-offer 1076CO, at least one offer 1076 (not explicitly shown, but which may include at least one offer 1076O or at least one counter-offer 1076CO), at least one acceptance 1078, some combination thereof, or so forth. By way of example only, an acceptance 1078 of an offer 1076O or a counter-offer 1076CO may result in or establish a guaranty transaction 1068. For certain example implementations, a negotiation 1048 may include or utilize at least one auction 1080 (e.g., including a traditional auction or a reverse auction) if multiple financiers 1034 or multiple potential guarantors 1062 are attempting to establish a guaranty transaction 1068. An auction 1080 may include one or more bids 1082 (e.g., from one or more potential guarantors 1062, from one or more financiers 1034 intending to attain some level of assurance with respect to at least one product transaction, or a combination thereof, etc.) with differing terms 1070, such as a reduced fee 1072 or a guaranty 1054 having one or more terms that are more favorable to a financier 1034 (e.g., more data disclosure by a guarantor or a lower probative bar to paying on a contingent guaranty).

For certain example implementations, an API 1046b may expose any one or more of a number of facets or inputs or outputs or calls for a guaranty transaction marketplace 1040. Examples of exposed interfaces may comprise or include, but are not limited to, confirmation, information, payment, result, fee, some combination thereof, or so forth. By way of example only, a confirmation call may relate to or pertain to a situation in which a financier 1034 (e.g., of FIG. 1E) offers to pay a fee if a guarantor 1062 (e.g., of FIG. 1J, 1K, or 1L) or a data provider 1102 (e.g., of FIG. 1R) is willing to confirm at least one transaction characteristic 1026 (e.g., of FIG. 1B) specified by financier 1034, possibly in conjunction with or in exchange for at least one guaranty 1054. By way of example only, an information call may relate to or pertain to a situation in which a financier 1034 offers to pay a fee if a guarantor 1062 or a data provider 1102 is willing to supply at least one transaction characteristic 1026 or at least one customer characteristic (e.g., current location, identified social network links, interest(s) as per at least one search history, interest(s) as per one or more social network postings, travel history, or a combination thereof, etc. for a customer that is attempting to engage in at least one product transaction 1018 (e.g., of FIG. 1B)) that may corroborate at least one transaction characteristic 1026, possibly in conjunction with or in exchange for at least one guaranty 1054. By way of example only, a result interface of an API 1046b may relate to or pertain to an output from an attempt to form or attain a guaranty transaction 1068. Results may comprise or include, but are not limited to, a guaranty transaction 1068, an indication of failure, an indication of incomplete status, one or more terms 1070, at least one counter-offer 1076$CO_3$ at least one acceptance 1078, at least one guarantee type 1074, one or more transaction marketplace responses 1064, some combination thereof, or so forth. By way of example only, a payment interface of an API 1046b may relate to or pertain to an amount of a fee, how a fee is to be paid or received, an actual transfer (e.g., an electronic funds transfer (EFT)) of a fee, one or more options for payment of a fee, some combination thereof, or so forth.

With reference to FIG. 1Q, at least one disagreement 1084 is illustrated as part of a guaranty transaction marketplace 1040. Examples of a disagreement 1084 may comprise or include, by way of example but not limitation, at least one dispute 1084D, at least one repudiation 1084R, some combination thereof, or so forth. However, a disagreement (e.g., dispute or repudiation) handling mechanism may additionally or alternatively be realized, established, implemented, or a combination thereof, etc. at least partially separately from a guaranty transaction marketplace 1040. For certain example implementations, a disagreement 1084 may arise between or among a user 1002 (e.g., of FIGS. 1G and 1H), a merchant 1012 (e.g., of FIG. 1C), a financier 1034 or 1108 (e.g., of FIG. 1E or 1F), or a combination thereof, etc. with respect to an aspect of a product transaction 1018 (e.g., of FIG. 1B), including but not limited to an agreed-upon valuation, a quality of product in absolute terms, a quality of product relative to merchant representations, a quantity of product, whether or how payment was made or was to be made, delivery timing or location or mechanism, actual involvement of a user in a transaction, a user request for or approval of a transaction, some combination thereof, or so forth. For certain example implementations, a dispute 1084D may relate to a disagreement between at least a customer 1002 or a vendor 1012 as to cost, quality, quantity, delivery, or a combination thereof, etc. of a product 1016 (e.g., of FIG. 1B) if a customer 1002 agrees that a product transaction is or was intended. For certain example implementations, a repudiation 1084R may relate to a disagreement between or among at least a user 1002, a vendor 1012, or a financier 1034 with respect to an alleged product transaction 1018 if a user 1002 disagrees that he or she ever entered into or approved the alleged product transaction.

For certain example embodiments, a guarantor 1062 may be, as part of an obligation arising from at least one guaranty 1054 (e.g., of FIG. 1P), at least partially responsible for handling at least one disagreement 1084, including but not limited to at least one dispute 1084D or at least one repudiation 1084R. A server device 1060 of a guarantor 1062 (e.g., of FIG. 1J, 1K, or 1L) may interact with, for example, a server device 1036 of a financier 1034 (e.g., of FIG. 1E), a payment authorization apparatus 1014 of a merchant 1012 (e.g. of FIG. 1C), a mobile device 1004 of a user 1002 (e.g., of FIG. 1G, 1H, or 1M), a server device 1124 of a background information possessor 1126 (e.g., of FIG. 1G), some combination thereof, or so forth. One or more manual or automated processes may be utilized to investigate (e.g., in an attempt to corroborate, verify, refute, disprove, or a combination thereof, etc.) at least one assertion by a user 1002, a merchant 1012, a financier 1034, some combination thereof, or so forth.

With reference to FIG. 1K, a transaction marketplace response (TMR) 1064 is shown in relation to a bi-directional arrow between a guaranty transaction marketplace 1040 (e.g., of FIG. 1I or 1J) and a server device 1036 of a financier 1034 (e.g., of FIG. 1E). For certain example embodiments, a TMR 1064 may be returned by, from, via, using, or a combination thereof, etc. a guaranty transaction marketplace 1040 to a financier 1034, such as in response to a transaction marketplace submission (TMS) 1038. For certain example implementations, as indicated at a blurb 2014, a TMR 1064 may be accepted by a server device 1036 of a financier 1034 via a return message, an API output, some combination thereof, or so forth. For a described example, a TMR 1064 may include an affirmative indication that a guaranty transaction 1068 is established that at least references a guaranty 1054. For certain example implementations, as indicated at a blurb 2016, a TMR 1064 may comprise or include: (1) at least one negotiated guaranty transaction 1068 (e.g., of FIG. 1P), (2) at least one confirmation (e.g., a verification or a refutation of data submitted by a financier), (3) at least some information (e.g., an answer to a submitted inquiry), (4) at least one payment (e.g., a funds transfer or evidence thereof), some combination thereof, or so forth.

With reference to FIGS. 1E, 1D, and 1C, a financier 1034 (e.g., of FIG. 1E) may communicate at least one authorization answer 1086 (e.g., of FIG. 1D) to a merchant 1012 (e.g., FIG. 1C). For example, a server device 1036 of a financier 1034 may send an authorization answer 1086 to a payment authorization apparatus 1014 of a merchant 1012. For certain example implementations, an authorization answer 1086 may comprise or include one or more transaction characteristics 1026 for a product transaction 1018, such as at least a product transaction identification; an affirmative or negative indication with respect to approval; an instruction to secure at least one additional form of identification from a customer 1002; a description of one or more terms 1070 of a guaranty transaction 1068 (e.g., of FIG. 1P); some combination thereof; or so forth. At least if an affirmative indication is sent via an authorization answer 1086, a product transaction 1018 (e.g., of FIG. 1B) may be consummated, or a merchant 1012 may consider a bill of a customer 1002 to be paid or otherwise covered.

With reference to FIGS. 1C and 1I, for certain example implementations, as indicated by a blurb 2018, a merchant/vendor 1012 may "bypass" a financier, such as a credit card company, or interact "directly" with at least one guaranty transaction marketplace 1040. For example, a merchant/vendor 1012 may provide (e.g., inject) at least one TMS 1038 or accept (e.g., extract) at least one TMR 1064 to or from at least one guaranty transaction marketplace 1040 to thereby attempt to secure at least one guaranty 1054 (e.g., of FIG. 1J) from a guarantor 1062 (e.g., of FIG. 1J, 1K, or 1L) without relying on a financier 1034 (e.g., of FIG. 1E) as an intermediary or to thereby attempt to provide at least one guaranty 1054 as a guarantor (e.g., as also depicted in FIG. 1L).

With reference to FIGS. 1H and 1I, for certain example implementations, as indicated by a blurb 2020, a user/customer 1002 may "bypass" a financier, such as a credit card company, or interact "directly" with at least one guaranty transaction marketplace 1040. For example, at least one operating system (OS) or at least one application of a mobile device 1004 may provide (e.g., inject) at least one TMS 1038 or accept (e.g., extract) at least one TMR 1064 to or from at least one guaranty transaction marketplace 1040 to thereby attempt to secure a guaranty 1054 (e.g., of FIG. 1J) from a guarantor 1062 (e.g., of FIG. 1J, 1K, or 1L) without relying on a financier 1034 (e.g., of FIG. 1E) as an intermediary. A guaranty 1054 may be presented (e.g., displayed, sent wirelessly, transferred, or a combination thereof, etc.) to a merchant/vendor 1012 to facilitate consummation of a product transaction 1018 via a mobile device 1004 or separately therefrom.

With reference to FIGS. 1H, 1I, and 1J, for certain example implementations, as indicated by a blurb 2022, a user/customer 1002 may "directly" interact with at least one guarantor 1062, such as a pre-positioned data possessor 1062PP (e.g., of FIG. 1J), without using a guaranty transaction marketplace 1040 as an intermediary. For example, a user 1002 may pre-notify a would-be guarantor 1062, such as a pre-positioned data possessor 1062PP, of a likely activity or purchase by sending pre-notification data 1088 (e.g., which may include a category, an item identifier, a location, a store, a maximum monetary value, a timing, or a combination thereof, etc.) from a mobile device 1004 (or another device) to a server device 1060 of a pre-positioned data possessor 1062PP as at least one message 1044 via at least one network 1042. In exchange for an opportunity to provide a guaranty 1054 or to collect a fee 1072 (e.g., of FIG. 1P) with likely lowered risk, a pre-positioned data possessor 1062PP may agree to provide a guaranty 1054 if or when a financier 1034 submits a corresponding proffered guaranty transaction 1050 to a guaranty transaction marketplace 1040. At times, a user 1002 may be unable to pre-notify a guarantor 1062 due to planning or scheduling constraints or may be unable to ascertain a guarantor willing to take on the risk or hassle of a pre-notification agreement. For such times, by way of example only, a data stream associated with a user 1002 may be tapped by one or more potential guarantors 1062 (e.g., of FIG. 1J, 1K, or 1L) in order to obtain corroborating evidence for at least one transaction characteristic 1026.

With reference to FIG. 1S, 1T, 1U, 1V, 1W, or 1X, an example data stream 1090 is depicted by a pipe shape or a bi-directional arrow that each extend from FIG. 1S across FIGS. 1T-1W to FIG. 1X. As illustrated, a data stream 1090 may include, provide access to, organize, funnel, or a combination thereof, etc. data across different spatial regions (e.g., as a mobile device travels), across different temporal periods (e.g., as time elapses), across different network or cloud zones (e.g., search, mapping or navigation, social networks, picture sharing, data storage, or a combination thereof, etc.), across different categories (e.g., family, work interests, hobbies, entertainment, or a combination thereof, etc.), some combination thereof, or so forth. For certain example embodiments, one or more potential guarantors 1062 (e.g., of FIG. 1J, 1K, or 1L) may access a data stream 1090 continuously, intermittently, at regular intervals, irregularly, randomly, in response to a stimulus, as new data is added, on-demand (e.g., to attempt to secure corroborating evidence to match a proffered guaranty transaction), in a push manner, in a pull manner, some combination thereof, or so forth.

For certain example implementations, at least one data stream 1090 may include data from multiple different data stream environments 1092 (not explicitly shown separately). Example data stream environments 1092 may comprise or include, but are not limited to, at least one mobile device environment 1092M, at least one internet environment 1092I, at least one wireless network environment 1092W, some combination thereof, or so forth. For certain example implementations, at least one data stream 1090 may include mobile device data 1094, cloud data 1096, mobile service data 1098, some combination thereof, or so forth. By way of example but not limitation, cloud data 1096 may include social network data 1096SN. For certain example implementations, mobile device data 1094 may be obtained via at least one mobile device environment 1092M; cloud data 1096 may be obtained via at least one internet environment 1092I; and mobile service data 1098 may be obtained via at least one wireless network environment 1092W. By way of example but not limitation, mobile device data 1094 may comprise or include data that is detected at a mobile device from a sensor (e.g., an inertial measurement unit (IMU), a satellite positioning system (SPS) unit, a radio, a camera, a magnetometer, or a combination thereof, etc.) or a user input feature (e.g., a touchscreen, a keyboard, a microphone, a camera, or a combination thereof, etc.), such as SPS coordinates, radio signals, keyboard input, user motions, some combination thereof, or so forth. By way of example but not limitation, cloud data 1096 may comprise or include data that is sent over or stored at a cloud-based server or service, such as social network data, search data, remotely-accessed media, app data, some combination thereof, or so forth. By way of example but not limitation, social network data 1096SN may comprise or include data sent to or received from at least one social network (e.g., Facebook, Google+, LinkedIn, MySpace, Pinterest, Classmates[dot]com, Foursquare, Orkut, Twitter, Flickr, Instagram, or a combination thereof, etc.), such as a public or private message, a posting, text, a link, an image, a tweet, some combination thereof, or so forth. By way of example but not limitation, mobile service data 1098 may comprise or include data that may be obtained by a wireless service provider from network infrastructure information or by providing a conduit to the internet, such as a location from trilateration using multiple cell towers, dialed or texted numbers, plain text wireless communications, detected internet communications, some combination thereof, or so forth.

With reference to FIG. 1K or 1Q, a guarantor server device 1060 for a social network 1062SN or a guarantor server device 1060 for a data possessor 1062DP may be capable of interacting with a guaranty transaction marketplace 1040 (e.g., of FIG. 1I or 1J) by providing or accepting a TMS 1038 or a TMR 1064 (e.g., of FIG. 1J). For certain example embodiments, a guarantor server device 1060 for a social network 1062SN or a guarantor server device 1060 for a data possessor 1062DP may be capable of interacting with (e.g., tapping into) at least one data stream 1090 (e.g., of FIGS. 1S-1X). For certain example implementations, as indicated by a blurb 2024, a potential guarantor 1062 (e.g., a social network guarantor 1062SN, a data possessor guarantor 1062DP, or a combination thereof, etc.) may obtain one or more indicia to potentially corroborate at least one transaction characteristic by tapping into a flow of data stream 1090, such as with at least occasional monitoring, with at least intermittent monitoring, with at least regular or periodic monitoring, with monitoring responsive to triggering events, with on-demand monitoring (e.g., if a proffered guaranty transaction 1050 is injected into a guaranty transaction marketplace 1040), with direct interrogation of a mobile device associated with a data stream 1090, some combination thereof, or so forth. By way of example but not limitation, a social network guarantor 1062SN may be capable of accessing social network data 1096SN as indicated by a line depicted there between. By way of example but not limitation, a data possessor 1062DP may be capable of accessing cloud data 1096 or mobile service data 1094 as indicated by at least one line depicted there between (or including a transition oval labeled "A" between FIGS. 1Q and 1T).

With reference to FIG. 1R, a server device 1100 for a data provider 1102 is illustrated. For certain example embodiments, a data provider 1102—such as a wireless service provider, a data amalgamator like a research or marketing company, a retail company, an internet company, or a cloud services company—may furnish data to a potential guarantor 1062. Although a line is explicitly depicted between a data provider 1102 (e.g., of FIG. 1R) and a data possessor 1062DP (e.g., of FIG. 1K), other types of potential guarantors 1062 (e.g., a social network 1062SN (e.g., of FIG. 1K), a wireless service provider 1062WS (e.g. of FIG. 1L), a merchant/vendor 1012 (e.g., of FIG. 1L), or a combination thereof, etc.) may additionally or alternatively obtain one or more potentially corroborating indicia from a server device 1100 of a data provider 1102. For certain example implementations, as indicated at a blurb 2026, a data provider 1102 operating a server device 1100, such as wireless service provider having one or more estimated locations derived from trilateration, may provide location or other data to a data possessor 1062DP who is attempting or planning to provide a guaranty 1054 (e.g., of FIG. 1J) for a product transaction 1018 (e.g., of FIG. 1B).

With reference to FIG. 1L or 1R, a guarantor server device 1060 for a wireless service provider 1062WS may be capable of interacting with a guaranty transaction marketplace 1040 (e.g., of FIG. 1I or 1J) by providing or accepting a TMS 1038 or a TMR 1064 (e.g., of FIG. 1J). For certain example embodiments, a guarantor server device 1060 for a wireless service provider 1062WS may be capable of interacting with (e.g., tapping into) at least one data stream 1090 (e.g., of FIGS. 1S-1X). For certain example implementations, a guarantor server device 1060 of a wireless service provider 1062WS may obtain one or more indicia to potentially corroborate at least one transaction characteristic by tapping into a flow of data stream 1090, such as with at least occasional monitoring, with at least intermittent monitoring, with at least regular or periodic monitoring, with monitoring responsive to triggering events, with on-demand monitoring (e.g., if a proffered guaranty transaction 1050 is injected into a guaranty transaction marketplace 1040), with direct interrogation of a mobile device associated with a data stream 1090, via interrogation of or data collection from one or more network elements 1104 (e.g., of FIG. 1R), some combination thereof, or so forth. By way of example but not limitation, a wireless service provider 1062WS may be capable of accessing mobile service data 1098 (e.g., of FIG. 1W or 1X) as indicated by a line depicted there between, may be capable of communicating with one or more network elements 1104 as indicated by a line depicted there between, some combination thereof, or so forth. For certain example implementations, as indicated by a blurb 2028, a network element 1104 may comprise or include an antenna, a base station (BS), an access point (AP), a base transceiver station (BTS), a node B, a mobile switching center (MSC), a home location register (HLR), a gateway (Gw), a gateway switching center, a base station subsystem (BSS), a base station controller (BSC), a network management system node, a media gateway (MGw), a visitor location register (VLR), some combination thereof, or so forth.

For certain example embodiments, at least one network element 1104 may directly or indirectly communicate with at least one mobile device 1004 via at least one wireless link 1110, with or without one or more wireline or wired links (not explicitly shown) over at least one network, such as a wired portion or implementation of a network 1042 (e.g., of FIG. 1I or 1N). For certain example implementations, one or more network elements 1104 may forward or otherwise provide at least a portion of data that propagates to or from, that traverses, that is stored at or by, or a combination thereof, etc. at least one network element 1104 to a wireless service provider 1062WS, may forward or otherwise provide location data to a wireless service provider 1062WS, some combination thereof, or so forth. Location data may comprise or include, by way of example but not limitation, a current cell identification, a location estimated from one or more base stations (e.g., trilateration), at least one estimated range from a network element 1104 to a mobile device 1004, at least one signal strength or signal delay time with respect to a mobile device 1004, one or more satellite positioning system (SPS) coordinates, a block or neighborhood identification, a city identification, a region derived from communication with at least one fixed antenna, a history of any of the above, some combination thereof, or so forth.

With reference to FIG. 1L, a guarantor server device 1060 for a merchant/vendor 1012 may be capable of interacting with a guaranty transaction marketplace 1040 (e.g., of FIG. 1I or 1J) by providing or accepting a TMS 1038 or a TMR 1064 (e.g., of FIG. 1J). For certain example embodiments, although not explicitly shown (e.g., no line is depicted), a guarantor server device 1060 for a merchant/vendor 1012 may be capable of interacting with (e.g., tapping into) at least one data stream 1090 (e.g., of FIGS. 1S-1X). Additionally or alternatively, a merchant/vendor 1012 may obtain at least one corroborating indicium from another source, including but not limited to a detected presence of a user/customer 1002 on premises of a merchant/vendor 1012 (e.g., if a same merchant/vendor 1012) (e.g., via personal knowledge of a store associate, electronic facial recognition of a customer 1002, known recurring behavior of a customer, or a combination thereof, etc.), local interaction with a mobile device 1004 of a user/customer 1002, some combination thereof, or so forth. A guarantor server device 1060 for a merchant/vendor 1012 may comprise or include at least part of a payment authorization apparatus 1014 (e.g., of FIG. 1C), or vice versa.

With reference to FIG. 1F, a server device 1106 for a combined financier and guarantor 1108 may be operated to provide at least one payment or guaranty. For certain example embodiments, a combined financier and guarantor 1108 (e.g., a combined funding source and wireless service provider) may function as a financier 1034 (e.g., of FIG. 1E) that interacts with a transaction guaranty marketplace 1040 (e.g., of FIGS. 1I and 1J), may function as guarantor 1062 (e.g., of FIG. 1J) that interacts with a transaction guaranty marketplace 1040, may function as a financier and guarantor that at least selectively bypasses a transaction guaranty marketplace 1040, some combination thereof, or so forth. For certain example implementations, a server device 1106 of a combined financier and guarantor 1108 may receive an authorization request 1032 (e.g., of FIG. 1D), which at least references one or more transaction characteristics 1026, from a payment authorization apparatus 1014 (e.g., of FIG. 1C), which may be located at a point of sale (POS) of a merchant/vendor 1012 (e.g., of FIG. 1C). A combined financier and guarantor 1108 may obtain one or more indicia that corroborate at least one transaction characteristic 1026, such as from at least one data stream 1090 (e.g., of FIGS. 1S-1X) (not explicitly depicted), from at least one network element 1104 (e.g., of FIG. 1R) as indicated by a line depicted there between (e.g., a line also extending across FIG. 1L), some combination thereof, or so forth. If, for example, at least one corroborating indicium is obtained, a server device 1106 of a combined financier and guarantor 1108 may send an affirmative authorization answer 1086 (e.g., of FIG. 1D) to a payment authorization apparatus 1014 of a merchant/vendor 1012.

With reference to FIGS. 1F and 1R, for certain example implementations, as indicated by a blurb 2030, an entity providing calling capabilities or wireless internet service (e.g., cellular broadband) to a mobile device 1004 may make a decision with respect to at least one credit transaction or other product transaction 1018 (e.g., of FIG. 1B) based at least partially on information obtained via the mobile device (e.g., a mobile-device-determined location of the mobile device, a network-determined location of a mobile device, one or more websites visited using the mobile device, one or more people or stores contacted using the mobile device, or a combination thereof, etc.). By way of example only, a combined financier and guarantor 1108 (e.g., a combined funding source and wireless service provider) may make a payment to a merchant/vendor 1012 (e.g., of FIG. 1C) or authorize a product transaction 1018 on behalf of a user/customer 1002 (e.g., directly without involving a credit card company or bank of the user), may provide a guaranty to a merchant/vendor 1012 (e.g., without involving a credit card company or bank of the user or without utilizing a guaranty transaction marketplace), some combination thereof, or so forth. For certain example implementations, as indicated by a blurb 2032, an end-user license, a privacy policy explanation, a privacy policy delivery, or a combination thereof, etc. may be provided to a mobile device 1004 or accepted by a user via a mobile device 1004 (or via another device) with the license or policy pertaining to incorporating (e.g., utilizing, referring to, at least partially basing on, or a combination thereof, etc.) user data—including but not limited to location information or other information via at least one data stream—into at least one product transaction authorization decision, such as a credit or other financial decision. Upon acknowledgment or acceptance of a policy or a license or an agreement by an end-user, a combined financier and guarantor 1108 may approve or agree to finance product transactions based at least partially on one or more corroborating indicia obtained via at least one data stream 1090 (e.g., of FIGS. 1S-1X), including but not limited to privately-obtained information.

With reference to FIG. 1M, a user/customer 1002 and a mobile device 1004 are illustrated. For certain example embodiments, a mobile device 1004 may include at least one operating system 1112, at least one application 1114, some combination thereof, or so forth. By way of example but not limitation, an operating system 1112 (i) may exist between a BIOS and one or more applications 1114, (ii) may control access to or orchestrate use of one or more hardware features of a mobile device 1004, (iii) may manage or arbitrate access to system resources, (iv) some combination thereof, or so forth. An operating system 1112 may additionally or alternatively provide one or more features for a mobile device 1004. Examples of an operating system may include, but are not limited to, a Google or open-source Android operating system, a Microsoft Windows operating system (e.g., phone, tablet, notebook, desktop, or a combination thereof, etc.), a Google Chrome operating system, an Amazon Fire operating system, an Apple iOS operating system, an Apple MAC OS X operating system, a Ubuntu operating system, a Linux operating system, a UNIX operating system, a Samsung Bada or Tizen operating system, a derivative of any of the above, some combination thereof (including but not limited to a dual-boot environment), or so forth. By way of example but not limitation, an application 1114 may execute on top of an operating system or provide specialized capabilities to a user by programming a processor or further reconfiguring circuits of a mobile device. Examples of an application may include, but are not limited to, a program, executable code, a native application, a web application, a mobile cloud app, a hybrid application, a compiled application, a just-in-time (JIT) compiling set of instructions, an interpreted language application, a downloaded app, an installed app, one or more instructions, some combination thereof, or so forth.

For certain example embodiments, a mobile device 1004 may make one or more observations 1116 under control of at least one operating system 1112 or at least one application 1114. Observations 1116 may be made substantially continuously (e.g., at a rate that an input component is capable of operating), intermittently, at regular intervals, irregularly, randomly, in response to a stimulus, on-demand (e.g., in response to an inquiry received, such as from a potential guarantor 1062), when an app is accessed, in accordance with a geofence, in accordance with a schedule, some combination thereof, or so forth. For certain example implementations, an observation 1116 may comprise or include observations of user input 1116U, observations of sensor detection 1116S, some combination thereof, or so forth. By way of example but not limitation, a user input observation 1116U may comprise or include data acquired (e.g., detected) as a result of keyboard (e.g., physical or virtual) input, other touch input, microphone input, gesture or eye movement input, shaking or twisting input, some combination thereof, or so forth. Data of a user input observation 1116U may comprise or include, for example, spoken or typed words, websites visited, social network members interacted with, social network posts made or presented (e.g., viewed, played, read, or a combination thereof, etc.), people contacted, search terms, some combination thereof, or so forth. By way of example but not limitation, a sensor detection observation 1116S may comprise or include data acquired as a result of a satellite positioning system (SPS) unit, a radio or transceiver, a camera, a microphone, a touchscreen, an inertial measurement unit (IMU)—such as an accelerometer, a gyroscope, a compass, or a combination thereof, etc.—, a thermometer, some combination thereof, or so forth. Data of a sensor detection observation 1116S may comprise or include, for example, an SPS coordinate, a Wi-Fi service set identifier (SSID), a gravitational direction, an acceleration magnitude or direction, a velocity, a sound file, a photographic image, some combination thereof, or so forth.

For certain example implementations, one or more observations 1116 that are acquired by a mobile device 1004 may be provided (e.g., forwarded, propagated, or a combination thereof, etc.) to at least one data stream 1090 (e.g., of FIGS. 1S-1X) as indicated by arrow 1118. By way of example but not limitation, as indicated at a blurb 2034, a mobile device 1004 may provide one or more observations 1116 to a data stream 1090 (e.g., sua sponte, as part of a standard operation for implementing a communication or other function, as per a guarantor-associated application or operating system, as part of an unassociated application or operating system, in response to a specific interrogation from a guarantor, etc.). For example, a mobile device may provide GPS coordinates in a context of executing a navigational application or implementing an operating system feature. As another example, a mobile device may provide (i) search terms or (ii) social network exchanges in a context of executing (i) a browser capability or a search application or (ii) a browser capability or a social network application, respectively. Although a potential guarantor 1062 may obtain corroborating indicia from a data stream 1090, it may additionally or alternatively obtain at least one corroborating indicium via at least one interrogation of a mobile device.

With reference to FIG. 1M or 1N, an example interrogation scenario is illustrated. For certain example embodiments, at least one guarantor server device 1060 may communicate with at least one mobile device 1004 using one or more messages 1044 via at least one network 1042 as indicated by a line depicted there between (e.g., across FIGS. 1M and 1N). By way of example but not limitation, a guarantor service device 1060 may correspond to at least one pre-positioned data possessor 1062PP (e.g., of FIG. 1J), at least one social network 1062SN (e.g., of FIG. 1K), at least one data possessor 1062DP (e.g., of FIG. 1K), at least one wireless service provider 1062WS (e.g., of FIG. 1L), at least one merchant/vendor 1012 (e.g., of FIG. 1L), some combination thereof, or so forth (e.g., including a combined financier and guarantor 1108 (e.g., of FIG. 1F) or a data provider 1102 (e.g., of FIG. 1R)). For certain example implementations, a guarantor server device 1060 may send an inquiry 1120 to a mobile device 1004, including but not limited to if or as a result of receiving notification of an existence of a proffered guaranty transaction 1050 (e.g., of FIG. 1I). By way of example but not limitation, an inquiry 1120 may request at least one observation 1116, such as a (e.g., contemporaneous, past, historical trend, or a combination thereof, etc.) of a user input observation 1116U or a sensor detection observation 1116S. For example, one or more SPS coordinates, a current photo of a current user 1002, an answer to a question based on a recent social network posting, a password or code, an answer to a question based on a last five recent email interactions, an identification of a location of another mobile device associated with a user/customer 1002 that is associated with a mobile device 1004 receiving an inquiry 1120, a listing of currently-detectable SSIDs, or a combination thereof, etc. may be requested.

For certain example implementations, a mobile device 1004, such as an operating system 1112 or an application 1114 thereof, may obtain requested data in response to an inquiry 1120 using, for example, at least one user input observation 1116U, at least one sensor detection observation 1116S, some combination thereof, or so forth. By way of example but not limitation, an answer to an inquiry 1120 may be returned from a mobile device 1004 to a server device 1060 as at least one inquiry response 1122. For certain example implementations, an inquiry 1120 or an inquiry response 1122 may additionally or alternatively be accomplished using one or more protocols, mechanisms, communication avenues, or a combination thereof, etc. that are available as part of a data stream 1090 (e.g., of FIGS. 1S-1X).

For certain example implementations, as indicated at a blurb 2036, a guarantor 1062 (e.g., of FIG. 1J, 1K, or 1L) may send at least one inquiry 1120 to interrogate at least one mobile device 1004. An interrogation may be initiated, for example, intermittently, at regular intervals, in response to at least one stimulus, in response to at least one trigger—such as a discovery of a proffered guaranty transaction 1050 (e.g., of FIG. 1I) at a guaranty transaction marketplace 1040 (e.g., of FIG. 1I or 1J), on-demand (e.g., in real-time), randomly, some combination thereof, or so forth. By way of example but not limitation, as indicated at a blurb 2038, a mobile device 1004 may send an inquiry response 1122 to a server device 1060 as at least one message 1044 via at least one network 1042. An application 1114 or an operating system 1112 may send a response to an inquiry 1120—such as an inquiry response 1122—with or without a user's input or with or without a user's at least contemporaneous knowledge or permission.

With reference to FIG. 1G, a server device 1124 for a background check provider and a background information possessor 1126 are illustrated. For certain example embodiments, a background information possessor 1126 may be capable of providing, responsible for providing, or adapted to provide information that may be relevant to a guaranty transaction marketplace 1040 (e.g., of FIGS. 1I and 1J). For example, a background information possessor 1126 may provide information on a user/customer 1002 that is signing up to participate in a transaction guaranty marketplace 1040 (i) directly (e.g., with a market maker 1058 (e.g., of FIG. 1I)) or (ii) through a financier 1034 (e.g., a bank or credit card company) (e.g., of FIG. 1E) or a potential guarantor 1062 (e.g., a potential guarantor 1108, 1062PP, 1062SN, 1062DP, 1062WS, or 1012 of FIG. 1F, 1J, 1K, or 1L); may provide information on a user/customer 1002 that is having a disagreement 1084 (e.g., of FIG. 1Q)—such as a dispute 1084D or a repudiation 1084R; may provide information on a merchant/vendor 1012 that is to participate in a guaranty transaction marketplace 1040 or is involved in a disagreement 1084; some combination thereof; or so forth. For certain example implementations, a background information possessor 1126 may have access to information or may commission efforts to acquire information that evidences a veracity or a falseness of an assertion by a user/customer 1002, of an assertion by a merchant/vendor 1012 (e.g., of FIG. 1C), of a transaction characteristic 1026 (of FIG. 1B), some combination thereof, or so forth. For example, a background information possessor 1126 may investigate an assertion that a mobile device was stolen by researching police reports or verifying that a replacement mobile device was purchased or activated with a mobile service provider. As another example, a background information possessor 1126 may communicate with alleged witnesses evidencing a location of a user 1002 at a time of a product transaction 1018.

For certain example implementations, at least one background check provider server device 1124 may communicate with one or more of a guarantor server device 1060 (e.g., of FIG. 1J, 1K, or 1L), a financier server device 1036 (e.g., of FIG. 1E), a financier and guarantor server device 1106 (e.g., of FIG. 1F), a payment authorization apparatus 1014 (e.g., of FIG. 1C), a data provider server device 1100 (e.g., of FIG. 1R), a data stream 1090 (e.g., of FIGS. 1S-1X), or a combination thereof, etc. using at least one message 1044 via at least one network 1042 (e.g., of FIG. 1I) as indicated by a line extending there between (e.g., from FIG. 1G, across FIG. 1H, and to FIG. 1I). By way of example but not limitation, as indicated at a blurb 2040, a background check provider may discover evidence supporting or conflicting with an assertion by an alleged user/customer 1002 to have been in city "A" when a charge using a payment tool 1008 (e.g., of FIG. 1H) was made from city "B", which is located in a different state from city "A". For certain example implementations, a background information possessor 1126 may have access to credit history, to governmental records, to travel records (e.g., airport flight or security information, airline data, hotel information, or a combination thereof, etc.), some combination thereof, or so forth.

With reference to FIG. 1G, a device 1500 is shown. As illustrated, a device 1500 may include at least one or more of any of the following: at least one processor 1502, at least one medium 1504, at least one communication interface 1506, at least some circuitry 1508, some combination of thereof, or so forth. As further illustrated, a medium 1504 may comprise or include at least some instructions 1510. By way of example but not limitation, a device 1500 may comprise or include at least one mobile device 1004 (e.g., of FIG. 1G, 1H, 1M, or 1R); at least one payment authorization apparatus 1014 (e.g., of FIG. 1C); at least one server device 1036 (e.g., of FIG. 1E), 1106 (e.g., of FIG. 1F), 1124 (e.g., of FIG. 1G), 1056 (e.g., of FIG. 1I), 1060 (e.g., of FIG. 1J, 1K, 1L, or 1N), 1100 (e.g., of FIG. 1R); or so forth. However, a device 1500 may alternatively include more, fewer, or different component(s) from those that are illustrated without departing from claimed subject matter.

For certain example embodiments, a device 1500 may include or comprise at least one electronic device. A device 1500 may include, for example, a computing platform or any electronic device having at least one processor or memory. A processor 1502 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, one or more processing cores, discrete/fixed logic circuitry, controllers, micro-controllers, microprocessors, some combination thereof, or so forth. A medium 1504 may bear, store, contain, include, provide access to, or a combination thereof, etc. one or more instructions 1510, which may be executable by a processor 1502. Instructions 1510 may include or comprise or facilitate implementation of, by way of example but not limitation, a program, a module, an application or app (e.g., that is native, that runs in a browser, that runs within a virtual machine, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. A medium 1504 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions or data.

For certain example embodiments, execution of instructions 1510 by one or more processors 1502 may transform at least a portion of at least one device 1500 into a special-purpose computing device, apparatus, platform, machine, some combination thereof, or so forth. Instructions 1510 may include, for example, instructions that are capable of realizing at least a portion of one or more flow diagrams, methods, processes, procedures, operations, functionality, technology, mechanisms, or a combination thereof, etc. that are described herein or illustrated in the accompanying drawings.

For certain example embodiments, circuitry 1508 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 1508 includes at least one physical or hardware component or aspect. By way of example only, circuitry 1508 may be formed if one or more instructions 1510 configure or reconfigure at least one processor 1502 to enable at least one processor 1502 to perform one or more operations during execution of one or more instructions 1510.

For certain example embodiments, one or more communication interfaces 1506 may provide one or more interfaces between device 1500 and another device or a person/operator/entity directly or indirectly. With respect to a person/operator, a communication interface 1506 may include, by way of example but not limitation, a screen, a speaker, a keyboard or keys, a microphone, a camera, or other person-device input/output apparatuses. A wireless communication interface or a wired communication interface may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, or a combination thereof, etc.), a physical or logical network adapter or port, a frequency converter, a baseband processor, a photoreceptor, an infrared port, an Internet or telecommunications backbone connector, a fiber optic connector, a storage area network (SAN) connector, a local area network (LAN) connector, or a combination thereof, etc. to communicate wireless signals or wired signals via one or more wireless communication links or wired communication links, respectively, such as over at least one communication channel. Communications with at least one communication interface 1506 may enable transmitting, receiving, or initiating of transmissions, just to name a few examples.

For certain example embodiments, at least one power source (not explicitly shown) may provide power to one or more components of a device 1500. A power source may include, by way of example but not limitation, at least one battery, at least one power connector for a wall socket, at least one solar power source, at least one solar-powered charger, a mechanical power source or charger, a fuel source or cell, a power connector for accessing an electrical grid, some combination thereof, or so forth. For certain example embodiments, at least one sensor (not explicitly shown) may sense, produce, or otherwise provide at least one sensor value. A sensor may include, by way of example only, a camera, a microphone, an accelerometer, a thermometer, a satellite positioning system (SPS) sensor, a barometer, a humidity sensor, a compass, an altimeter, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), some combination thereof, or so forth. Values provided by at least one sensor may include, by way of example but not limitation, an image/video, a sound recording, an acceleration value, a temperature, one or more SPS coordinates, a barometric pressure, a humidity level, a compass direction, an altitude, a gyroscopic value, a magnetic reading, a pressure value, an oscillation value, an ambient light reading, inertial readings, touch detections, finger placements, flex detections, some combination thereof, or so forth.

With respect to certain example embodiments, an example applicable scenario is described with reference to multiple example annotations 2502 to 2538, which annotations are depicted by curly brackets or braces (e.g., "{ }") in FIGS. 1B-1X. However, other scenarios may alternatively or additionally be applicable. For an example annotation 2502 (e.g., of FIG. 1G), an (e.g., end) user 1002 named Sam may travel from one location to another—such as from one city or country to another city or country—carrying at least one mobile device 1004. For an example annotation 2504 (e.g., of FIG. 1H), user Sam may engage with a merchant 1012 (e.g., of FIG. 1C)—such as one that is at least affiliated with a restaurant called Sushi Sensation—to purchase a product 1016 (e.g., of FIG. 1B)—such as a meal—using a payment tool 1008—such as a credit card 1010, like a Mercury Credit Card.

For an example annotation 2506 (e.g., of FIG. 1C), a merchant 1012, which may be or may have a restaurant called Sushi Sensation that is located in a business district of Tokyo, Japan, is famous for its sushi. Sushi Sensation may provide a meal to Sam and seven (7) guests and may acknowledge Sam's attempt to pay for the meal with the Mercury Credit Card. For an example annotation 2508 (e.g., of FIG. 1D), the Tokyo sushi restaurant merchant of Sushi Sensation may send at least one authorization request 1032 to a Mercury Bank with one or more transaction characteristics 1026 of a product transaction 1018 (e.g., both of FIG. 1B)—such as an account name for Sam, an account number, an identity of the Sushi Sensation merchant or company thereof, a valuation of the transaction 1024 (e.g., of FIG. 1B), a location of the transaction 1028 (e.g., of FIG. 1B), a transaction identification, some combination thereof, or so forth.

For an example annotation 2510 (e.g., of FIG. 1E), Mercury Bank, as an example of a financier 1034, may experience (e.g., create, have, generate, receive, or a combination thereof, etc.) a fraud alert because a transaction for Sam's account was approved only eight (8) hours previously but over 1000 miles away in a different city and county (e.g., Shanghai, China). For an example annotation 2512 (e.g., of FIG. 1E), Mercury Bank injects a transaction marketplace submission (TMS) 1038 (e.g., of FIG. 1K) into a guaranty transaction marketplace 1040 (e.g., of FIGS. 1I and 1J), with TMS 1038 at least referencing an identification of Sam, an identification of the Sushi Sensation restaurant, a Tokyo location of the restaurant, a transaction valuation 1024 (e.g., of FIG. 1B)—such as $874 USD, some combination thereof, or so forth.

For an example annotation 2514 (e.g., of FIG. 1J), a negotiation 1048 may commence using at least one application programming interface (API) 1046 (e.g., of FIG. 1I) that is present at a server of Mercury Bank's (e.g., a financier server device 1036 (e.g., of FIG. 1E)), that is present at a server (e.g., a guarantor server device 1060) of one or more guarantor's 1062, some combination thereof, or so forth. For an example annotation 2516 (e.g., of FIG. 1N), a TMS 1038a (e.g., of FIG. 1O) may be associated with at least one proffered guaranty transaction (PGT) 1050a that is to be matched to at least one proffered transaction characteristic 1052 (e.g., of FIG. 1J). For an example annotation 2518 (e.g., of FIG. 1O), one or more would-be guarantor(s) 1062 may submit one or more transaction marketplace responses (TMR) 1064 (e.g., of FIG. 1J) that may be associated with one or more potentially-matching proffered transaction characteristics (PTC) 1052 (e.g., of FIG. 1J).

For an example annotation 2520 (e.g., of FIG. 1N), a social network 1062SN (e.g., of FIG. 1K) has at least one indicium of Sam's intention to dine at Sushi Sensation specifically (or at least at a sushi restaurant generally) in accordance with at least one transaction characteristic of proffered guaranty transaction 1050a (e.g., of FIG. 1O), which at least one indicium may be obtained via at least one application 1114 (e.g., of FIG. 1M) of Sam's mobile device 1004, via searching/accessing/scraping a public or private portion of Sam's social network account or a social network contact (e.g., friend) thereof, some combination thereof, or so forth. By way of example only, an entry of a data stream 1090 (e.g., of FIGS. 1S-1X) is shown at an example annotation 2520A (e.g., of FIG. 1V) and is entitled "social network entry (e.g., a posting, a check-in, or a combination thereof, etc.) that includes a restaurant name" that is identified in at least one transaction characteristic.

For an example annotation 2522 (e.g., of FIG. 1N), an internet or other technology company has one or more indicia of Sam's presence at Sushi Sensation restaurant from one or more SPS coordinates received from an operating system 1112 (e.g., of FIG. 1M) (or a search-enabled application) of Sam's mobile device 1004 or one or more indicia of Sam's interest in eating sushi in a neighborhood of Sushi Sensation restaurant as per previously-entered search terms (e.g., using mobile device 1004 or a different device that is at typically or at least temporarily (e.g., via a login) associated with Sam). By way of example only, two entries of a data stream 1090 (e.g., of FIGS. 1S-1X) are shown at: (i) an example annotation 2522A (e.g., of FIG. 1T) and is entitled "SPS coordinates—as noted/reported by an operating system (OS) of a mobile device" or (ii) an example annotation 2522B (e.g., of FIG. 1U) and is entitled "search terms including 'sushi' and '<business district> of tokyo'".

For an example annotation 2524 (e.g., of FIG. 1N), a wireless telecommunication company has at least one indicium of Sam's presence at least near the Sushi Sensation restaurant in accordance with at least one transaction characteristic (e.g., vendor location 1028V (e.g., of FIG. 1B)), and potentially at least one indication of a path thereto, based at least partially on one or more cell towers contacted by Sam's mobile device 1004. By way of example only, an entry of a data stream 1090 (e.g., of FIGS. 1S-1X) is shown at an example annotation 2524A (e.g., of FIG. 1W) and is entitled "cell-tower based location indication".

For an example annotation 2526 (e.g., of FIG. 1P), Mercury Bank may negotiate 1048 with one or more would-be guarantors 1062 to extract one or more preferred terms 1070 (e.g., lower or lowest fee, quicker or quickest payment, acceptance of more risk or responsibility if Sam repudiates, willingness to share data with financier, or a combination thereof, etc.) for at least one guaranty transaction 1068. For an example annotation 2528 (e.g., of FIG. 1K), a transaction marketplace response (TMR) 1064 that is associated with a guaranty transaction 1068 (e.g., of FIG. 1P), which may include one or more terms 1070, such as a fee, a tracking identifier, payment evidence, a repudiation handling code, or a combination thereof, etc., may be output from a guaranty transaction marketplace 1040 (e.g., of FIGS. 1I and 1J), may be sent to financier Mercury Bank, some combination thereof, or so forth.

For an example annotation 2530 (e.g., of FIG. 1E), Mercury Bank may receive a TMR 1064 (e.g., of FIG. 1K) that is output from a guaranty transaction marketplace 1040 (e.g., of FIGS. 1I and 1J), that is produced from an API 1046, some combination thereof, or so forth. For an example annotation 2532 (e.g., of FIG. 1E), Mercury Bank may determine to approve a product transaction 1018 for a restaurant meal type of product 1016 based at least partially on at least one accepted TMR 1064, which may be associated with at least one guaranty 1054 (e.g., of FIG. 1J).

For an example annotation 2534 (e.g., of FIG. 1D), Mercury Bank may send an affirmative authorization answer 1086 to the Sushi Sensation restaurant merchant 1012 (e.g., of FIG. 1C). For an example annotation 2536 (e.g., of FIG. 1C), Sushi Sensation restaurant merchant 1012 may agree to accept Sam's payment tool 1008 (e.g., of FIG. 1H) as settlement of the sushi dinner for eight (8) diners responsive at least partly to receiving an affirmative authorization answer 1086 from Mercury Bank.

For an example annotation 2538 (e.g., of FIG. 1Q), a guarantor 1062 (e.g., a social network 1062SN, a data possessor 1062DP, a wireless service provider 1062WS, or a combination thereof, etc.) (e.g., of FIG. 1J, 1K, or 1L) may interact with a user 1002, a merchant 1012, a financier 1034, or a combination thereof, etc. to investigate at least one disagreement 1084 (e.g., at least one dispute 1084D, at least one repudiation 1084R, or a combination thereof, etc.). A guarantor 1062 may ensure that Sushi Sensation restaurant merchant 1012 is paid even given at least a repudiation 1084R by an alleged user/customer 1002 and possibly given a dispute 1084D between an admitted user/customer 1002 and a merchant/vendor 1012.

FIG. 2 is a schematic diagram 201 that includes at least one example device, such as a financier server device, that is capable of handling scenarios for financier-facilitated guaranty provisioning in accordance with certain example embodiments. As shown in FIG. 2, by way of example but not limitation, schematic diagram 201 depicts at least one device 200 that may include or comprise at least one financier server device 1036 (e.g., of FIG. 1E) of at least one financier 1034 (e.g., of FIG. 1E). For certain example embodiments, schematic diagram 201 depicts at least one device 200 that may include at least one authorization request discovery module (ARDM) 202 or at least one proffered guaranty transaction (PGT) providing module (PGTPM) 204. Additionally or alternatively, schematic diagram 201 may include, by way of example but not limitation, at least one discovery 206, at least one authorization request 1032, at least one product transaction 1018, at least one providing 208, at least one proffered guaranty transaction (PGT) 1050, or at least one guarantor 1062. By way of example but not limitation, an authorization request discovery module 202 or a proffered guaranty transaction providing module 204 may include or comprise or be realized with at least one processor that executes instructions (e.g., sequentially, in parallel, at least partially overlapping in a time-multiplexed fashion on at least one core, at least partially distributed across multiple cores, or a combination thereof, etc.) as at least part of: at least one special-purpose computing component, at least one code-configured electronic system, at least one process-assembled machine, some combination thereof, or otherwise as described herein. However, claimed subject matter is not limited to any particular described embodiments, implementations, examples, or so forth.

For certain example embodiments, an authorization request discovery module (ARDM) 202 or a proffered guaranty transaction providing module (PGTPM) 204 may be implemented separately or at least partially jointly or in combination with or by at least one device 200. For certain example implementations, an authorization request discovery module 202 may be configured to discover (e.g., via at least one discovery 206) at least one authorization request 1032 corresponding to at least one product transaction 1018. For certain example implementations, a proffered guaranty transaction providing module 204 may be configured to provide (e.g., via at least one providing 208) at least one proffered guaranty transaction (PGT) 1050 to at least one guarantor 1062. In addition to or in alternative to description herein with specific reference to FIG. 2, illustrated aspects of schematic diagram 201 may be relevant to example description herein below with particular reference to at least FIG. 4. However, claimed subject matter is not limited to any particular described embodiments, implementations, examples, or so forth.

FIGS. 3A-3E are schematic diagrams 300A-300E that include at least one example device and that depict example scenarios for financier-facilitated guaranty provisioning in accordance with certain example embodiments. As shown in FIGS. 3A-3E, by way of example but not limitation, one or more of schematic diagrams 300A-300E may include at least one device 200, at least one an authorization request discovery module (ARDM) 202, at least one proffered guaranty transaction providing module (PGTPM) 204, at least one authorization request 1032, at least one product transaction 1018, at least one proffered guaranty transaction (PGT) 1050, or at least one guarantor 1062. Each of schematic diagrams 300A-300E may include alternative or additional depictions, which may relate to financier-facilitated guaranty provisioning, as described herein. In addition to or in alternative to description herein below with specific reference to FIGS. 3A-3E, illustrated aspects of schematic diagrams 300A-300E may be relevant to example description with reference at least to any one or more of FIGS. 5A-5G. However, claimed subject matter is not limited to any particular described embodiments, implementations, examples, or so forth.

Figure 3A:
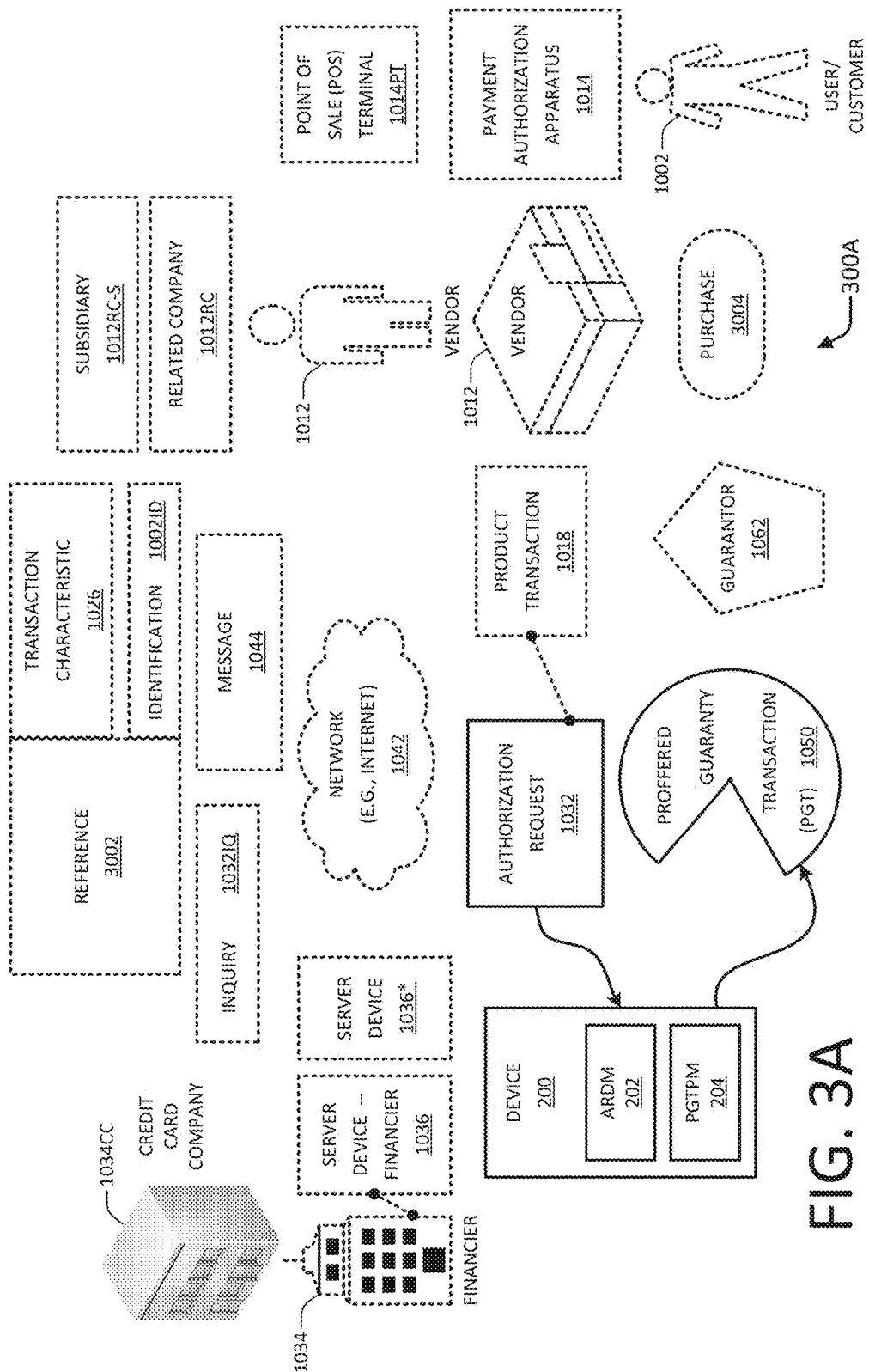

As shown in FIG. 3A, by way of example but not limitation, schematic diagram 300A may further include at least one vendor 1012, at least one payment authorization apparatus 1014, at least one point of sale (POS) terminal 1014PT, at least one network 1042, at least one server device 1036\*, at least one financier server device 1036, at least one financier 1034, at least one credit card company 1034CC, at least one related company 1012RC, at least one subsidiary 1012RC-S, at least one inquiry 1032IQ, at least one customer 1002, at least one reference 3002, at least one identification 1002ID, at least one purchase 3004, at least one message 1044, or at least one transaction characteristic 1026. Additional or alternative description that may be relevant to schematic diagram 300A is provided herein below with particular reference to at least one or more of any of FIGS. 5A-5G.

Figure 3B:
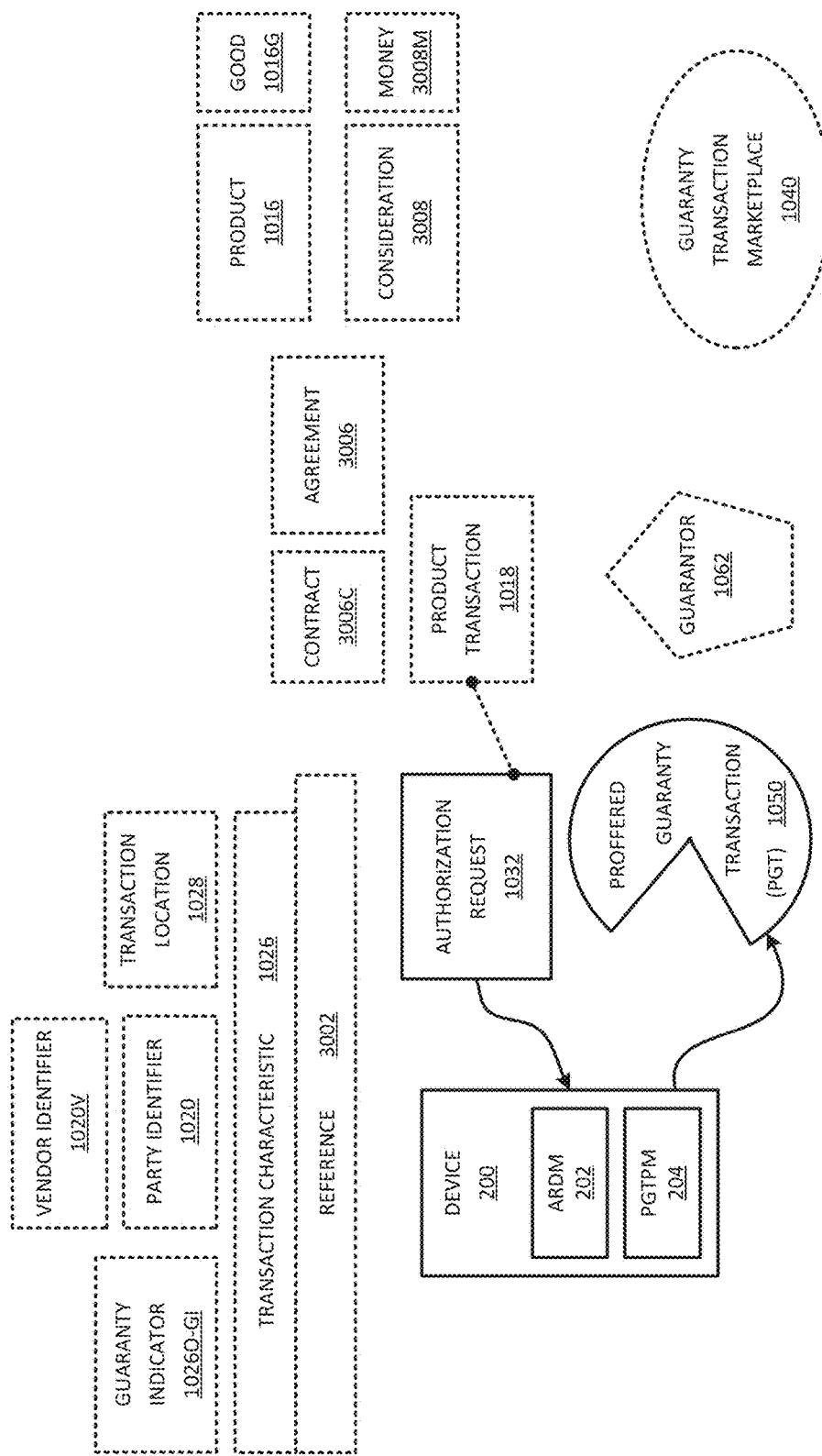

As shown in FIG. 3B, by way of example but not limitation, schematic diagram 300B may further include at least one agreement 3006, at least one product 1016, at least some consideration 3008, at least one contract 3006C, at least one good 1016G, at least some money 3008, at least one reference 3002, at least one transaction characteristic 1026, at least one guaranty indicator 1026O-GI, at least one guaranty transaction marketplace 1040, at least one party identifier 1020, at least one vendor identifier 1020V, or at least one transaction location 1028. Additional or alternative description that may be relevant to schematic diagram 300B is provided herein below with particular reference to at least one or more of any of FIGS. 5A-5G.

Figure 3C:
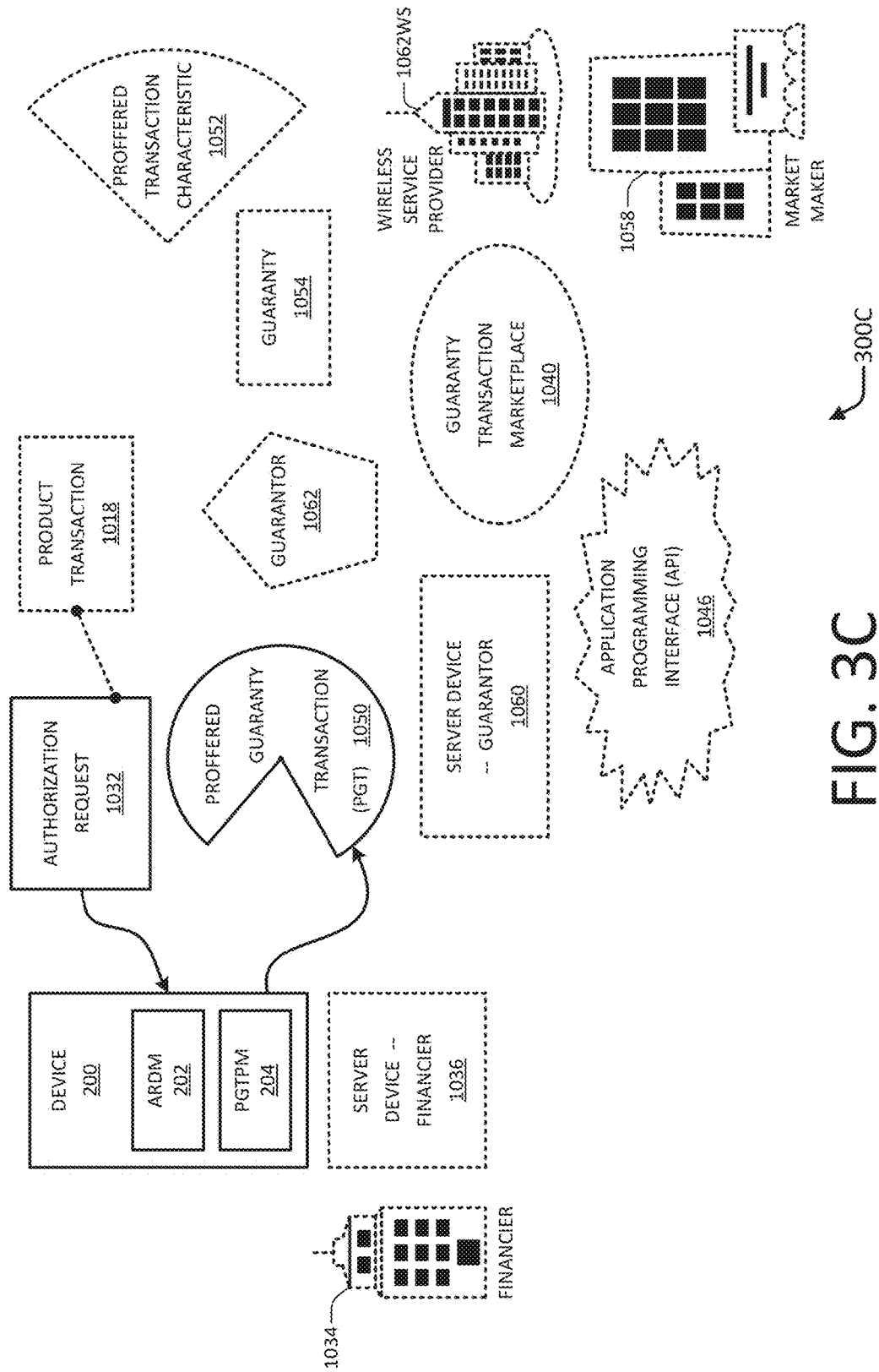

As shown in FIG. 3C, by way of example but not limitation, schematic diagram 300C may further include at least one wireless service provider guarantor 1062WS, at least one guaranty transaction marketplace 1040, at least one guaranty market maker 1058, at least one application programming interface (API) 1046, at least one guarantor server device 1060, at least one financier server device 1036, at least one financier 1034, at least one guaranty 1054, or at least one proffered transaction characteristic 1052. Additional or alternative description that may be relevant to schematic diagram 300C is provided herein below with particular reference to at least one or more of any of FIGS. 5A-5G.

Figure 3D:
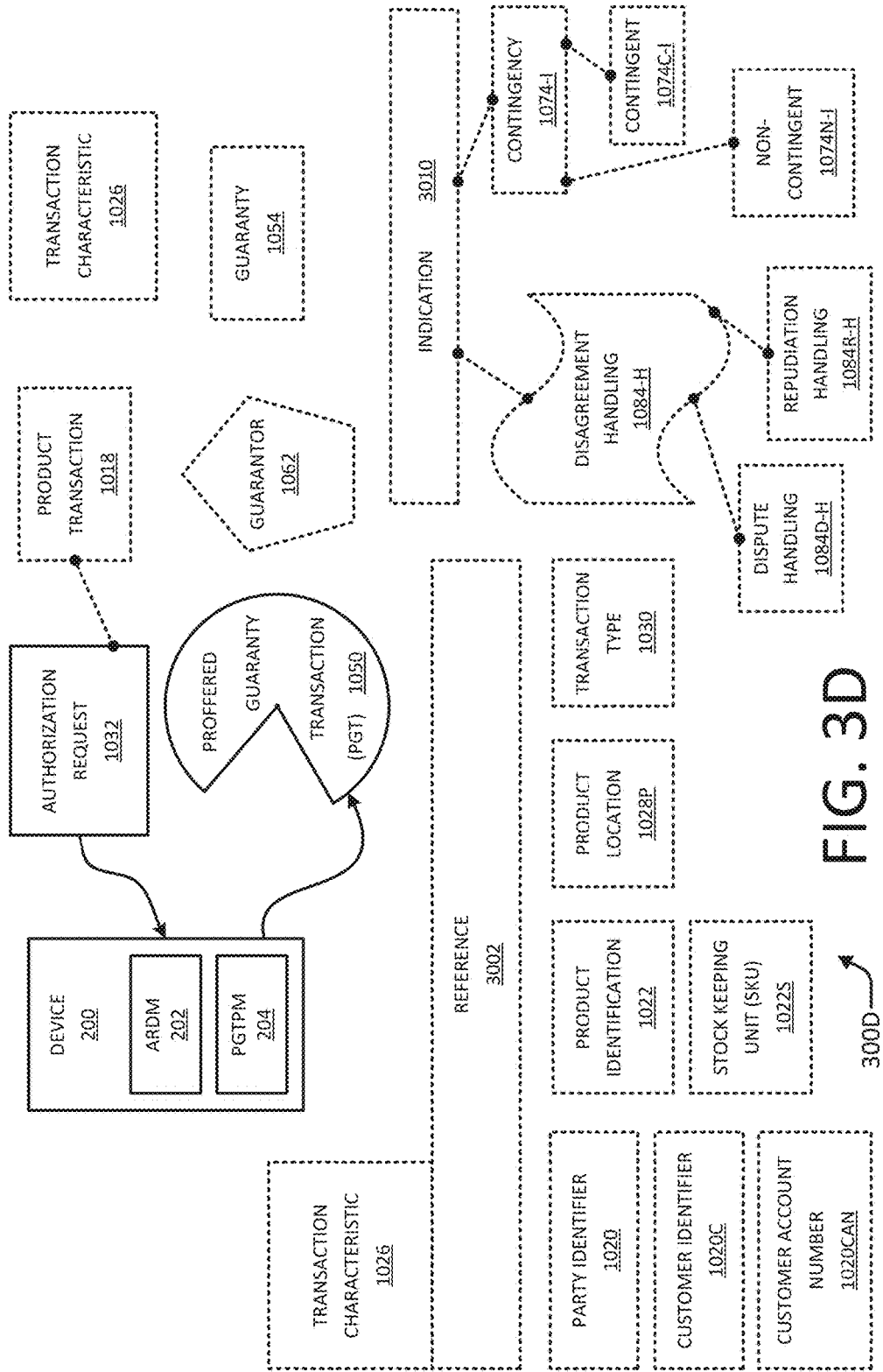

As shown in FIG. 3D, by way of example but not limitation, schematic diagram 300D may further include at least one transaction characteristic 1026, at least one reference 3002, at least one party identifier 1020, at least one customer identifier 1020C, at least one customer account number 1020CAN, at least one product identification 1022, at least one stock keeping unit (SKU) 1022S, at least one product location 1028P, at least one transaction type 1030, at least one indication 3010, at least one disagreement handling 1084-H indicator, at least one dispute handling 1084D-H indicator, at least one repudiation handling 1084R-H indicator, at least one contingency 1074-I indicator, at least one contingent indication 1074C-I, at least one guaranty 1054, at least one transaction characteristic 1026, or at least one non-contingent indication 1074N-I. Additional or alternative description that may be relevant to schematic diagram 300D is provided herein below with particular reference to at least one or more of any of FIGS. 5A-5G.

Figure 3E:
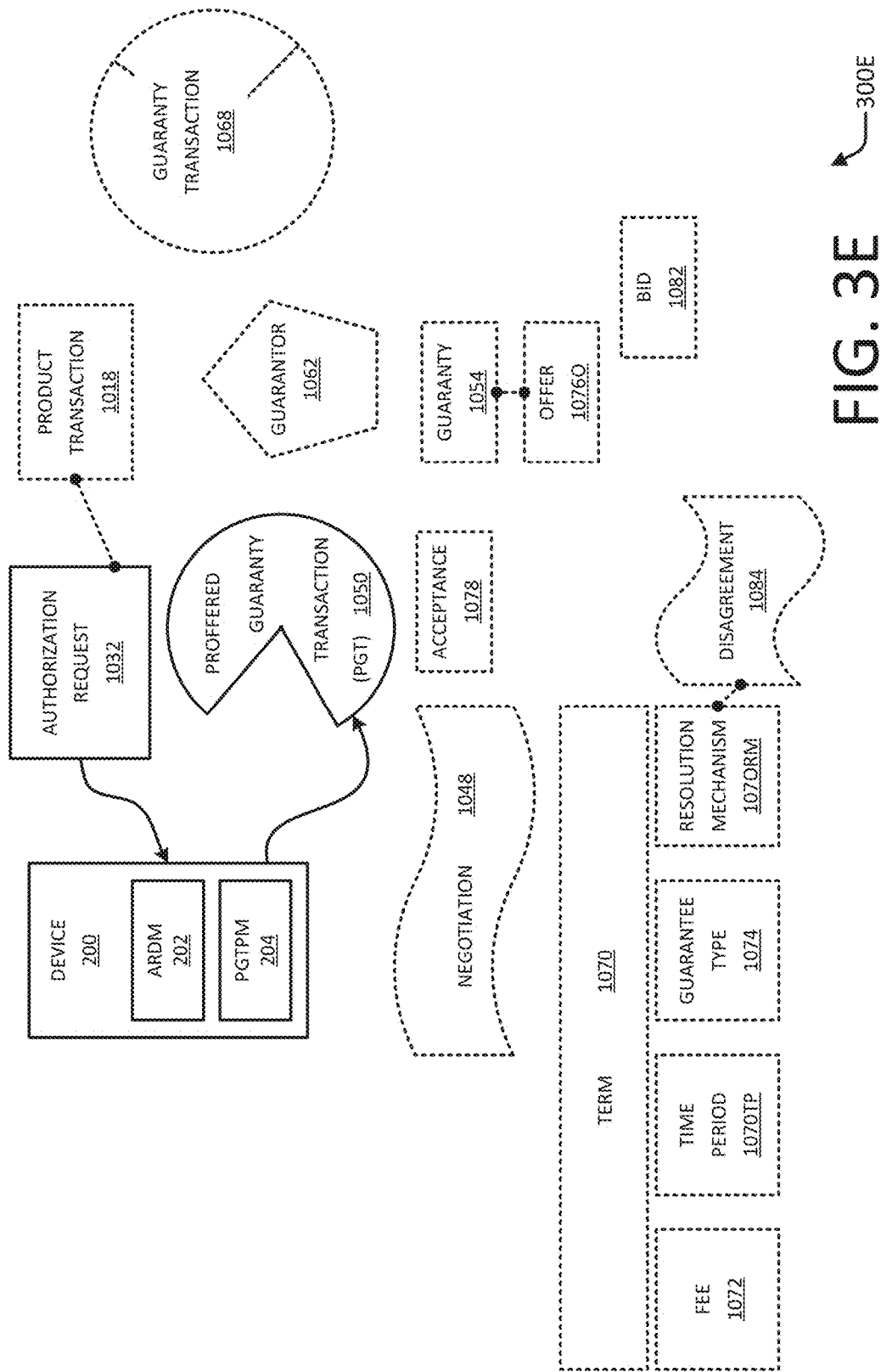

As shown in FIG. 3E, by way of example but not limitation, schematic diagram 300E may further include at least one negotiation 1048, at least one term 1070, at least one guaranty 1054, at least one fee 1072, at least one time period 1070TP, at least one guarantee type 1074, at least one disagreement 1084 resolution mechanism 1070RM, at least one guaranty offer 1076O, at least one bid 1082, at least one acceptance 1078, or at least one guaranty transaction 1068. Additional or alternative description that may be relevant to schematic diagram 300E is provided herein below with particular reference to at least one or more of any of FIGS. 5A-5G.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 4 is a flow diagram 400 illustrating an example method for at least one device with regard to financier-facilitated guaranty provisioning in accordance with certain example embodiments. As illustrated, flow diagram 400 may include any of operations 402-404. Although operations 402-404 are shown or described in a particular order, it should be understood that methods may be performed in alternative manners without departing from claimed subject matter, including, but not limited to, with a different order or number of operations or with a different relationship between or among operations. Also, at least some operation(s) of flow diagram 400 may be performed so as to be fully or partially overlapping with other operation(s). For certain example embodiments, one or more operations of flow diagram 400 may be performed by at least one device, such as a device 200 (e.g., of FIG. 2) or at least a portion thereof, such as one or more modules thereof. However, claimed subject matter is not limited to any particular described embodiments, implementations, examples, or so forth.

For certain example embodiments, a method (e.g., that may at least partially include, involve, address, react to, enable, pertain to, or a combination thereof, etc. or other otherwise relate to financier-facilitated guaranty provisioning, such as by supporting or at least partially relying on or interacting with a guaranty transaction marketplace or by making or accepting a call to a guaranty-related application programming interface (API)), which method may be at least partially implemented using hardware (e.g., circuitry, at least one processor, processor-accessible memory, at least one module, or a combination thereof, etc.) of a device such as a device 200 (e.g., of FIG. 2), may include an operation 402 or an operation 404. An operation 402 may be directed at least partially to discovering at least one authorization request corresponding to at least one product transaction. For certain example implementations, at least one device 200 (e.g., a financier server device 1036 (e.g., of FIG. 1E), such as at least a portion of a server farm) may discover (e.g., ascertain knowledge of, receive, acquire, notice, be made aware of by a subsidiary or an affiliated company, acquire from a different company, generate responsive to an attempted transaction, decrypt, decode, or a combination thereof, etc., such as via at least one discovery 206) at least one authorization request 1032 (e.g., one or more messages asking for authorization, an inquiry seeking approval from a financier 1034 (e.g., of FIG. 1E) for a transferal of funds in exchange for at least one product, an inquiry seeking transaction or card approval, at least one message to at least one financier seeking approval for a credit or non-cash transaction, a communicated investigation request as to whether a customer should be permitted to consummate an attempted purchase, or a combination thereof, etc.) corresponding to (e.g., linked to, relating to, pertaining to, matched with, associated with, derived from, generated responsive to, or a combination thereof, etc.) at least one product transaction 1018 (e.g., a trade, an exchange of consideration for a product, an agreement to sell a product for money, a contract to buy a product on credit, an accord to order or to take possession or to receive a product without paying cash immediately therefor, a contract to secure one or more services, a transfer of a good or a delivery of a service, a lease of a good, or a combination thereof, etc.).

For certain example embodiments, an operation 404 may be directed at least partially to providing at least one proffered guaranty transaction to at least one guarantor. For certain example implementations, at least one device 200 (e.g., a financier server device 1036 (e.g., of FIG. 1E), such as at least one server blade) may provide (e.g., make available, extend access to, proffer, transmit, disseminate a link to, send a code related to, expose via at least one guaranty transaction marketplace 1040 application programming interface (API) 1046 (e.g., of FIG. 1), or a combination thereof, etc., such as via at least one providing 208) at least one proffered guaranty transaction (PGT) 1050 (e.g., an invitation to bid on a product transaction to supply a guaranty, an identification of at least one transaction characteristic of at least one product transaction, an opportunity to participate in a guaranty transaction marketplace, notice of a potential guaranty transaction, a description of at least part of a product transaction, a request for a guaranty offer, an offer to consider proffering at least one guaranty, a response to a transaction characteristic proffered by a guarantor, or a combination thereof, etc.) to at least one guarantor 1062 (e.g., one who may grant a guaranty, an entity that is capable of provisioning a guaranty, a potential guarantor, a would-be guarantor, an actual guarantor, a pre-positioned data possessor 1062PP (e.g., of FIG. 1J) that has pre-arranged a guaranty opportunity with a customer, a social network 1062SN (e.g., of FIG. 1K) offering a guaranty, a data possessor 1062DP (e.g., of FIG. 1K) extending a guaranty, a wireless service provider 1062WS (e.g., of FIG. 1L) agreeing to a guaranty request or offer, a vendor 1012 functioning as a guarantor 1062 (e.g., at FIG. 1L), a combined financier and guarantor 1108 (e.g., of FIG. 1F), an internetworking company—such as a data possessor, a search engine company, or a combination thereof, etc.—proffering a transaction characteristic as a guaranty offer, or some combination thereof, etc.).

FIGS. 5A-5G depict example additions or alternatives for a flow diagram of FIG. 4 in accordance with certain example embodiments. As illustrated, flow diagrams of FIGS. 5A-5G may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently or along with one or more other operations). Also, at least some operation(s) of flow diagrams of FIGS. 5A-5G may be performed so as to be fully or partially overlapping with other operation(s). Moreover, one or more of flow diagrams of FIGS. 5A-5G may illustrate implementation of one or more additional operations as represented by an operation 406 (e.g., if depicted). One or more additional operations corresponding to an operation 406 may alternatively be performed independently. For certain example embodiments, one or more operations of flow diagrams 500A-500G (of FIGS. 5A-5G) may be performed by at least one device such as a device 200 (e.g., of FIG. 2) or at least a portion thereof, such as one or more modules thereof. However, claimed subject matter is not limited to any particular described embodiments, implementations, examples, or so forth.

Figure 5A:
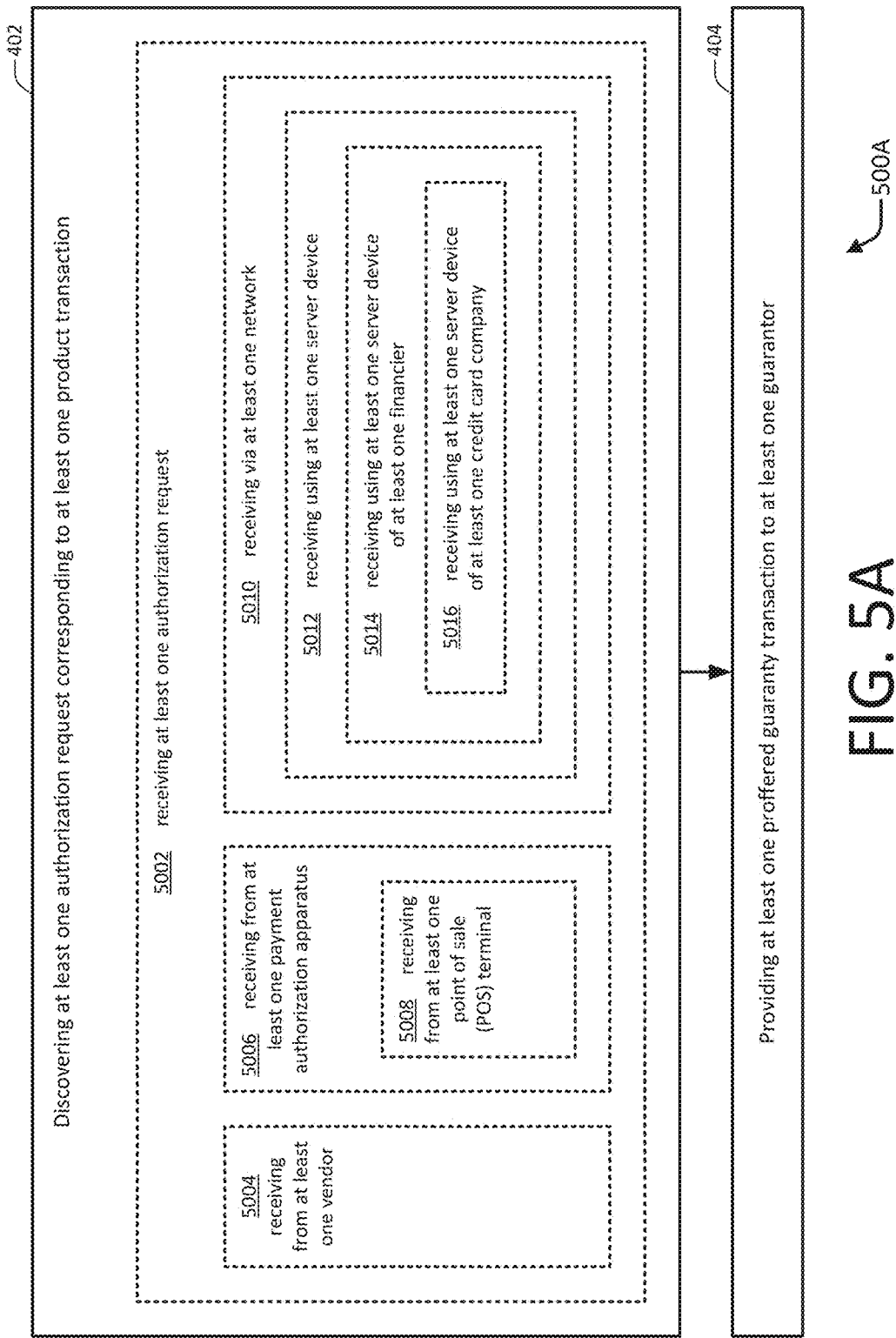

FIG. 5A illustrates a flow diagram 500A having any one or more of example operations 5002-5016. For example, an operation 402 may include an operation 5002 of receiving at least one authorization request. For instance, at least one device 200 (e.g., a financier server device 1036, such as a load-balancing apparatus for a bank of servers) may receive (e.g., accept from a network port) at least one authorization request 1032 (e.g., at least one message seeking purchase approval for a customer).

For example, an operation 5002 may include an operation 5004 of receiving from at least one vendor. For instance, at least one device 200 (e.g., a financier server device 1036, such as at least a portion of a server farm) may receive (e.g., shuttle packets up a network protocol stack from one layer to another layer) from (e.g., sent from, originating at, destination-addressed by, or a combination thereof, etc.) at least one vendor 1012 (e.g., a merchant, a physical store, a sales entity, a website that sells goods, an organization that provides services, a virtual store, a kiosk, a corporation, a restaurant, a car rental entity, an individual providing manicures, or a combination thereof, etc.).

For example, an operation 5002 may include an operation 5006 of receiving from at least one payment authorization apparatus. For instance, at least one device 200 (e.g., a financier server device 1036, such as a virtual server) may receive (e.g., detect electromagnetic signals transmitted) from at least one payment authorization apparatus 1014 (e.g., a credit card processing machine—such as a credit card scanning machine, a computer programmed to process product transactions, a store register—such as a National Cash Register (NCR) Co. terminal machine, a portable intelligent device that is capable of processing product transactions—such as an iPad with check-out software or a Square payment processor attachment, a payment authorization server device—such as cloud computing infrastructure owned or leased to run an online store, or a combination thereof, etc.).

For example, an operation 5006 may include an operation 5008 of receiving from at least one point of sale (POS) terminal. For instance, at least one device 200 (e.g., a financier server device 1036, such as a Dell PowerEdge server computer) may receive (e.g., parse internet protocol (IP) packets sent) from at least one point of sale (POS) terminal 1014PT (e.g., a machine that is positioned at a counter in a store proximate to merchandise and that is capable of at least partially processing a sale of the merchandise; a Verifone Omni credit card terminal with a keypad, a credit card swiping reader, a receipt printer, or a combination thereof, etc.; a National Cash Register (NCR) Co. RealPOS terminal machine with a screen, a receipt printer, a cash drawer, a product scanner, or a combination thereof, etc.; a device that is capable of being carried in a user's hands and of executing at least one sales-related program, such as a smart phone, a tablet computer, a wrist watch, smart glasses, or a combination thereof, etc.; a credit card scanner—such as one from Square for a smart phone, an RFID reader, a laser scanner, or a combination thereof, etc. coupled by wire or wirelessly to a mobile device; some combination thereof, or so forth).

For example, an operation 5002 may include an operation 5010 of receiving via at least one network. For instance, at least one device 200 (e.g., a financier server device 1036, such as leased cloud computing functionality) may receive (e.g., accept for processing after propagation) via at least one network 1042 (e.g., a wireless network, a wired network, a cellular network, a Wi-Fi network, an infrastructure network, an ad hoc network, a local area network (LAN), a wide area network (WAN), an orthogonal frequency division multiplexing (OFDM)-based network, an internet, a WiMAX-based network, a cable network, a fiber optic network, a public network, a private network, an internet protocol (IP)-based network, or a combination thereof, etc.).

For example, an operation 5010 may include an operation 5012 of receiving using at least one server device. For instance, at least one device 200 (e.g., a financier server device 1036, such as at least a portion of a custom-built data processing center) may receive (e.g., direct packets from a physical layer toward a transport layer) using (e.g., employing, by operating, as a result of code executed by, with hardware that is coupled to, or a combination thereof, etc.) at least one server device 1036* (e.g., a physical server, a virtual server, a commodity server, a proprietary server, a server constructed using open-source plans, at least a portion of a server farm, a server rack, a server blade, a processing core of a server computer, a general-purpose computer programmed to function as a server—such as by hosting a server application, at least a portion of owned or leased cloud-computing functionality, a set of distributed server resources, or a combination thereof, etc.).

For example, an operation 5012 may include an operation 5014 of receiving using at least one server device of at least one financier. For instance, at least one device 200 (e.g., a financier server device 1036, such as an IBM x86 Enterprise server) may receive (e.g., detect at least one message arriving from an external network, such as the internet) using at least one server device 1036 of (e.g., a physical server, a virtual server, a commodity server, a proprietary server, a server constructed using open-source plans, at least a portion of a server farm, a server rack, a server blade, a processing core of a server computer, a general-purpose computer programmed to function as a server—such as by hosting a server application, at least a portion of owned or leased cloud-computing functionality, a set of distributed server resources, or a combination thereof, etc. that is operated by or on behalf of, managed by, owned or leased by, or a combination thereof, etc.) of at least one financier 1034 (e.g., an entity that may approve fund disbursement, a credit card company, a bank, a company or division or bank or subsidiary thereof that issues credit to consumers or businesses, an internet payments company such as Google (Wallet) or Amazon (Payments) or PayPal, Visa, MasterCard, Europay, American Express, Diner's Club, money transfer service, a funding source, an indemnifying insurance company, Chase, Bank of America, Wells Fargo, or a combination thereof, etc.).

For example, an operation 5014 may include an operation 5016 of receiving using at least one server device of at least one credit card company. For instance, at least one device 200 (e.g., a financier server device 1036, such as a virtualized server of a data center) may receive (e.g., access memory shared by or with a different virtualized server) using at least one server device 1036 of (e.g., a server virtualized from computing resources of a data center operated by) at least one credit card company 1034CC (e.g., credit card brand, credit card issuer, Visa, MasterCard, Europay, American Express, Bank of America, Wells Fargo, Target, a company that enables purchases on credit via a physical or electronic or virtual "card", or a combination thereof, etc.).

Figure 5B:
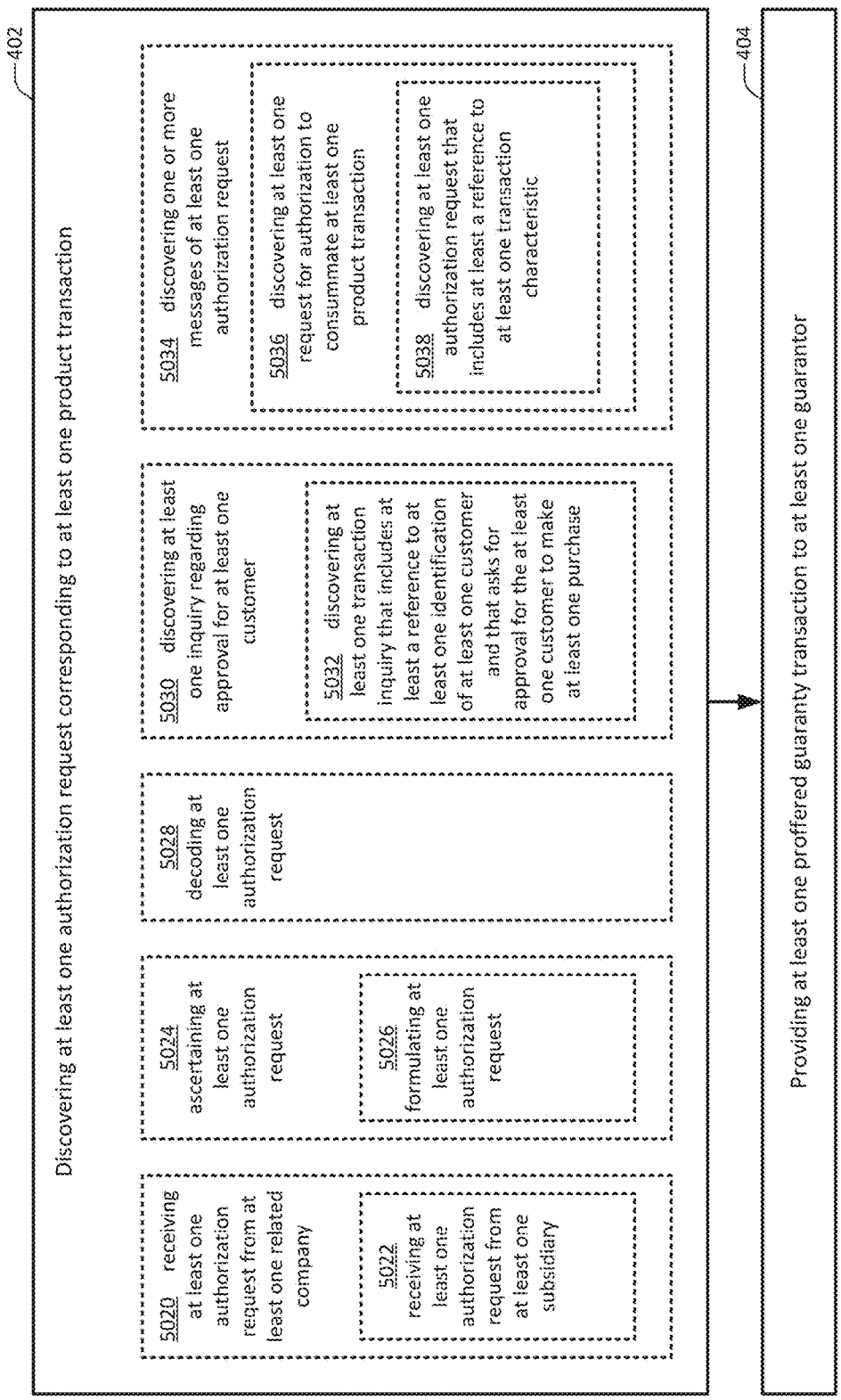

FIG. 5B illustrates a flow diagram 500B having any one or more of example operations 5020-5038. For example, an operation 402 may include an operation 5020 of receiving at least one authorization request from at least one related company. For instance, at least one device 200 (e.g., a financier server device 1036, such as part of a corporate data center) may receive (e.g., take packets from the internet pertaining to) at least one authorization request 1032 (e.g., an inquiry seeking transaction or card approval) from at least one related company 1012RC (e.g., a parent company, a subsidiary, a sister company, a holding company, a second-tier subsidiary, or a combination thereof, etc.).

For example, an operation 5020 may include an operation 5022 of receiving at least one authorization request from at least one subsidiary. For instance, at least one device 200 (e.g., a financier server device 1036, such as a physically or logically separate portion of a corporate data center) may receive (e.g., accept authority to access a file or data storage location) at least one authorization request 1032 (e.g., an inquiry seeking approval from a financier aspect of a company for a transferal of funds in exchange for providing at least one product to a customer) from at least one subsidiary 1012RC-S (e.g., a company controlled by another company, a daughter company, a credit-oriented company majority-owned by a parent company or a company having another subsidiary that sells products, or a combination thereof, etc.).

For example, an operation 402 may include an operation 5024 of ascertaining at least one authorization request. For instance, at least one device 200 (e.g., a financier server device 1036, such as multiple server blades coupled together) may ascertain (e.g., determine, formulate, put together from evidence, create using information from a point of sale (POS) register, retrieve, or a combination thereof, etc.) at least one authorization request 1032 (e.g., an investigation as to whether a customer should be permitted to consummate an attempted purchase).

For example, an operation 5024 may include an operation 5026 of formulating at least one authorization request. For instance, at least one device 200 (e.g., a financier server device 1036, such as a containerized portion of a data center) may formulate (e.g., express in precise form, create using information from a point of sale (POS) register, organize in accordance with a protocol, populate fields so as to comport with a standard, or a combination thereof, etc.) at least one authorization request 1032 (e.g., a file having one or more transaction characteristics corresponding to a product transaction that a customer is attempting to consummate).

For example, an operation 402 may include an operation 5028 of decoding at least one authorization request. For instance, at least one device 200 (e.g., a financier server device 1036, such as an Apache web server) may decode (e.g., translate into a different form, decipher, extract meaning of, decrypt, extract information from relevant fields, parse, or a combination thereof, etc.) at least one authorization request 1032 (e.g., a communication exchange asking that a customer's attempt to purchase a service be approved).

For example, an operation 402 may include an operation 5030 of discovering at least one inquiry regarding approval for at least one customer. For instance, at least one device 200 (e.g., a financier server device 1036, such as a multi-processor of a server rack) may discover (e.g., ascertain knowledge of) at least one inquiry 1032IQ regarding (e.g., a questioning for, seeking information about, a query to attain, asking for an investigation regarding, or a combination thereof, etc.) approval (e.g., affirmative response, positive sanctioning, consent, permission, confirmation, or a combination thereof, etc.) for at least one customer 1002 (e.g., a person, a group, a legal entity, a robotic agent, or a combination thereof, etc. that is buying, negotiating regarding, discussing, considering purchasing, perusing, or a combination thereof, etc. at least one product).

For example, an operation 5030 may include an operation 5032 of discovering at least one transaction inquiry that includes at least a reference to at least one identification of at least one customer and that asks for approval for the at least one customer to make at least one purchase. For instance, at least one device 200 (e.g., a financier server device 1036, such as one or more server blades) may discover (e.g., acquire from a different company) at least one transaction (e.g., buying agreement, selling contract, exchange of consideration for a good or service, an attempt thereto, or a combination thereof, etc.) inquiry 1032IQ (e.g., a questioning, a seeking of information about, a query to attain, an asking for an investigation about a transaction, or a combination thereof, etc.) that includes (e.g., carries, encapsulates, has, brings along in conjunction with itself, or a combination thereof, etc.) at least a reference 3002 to (e.g., a link to, an indication of, a mechanism to retrieve, actual/physical or virtual inclusion of, or a combination thereof, etc.) at least one identification 1002ID (e.g., name, bank account number, credit account number, user identification at a website, postal address, email address, social security number, PIN, password, or a combination thereof, etc.) of at least one customer 1002 (e.g., a person, a group, a legal entity, a robotic agent, or a combination thereof, etc. that is buying, negotiating regarding, discussing, considering purchasing, perusing, or a combination thereof, etc. at least one product) and that asks for (e.g., includes an alphanumeric code indicative of a request for, that is submitted using an application programming interface (API) that implicitly requests, that is formulated in a manner that indicates it serves as a petition for, or a combination thereof, etc.) approval (e.g., affirmative response, positive sanctioning, consent, permission, confirmation, or a combination thereof, etc.) for at least one customer 1002 to make at least one purchase 3004 (e.g., acquisition of product for payment, receipt of benefit of, delivery or possession taken of, or a combination thereof, etc. in exchange for consideration, value, promise to pay, or a combination thereof, etc.).

For example, an operation 402 may include an operation 5034 of discovering one or more messages of at least one authorization request. For instance, at least one device 200 (e.g., a financier server device 1036, such as processor cycles purchased from a computing wholesaler—such as Amazon's Elastic Compute Cloud (EC2) or Google's Cloud Platform/Compute Engine) may discover (e.g., analyze) one or more messages 1044 (e.g., signals, packets, encapsulated data, wireless transmission, wired transmission, propagating data, information packaged for communication, data organized in accordance with a given protocol or format, internet protocol (IP)-based communications, or a combination thereof, etc.) of at least one authorization request 1032 (e.g., petition asking for permission to purchase on behalf of a customer).

For example, an operation 5034 may include an operation 5036 of discovering at least one request for authorization to consummate at least one product transaction. For instance, at least one device 200 (e.g., a financier server device 1036, such as an open cloud computing infrastructure from Rackspace) may discover (e.g., receive) at least one request (e.g., petition, asking, inquiry, query, or a combination thereof, etc.) for authorization (e.g., approval, permission, affirmative response, positive sanctioning, or a combination thereof, etc.) to consummate (e.g., complete, make legally binding, provide product pertaining to, accomplish, or a combination thereof, etc.) at least one product transaction 1018 (e.g., an agreement to provide a product for some consideration).

For example, an operation 5036 may include an operation 5038 of discovering at least one authorization request that includes at least a reference to at least one transaction characteristic. For instance, at least one device 200 (e.g., a financier server device 1036, such as a server farm or a portion thereof) may discover (e.g., receive via the internet) at least one authorization request 1032 (e.g., one or more messages asking for purchase permission) that includes (e.g., carries, encapsulates, has, brings along in conjunction with itself, or a combination thereof, etc.) at least a reference 3002 to (e.g., a link to, an indication of, a mechanism to retrieve, a physical or virtual inclusion of, or a combination thereof, etc.) at least one transaction characteristic 1026 (e.g., a name of a customer, an identification of a product, a company name of a vendor, a product location, or a combination thereof, etc.).

Figure 5C:
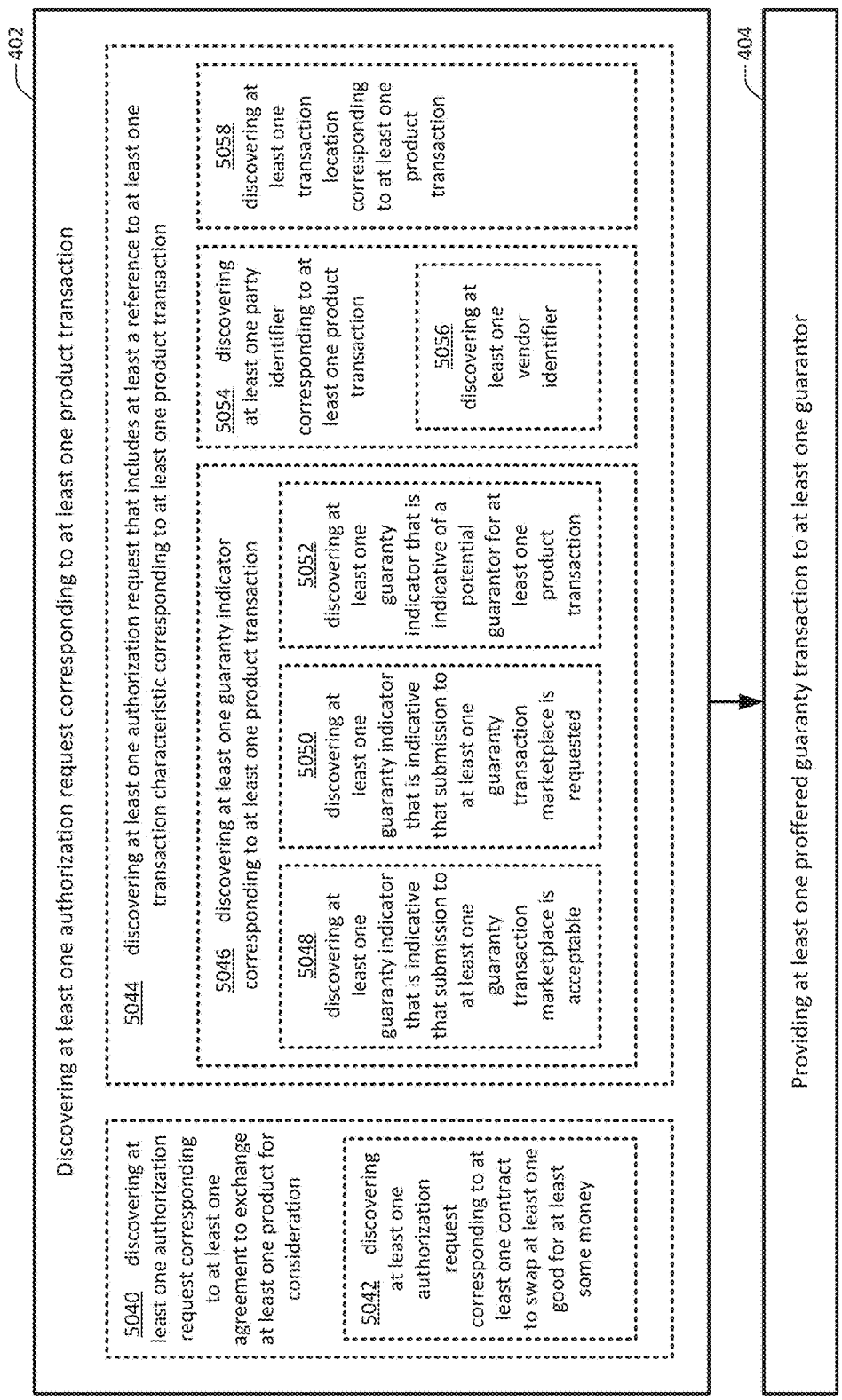

FIG. 5C illustrates a flow diagram 500C having any one or more of example operations 5040-5058. For example, an operation 402 may include an operation 5040 of discovering at least one authorization request corresponding to at least one agreement to exchange at least one product for consideration. For instance, at least one device 200 (e.g., a financier server device 1036, such as processing resources leased from a cloud computing wholesaler and implemented as a server) may discover (e.g., ascertain knowledge of) at least one authorization request 1032 (e.g., one or more messages asking for purchase permission) corresponding to (e.g., linked to, relating to, pertaining to, matched with, associated with, derived from, generated responsive to, or a combination thereof, etc.) at least one agreement 3006 (e.g., proposed agreement, negotiated agreement, settled agreement, arrangement accepted by multiple parties to a transaction, contract, accord between buyer and seller with respect to transaction terms, or a combination thereof, etc.) to exchange (e.g., trade, swap, given one and take other, barter, give and receive reciprocally, or a combination thereof, etc.) at least one product 1016 (e.g., a physical product, a virtual product, a good, a service, a car wash, a dress, a discounted scuba diving lesson, a meal a camera, a leather wallet, dry cleaning, a roof replacement, a car rental, a hotel stay, or a combination thereof, etc.) for consideration 3008 (e.g., something of value, promise, money, debt or credit, compensation, remuneration, fee, recompense, or a combination thereof, etc.).

For example, an operation 5040 may include an operation 5042 of discovering at least one authorization request corresponding to at least one contract to swap at least one good for at least some money. For instance, at least one device 200 (e.g., a financier server device 1036, such as multiple Dell PowerEdge Servers) may discover (e.g., receive as part of an electronic communication) at least one authorization request 1032 (e.g., at least one message seeking approval for a credit or non-cash transaction) corresponding to at least one contract 3006C (e.g., legal agreement, physical or virtual or implied document delineating one or more terms of a transaction, an accord to sell or buy a good or service, or a combination thereof, etc.) to swap (e.g., switch ownership, trade one for another, provide compensation for a provided product or vice versa, or a combination thereof, etc.) at least one good 1016G (e.g., a physical good, a virtual good, a physical object, an object usable in a game or program, a toothbrush, a paper or electronic book, a car, a television, a software program, a box of detergent, a set of steaks, or a combination thereof, etc.) for at least some money 3008 (e.g., physical money, electronic money, dollars, euros, Bitcoins, an enumerated debt or credit, electronic fund transfer (EFT), or a combination thereof, etc.).

For example, an operation 402 may include an operation 5044 of discovering at least one authorization request that includes at least a reference to at least one transaction characteristic corresponding to at least one product transaction. For instance, at least one device 200 (e.g., a financier server device 1036, such as a bank of servers) may discover (e.g., become aware of) at least one authorization request 1032 (e.g., a signal implicitly asking for credit utilization approval on behalf of a customer) that includes (e.g., carries, encapsulates, has, brings along in conjunction with itself, or a combination thereof, etc.) at least a reference 3002 to (e.g., a link to, an indication of, a mechanism to retrieve, physical or virtual inclusion of, or a combination thereof, etc.) at least one transaction characteristic 1026 (e.g., a name of a customer, an identification of a product, a company name of a vendor, a product location, a transaction type, a valuation, or a combination thereof, etc.) corresponding to at least one product transaction 1018 (e.g., a trade, an exchange of consideration for a product, an agreement to sell a product for money, a contract to buy a product on credit, an accord to order or to take possession or to receive a product without paying cash immediately therefor, a contract to secure one or more services, a transfer of a good or a delivery of a service, a lease of a good, or a combination thereof, etc.).

For example, an operation 5044 may include an operation 5046 of discovering at least one guaranty indicator corresponding to at least one product transaction. For instance, at least one device 200 (e.g., a financier server device 1036, such as a rack of server blades) may discover (e.g., decode) at least one guaranty indicator 1026O-GI (e.g., a sign, evidence, a showing, a description, a received communication, an informative data structure, a code, a signal, an alpha or numeric set of one or more characters, or a combination thereof, etc. relating to and informing about at least one guaranty) corresponding to at least one product transaction 1018 (e.g., an accord to order or to take possession or to receive a product without paying cash immediately therefor).

For example, an operation 5046 may include an operation 5048 of discovering at least one guaranty indicator that is indicative that submission to at least one guaranty transaction marketplace is acceptable. For instance, at least one device 200 (e.g., a financier server device 1036, such as a commodity server using Intel Xeon processors) may discover (e.g., receive from an external or public network) at least one guaranty indicator 1026O-GI (e.g., a code, a field value, an application programming interface (API) call, a frequency, a voltage level, an indicator in a separate message, an indicator in an integrated message, an authorization request type, or a combination thereof, etc.) that is indicative that submission (e.g., transmission) to at least one guaranty transaction marketplace 1040 (e.g., at least one guarantor 1062) is acceptable (e.g., permitted or authorized by a customer or vendor).

For example, an operation 5046 may include an operation 5050 of discovering at least one guaranty indicator that is indicative that submission to at least one guaranty transaction marketplace is requested. For instance, at least one device 200 (e.g., a financier server device 1036, such as an Oracle Application Server 10g) may discover (e.g., generate responsive to a proposed product transaction) at least one guaranty indicator 1026O-GI (e.g., a code, a field value, an application programming interface (API) call, a frequency, a voltage level, an indicator in a separate message, an indicator in an integrated message, an authorization request type, or a combination thereof, etc.) that is indicative that submission to (e.g., pursuing a guaranty using a transaction marketplace submission or a transaction marketplace response via) at least one guaranty transaction marketplace 1040 (e.g., an API of at least one guarantor) is requested (e.g., that a customer or a vendor is asking for pursuit of a guaranty if feasible or if permitted by a vendor or a financier).

For example, an operation 5046 may include an operation 5052 of discovering at least one guaranty indicator that is indicative of a potential guarantor for at least one product transaction. For instance, at least one device 200 (e.g., a financier server device 1036, such as a server farm) may discover (e.g., extract from a field from a message) at least one guaranty indicator 1026O-GI (e.g., a code, a field value, an application programming interface (API) call, a frequency, a voltage level, an indicator in a separate message, an indicator in an integrated message, an authorization request type, or a combination thereof, etc.) that is indicative of a potential (e.g., possible, pre-arranged, likely amenable, one that has a relationship with a customer, one that has a relationship with a vendor, preferred, one that deals with product transactions having an associated transaction characteristic, or a combination thereof, etc.) guarantor 1062 (e.g., one who may grant a guaranty, such as a wireless service provider) for at least one product transaction 1018 (e.g., purchase and delivery of refrigerator).

For example, an operation 5044 may include an operation 5054 of discovering at least one party identifier corresponding to at least one product transaction. For instance, at least one device 200 (e.g., a financier server device 1036, such as one or more geographically-distributed data centers) may discover (e.g., retrieve from a storage area network (SAN)) at least one party identifier 1020 (e.g., a name, a number, an alphanumeric indicator, a username, a login identification, a handle, an alias, an account identification, a merchant account identifier, a financier account identifier, a guarantor account identifier, a wireless service provider identifier, a self-selected or an assigned identifier, a merchant name, a merchant number, a merchant identifier, a financier-specific merchant identifier, a guarantor-specific merchant identifier, or a combination thereof, etc.) corresponding to at least one product transaction 1018 (e.g., a contract to secure one or more services).

For example, an operation 5054 may include an operation 5056 of discovering at least one vendor identifier. For instance, at least one device 200 (e.g., a financier server device 1036, such as a machine operating an IBM Power8 chip) may discover (e.g., determine using a look-up table or procedure and at least one received piece of datum) at least one vendor identifier 1020V (e.g., a merchant name, a merchant number, a self-selected merchant identifier, an assigned merchant identifier, a financier-specific merchant identifier, a guarantor-specific merchant identifier, Macy's, The Gap, "3983X3th", or a combination thereof, etc.).

For example, an operation 5044 may include an operation 5058 of discovering at least one transaction location corresponding to at least one product transaction. For instance, at least one device 200 (e.g., a financier server device 1036, such as a general-purpose computing machine functioning as a payment or credit processor) may discover (e.g., receive) at least one transaction location 1028 (e.g., a customer location, a vendor location, a product location, a location retrieved from memory responsive to a vendor name, a location acquired via the internet, a location corresponding to a mobile device of a customer, a street address, a neighborhood, at least one GPS coordinate, a city, a state, a store or mall name, or a combination thereof, etc.) corresponding to at least one product transaction 1018 (e.g., a transfer of a good or a delivery of a service in exchange for a current or promised-future funds transfer from a credit card company).

Figure 5D:
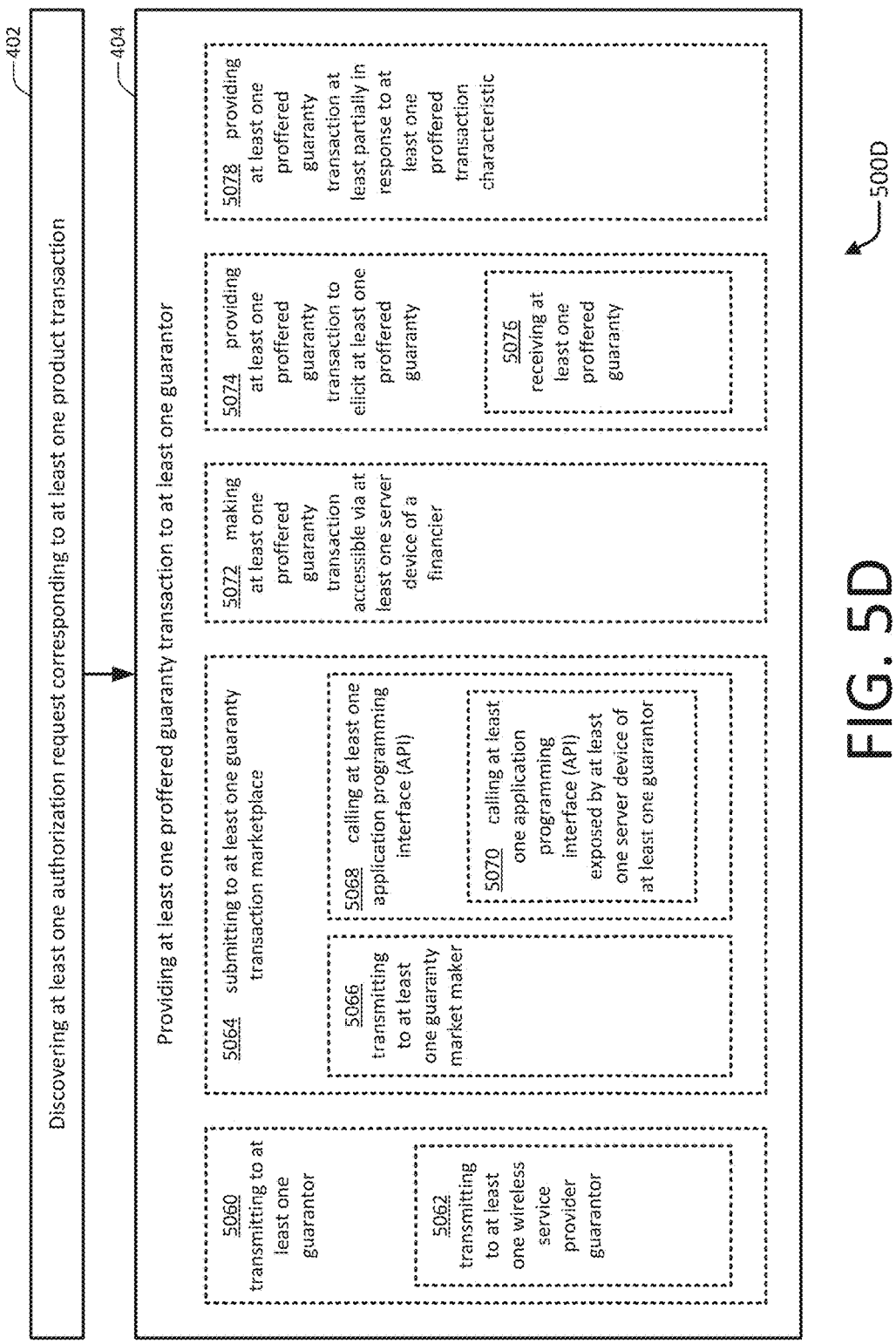

FIG. 5D illustrates a flow diagram 500D having any one or more of example operations 5060-5078. For example, an operation 404 may include an operation 5060 of transmitting to at least one guarantor. For instance, at least one device 200 (e.g., a financier server device 1036, such as at least one server blade of a data center) may transmit (e.g., send, communicate by wire, communicate wirelessly, frequency up-convert, modulate, encode, propagate, emanate from an emitter or antenna or network port, funnel down to a lower network layer, or a combination thereof, etc.) to at least one guarantor 1062 (e.g., one who may grant, offer, or extend at least one guaranty).

For example, an operation 5060 may include an operation 5062 of transmitting to at least one wireless service provider guarantor. For instance, at least one device 200 (e.g., a financier server device 1036, such as a server farm) may transmit (e.g., initiate transmission onto the internet) to at least one wireless service provider guarantor 1062WS (e.g., a company providing cellular access to a subscriber or having access to wireless service network usage data, such as Sprint or AT&T, that is participating in a guaranty transaction marketplace).

For example, an operation 404 may include an operation 5064 of submitting to at least one guaranty transaction marketplace. For instance, at least one device 200 (e.g., a financier server device 1036, such as a computing device built with server-grade commodity processors) may submit to (e.g., enter, post to a web site of, list on, send to, publish at, respond to a proffered transaction characteristic announced via, or a combination thereof, etc.) at least one guaranty transaction marketplace 1040 (e.g., a guarantor web site, a proffered transaction or transaction characteristic bazaar, an electronic exchange facilitating negotiations between financiers and would-be guarantors, or a combination thereof, etc.).

For example, an operation 5064 may include an operation 5066 of transmitting to at least one guaranty market maker. For instance, at least one device 200 (e.g., a financier server device 1036, such as a Cisco cloud-building server) may transmit (e.g., send via one or more internet protocol (IP) packets) to at least one guaranty market maker 1058 (e.g., an entity that enables negotiations between at least one financier and one or more would-be guarantors, an internet site that facilitates matching a proffered guaranty transaction to one or more proffered transaction characteristics or offered guaranties, a server device that accepts proffered guaranty transactions and makes them available to one or more bidding or potential guarantor, or a combination thereof, etc.).

For example, an operation 5064 may include an operation 5068 of calling at least one application programming interface (API). For instance, at least one device 200 (e.g., a financier server device 1036, such as at least one virtualized server using a VMware product) may call (e.g., access computing resources via, utilize an interface defined by, request execution of, interact with an electronic device by comporting with, employ communicate with a server in accordance with, or a combination thereof, etc.) at least one application programming interface (API) 1046 (e.g., a programming call or an internet server access mechanism that enables submission of a product transaction or provision of a guaranty, or a bid thereon, to a guaranty transaction marketplace; a stipulated interaction algorithm with respect to at least a software component, an input or output structure of request or response messages, a web API, or a combination thereof, etc.).

For example, an operation 5068 may include an operation 5070 of calling at least one application programming interface (API) exposed by at least one server device of at least one guarantor. For instance, at least one device 200 (e.g., a financier server device 1036, such as a container having custom-built hardware for a financial services company) may call (e.g., provide or accept a message formulated or submitted in accordance with) at least one application programming interface (API) 1046 (e.g., a communication specification to access at least one service made available on the internet that is) exposed by (e.g., made accessible by, instantiated on a public-facing side of, incorporated into an input or output interface of, or a combination thereof, etc.) at least one server device 1060 (e.g., part of a server farm, a computing device constructed using at least one server-caliber processor—such as Intel Xeon, processing capabilities carved from cloud computing resources that interact with an external entity, or a combination thereof, etc.) of at least one guarantor 1062 (e.g., a search engine company that will guarantee payment to a vendor based on a customer's search history, a wireless service provider that will reimburse a credit card company if a customer disavows a transaction but her mobile device's location matches that of a product location, one that offers a non-contingent guaranty for a percent of a transaction valuation, or a combination thereof, etc.).

For example, an operation 404 may include an operation 5072 of making at least one proffered guaranty transaction accessible via at least one server device of a financier. For instance, at least one device 200 (e.g., a financier server device 1036, such as a computing apparatus that is built based on an open-source server specification) may make (e.g., cause to be, enable to be, notify availability of, take action that results in, or a combination thereof, etc.) at least one proffered guaranty transaction 1050 (e.g., a description of a product transaction, a request for a guaranty, an announcement that a product transaction is available for bidding with respect to potentially offering at least one guaranty, or a combination thereof, etc.) accessible (e.g., retrievable, discoverable, viewable, capable of being bid on, able to be reviewed or analyzed, findable or searchable, or a combination thereof, etc.) via at least one server device 1036 (e.g., a portion of a bank of servers, at least one processor of a server blade, resources of a cloud computing data center, or a combination thereof, etc.) of a financier 1034 (e.g., an entity that may approve fund disbursement, a credit card company, a bank, a company or division or bank or subsidiary thereof that issues credit to consumers or businesses, an internet payments company such as Google (Wallet) or Amazon (Payments) or PayPal, Visa, MasterCard, Europay, American Express, Diner's Club, money transfer service, a funding source, an indemnifying insurance company, Chase, Bank of America, Wells Fargo, a purchase-approving and funds-transferring company, or a combination thereof, etc.).

For example, an operation 404 may include an operation 5074 of providing at least one proffered guaranty transaction to elicit at least one proffered guaranty. For instance, at least one device 200 (e.g., a financier server device 1036, such as cloud computing resources wholesaled from another company, such as Amazon's Elastic Compute Cloud (EC2)) may provide (e.g., make available, transmit, publish a link to, or a combination thereof, etc.) at least one proffered guaranty transaction 1050 (e.g., an identification of a user/customer and an identification of a product or a transaction valuation, a posting of a transaction for bidding purposes, transmission of at least one request for a guaranty proffering, or a combination thereof, etc.) to elicit (e.g., precipitate, cause to be returned or submitted, evoke, bring out, or a combination thereof, etc.) at least one proffered (e.g., transmitted, returned, offered, presented for consideration, sent as a bid or with an associated fee, or a combination thereof, etc.) guaranty 1054 (e.g., a pledge to meet another's obligation, an assurance that another's debt will be satisfied, a promise to pay if another does not, an agreement to pay if certain constraints are met or if specified conditions are falsified, a guarantee to pay if contingencies are demonstrated to exist or to have transpired, an immediate or contemporaneous payment discounted by a fee, a certification that a monetary backstop is established, or a combination thereof, etc.).

For example, an operation 5074 may include an operation 5076 of receiving at least one proffered guaranty. For instance, at least one device 200 (e.g., a financier server device 1036, such as a bank of servers) may receive (e.g., accept, decode, demodulate, down-convert, detect, obtain from or via a communication or transmission from another, route from an antenna or antenna element, take into possession wirelessly, ferry up packets or lift data from one network layer to a higher layer, or a combination thereof, etc.) at least one proffered (e.g., offered or counter-offered) guaranty 1054 (e.g., agreement to pay restaurant for patron's tab if the patron refuses to pay, such as due to a disagreement, in return for a fee that is based on a percentage of the tab).

For example, an operation 404 may include an operation 5078 of providing at least one proffered guaranty transaction at least partially in response to at least one proffered transaction characteristic. For instance, at least one device 200 (e.g., a financier server device 1036, such as a distributed portion of a data center) may provide (e.g., transmit, make available, counter-offer using, indicate agreement or acceptance with, or a combination thereof, etc.) at least one proffered guaranty transaction 1050 (e.g., a response to a transaction characteristic proffered by a guarantor, an electronic file or signal indicative of agreement, transaction characteristics of a transaction including a user identified by a guarantor, or a combination thereof, etc.) at least partially in response to (e.g., precipitated by, enabled by, formulated as a consequence of, or a combination thereof, etc.) at least one proffered transaction characteristic 1052 (e.g., a transaction characteristic that is posted via a guaranty transaction marketplace, a user that is identified to a financier by a would-be guarantor, an indication that a location may be verified by a would-be guarantor, an announcement that an entity is accepting requests for guaranties that are contingent on or based on or limited to at least one particular transaction characteristic, or a combination thereof, etc.).

Figure 5E:
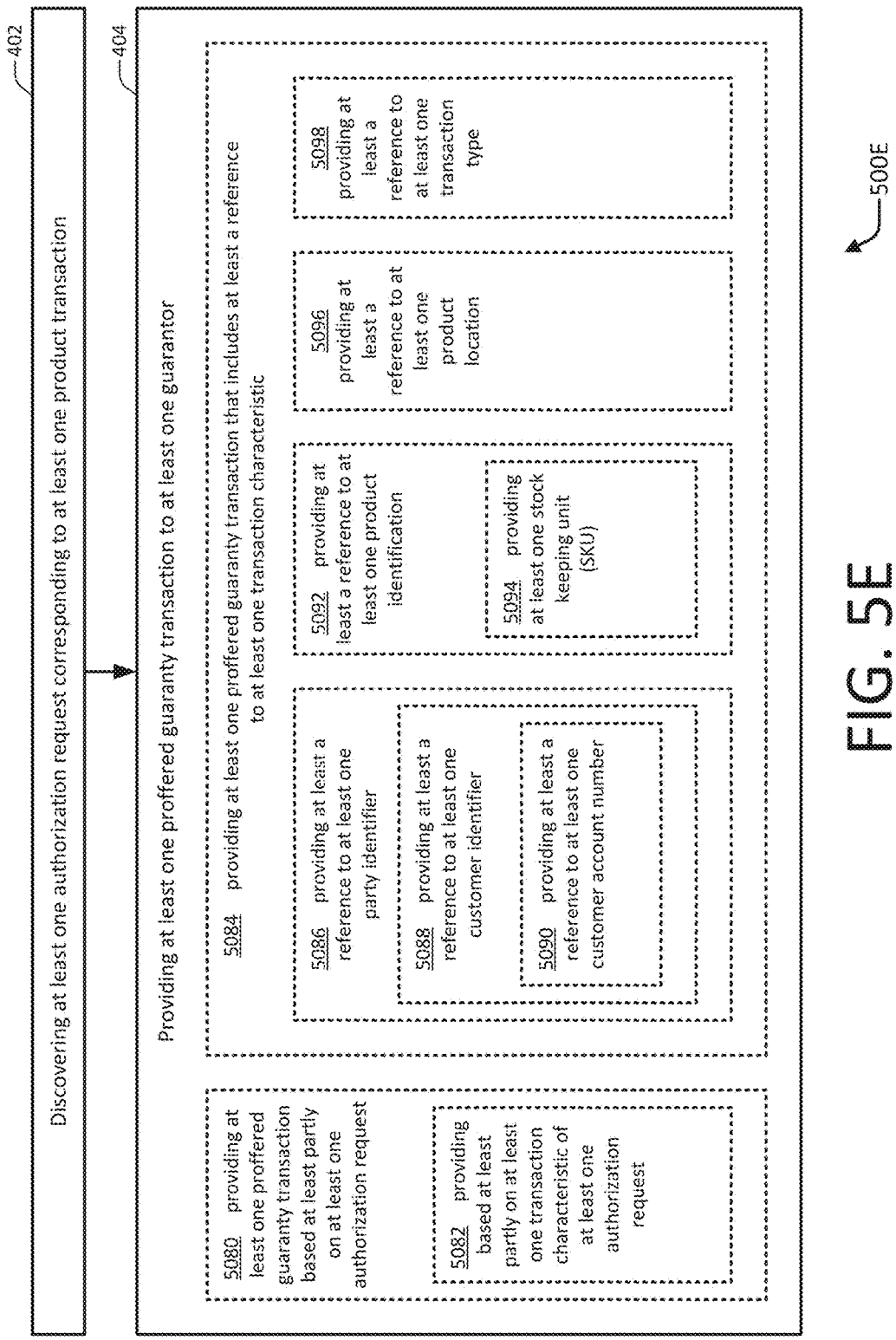

FIG. 5E illustrates a flow diagram 500E having any one or more of example operations 5080-5098. For example, an operation 404 may include an operation 5080 of providing at least one proffered guaranty transaction based at least partly on at least one authorization request. For instance, at least one device 200 (e.g., a financier server device 1036, such as a portion of a load-balanced server farm) may provide (e.g., make available) at least one proffered guaranty transaction 1050 (e.g., an invitation to bid on a product transaction to supply a guaranty) based at least partly on (e.g., responsive in part to, using information extracted from, formulated at least partially from data derived from, or a combination thereof, etc.) at least one authorization request 1032 (e.g., an inquiry seeking approval from a financier 1034 (e.g., of FIG. 1E) for a transferal of funds in exchange for at least one product).

For example, an operation 5080 may include an operation 5082 of providing based at least partly on at least one transaction characteristic of at least one authorization request. For instance, at least one device 200 (e.g., a financier server device 1036, such as multiple server-grade processors—like an IBM Power8 processor—that share transaction processing responsibilities) may provide (e.g., transmit) based at least partly on at least one transaction characteristic 1026 (e.g., a party identifier, a product identification, a valuation, a transaction location, a transaction type, or a combination thereof, etc.) of at least one authorization request 1032 (e.g., an electronic message asking for approval of an identified attempted credit card transaction).

For example, an operation 404 may include an operation 5084 of providing at least one proffered guaranty transaction that includes at least a reference to at least one transaction characteristic. For instance, at least one device 200 (e.g., a financier server device 1036, such as at least part of an internet data center) may provide (e.g., make available, extend access to, proffer, transmit, disseminate a link to, send a code related to, expose via at least one guaranty transaction marketplace 1040 application programming interface (API) 1046 (e.g., of FIG. 1), or a combination thereof, etc.) at least one proffered guaranty transaction 1050 (e.g., an identification of at least one transaction characteristic of at least one product transaction, an opportunity to participate in a guaranty transaction marketplace, notice of a potential guaranty transaction, or a combination thereof, etc.) that includes (e.g., carries, encapsulates, has, brings along in conjunction with itself, or a combination thereof, etc.) at least a reference 3002 (e.g., a link to, an indication of, a mechanism to retrieve, actual/physical inclusion of, virtual inclusion of, or a combination thereof, etc.) to at least one transaction characteristic 1026 (e.g., a party identifier, a product identification, a valuation, a transaction location, a transaction type, or a combination thereof, etc.).

For example, an operation 5084 may include an operation 5086 of providing at least a reference to at least one party identifier. For instance, at least one device 200 (e.g., a financier server device 1036, such as at least one server blade) may provide (e.g., send a code that may be submitted to enable retrieval) at least a reference 3002 (e.g., a link leading) to at least one party identifier 1020 (e.g., a name, a number, an alphanumeric indicator, a username, a login identification, a handle, an alias, an account identification, a merchant account identifier, a financier account identifier, a guarantor account identifier, a wireless service provider identifier, a self-selected or an assigned identifier, a merchant name, a merchant number, a merchant identifier, a financier-specific merchant identifier, a guarantor-specific merchant identifier, or a combination thereof, etc.).

For example, an operation 5086 may include an operation 5088 of providing at least a reference to at least one customer identifier. For instance, at least one device 200 (e.g., a financier server device 1036, such as at least one virtualized server) may provide (e.g., proffer) at least a reference 3002 to (e.g., a code that enables access to a file containing) at least one customer identifier 1020C (e.g., a name, a number, an alphanumeric indicator, a username, a login identification, a handle, an alias, an account identification, a merchant account identifier, a financier account identifier, a guarantor account identifier, a wireless service provider identifier, or a combination thereof, etc.).

For example, an operation 5088 may include an operation 5090 of providing at least a reference to at least one customer account number. For instance, at least one device 200 (e.g., a financier server device 1036, such as at least one server rack) may provide (e.g., transmit an encrypted version of) at least a reference 3002 to (e.g., an encrypted version of) at least one customer account number 1020CAN (e.g., a set of numerals, a string of alphanumeric characters, a uniquely-assigned application number that links to a customer account, or a combination thereof, a phone number, a credit card number, etc.).

For example, an operation 5084 may include an operation 5092 of providing at least a reference to at least one product identification. For instance, at least one device 200 (e.g., a financier server device 1036, such as a processing apparatus built using an open-sourced server plan) may provide (e.g., post to a web site or intranet) at least a reference 3002 to (e.g., encapsulated data that comprises or that maps to) at least one product identification 1022 (e.g., a product code, a product description, a UPC, a catalog number, a product name, a manufacturer item number, a model name—with or without a manufacturer name, a model number, a serial number, a product category, a set of alphanumeric characters, or a combination thereof, etc.).

For example, an operation 5092 may include an operation 5094 of providing at least one stock keeping unit (SKU). For instance, at least one device 200 (e.g., a financier server device 1036, such as a proprietary computing apparatus functioning as a web server or transaction processor or data indexer) may provide (e.g., send a link to a file or data object that includes or send a file data object that includes) at least one stock keeping unit (SKU) 1022S (e.g., one or more symbols, alphanumeric characters, codes, or a combination thereof, etc. that represent at least one of a manufacturer, a description, a material, a size, a color, a packaging, a quantity, a length, a warranty term, or a combination thereof, etc. of at least one product).

For example, an operation 5084 may include an operation 5096 of providing at least a reference to at least one product location. For instance, at least one device 200 (e.g., a financier server device 1036, such as a processing apparatus that supports or is coupled to a database) may provide (e.g., make a call to a guaranty-transaction-marketplace-related application programming interface (API) that identifies or includes) at least a reference 3002 to (e.g., a mechanism to retrieve) at least one product location 1028P (e.g., a warehouse location, a store location, a plane or truck if in transit, a manufacturing facility, a street address, at least one SPS coordinate, a neighborhood, a city, a state, an aisle, a shelf, a bin, a port, or a combination thereof, etc.).

For example, an operation 5084 may include an operation 5098 of providing at least a reference to at least one transaction type. For instance, at least one device 200 (e.g., a financier server device 1036, such as a server that processes credit card transactions) may provide (e.g., include as part of a transaction marketplace submission (TMS) 1038 (e.g., of FIG. 1)) at least a reference 3002 to (e.g., actual inclusion of a description of) at least one transaction type 1030 (e.g., a transaction category—such as debit or credit, a transaction description—such as good or service or repossess-able good, a relationship of vendor to customer, a physical presence or absence of a customer—such as in-person or internet, a transaction identification verification status—such as picture ID was viewed or not, or a combination thereof, etc.).

FIG. 5F illustrates a flow diagram 500F having any one or more of example operations 5100-5112. For example, an operation 404 may include an operation 5100 of providing at least one indication of disagreement handling. For instance, at least one device 200 (e.g., a financier server device 1036, such as an Oracle Application Server 10g) may provide (e.g., broadcast via the internet to multiple potential guarantors) at least one indication 3010 (e.g., a sign, evidence, a showing, a description, a communication, an informative data structure, a code, an alpha or numeric set of one or more characters, a value in a field of a message, or a combination thereof, etc.) of disagreement handling 1084-H (e.g., how, who, when, where, a disagreement—such as if a customer does not pay, if a customer and vendor disagree as to whether a product was delivered, if a customer disavows authorizing or requesting a transaction, if a customer asserts that a product was substandard or in violation of agreed-upon terms—is to be handled—such as which entity investigates a disagreement, who settles a disagreement, from where is evidence accumulated, when is a disagreement investigated or arbitrated, when is a final deadline, if/how a decision may be appealed, whether or what part(s) of a disagreement is performed manually or with automation, or a combination thereof, etc.).

For example, an operation 5100 may include an operation 5102 of providing at least one indication of dispute handling. For instance, at least one device 200 (e.g., a financier server device 1036, such as a machine having Intel Xeon processors) may provide (e.g., send to a guarantor in response to a proffered transaction characteristic) at least one indication 3010 (e.g., a list of variables—such as neutral party or creditor, 72 hours for preliminary decision, 60 days for final decision, appeal process, form XS-7, or a combination thereof, etc.) of dispute handling 1084D-H (e.g., description of how to address, ameliorate, or remedy a disagreement between or among at least one vendor and at least one customer—such as if a customer avers that service failed to meet an agreed-upon quality; avers that payment was satisfied using a different payment mechanism, such as by using a different credit card or a check; avers that goods were not delivered, or a combination thereof, etc.).

For example, an operation 5100 may include an operation 5104 of providing at least one indication of repudiation handling. For instance, at least one device 200 (e.g., a financier server device 1036, such as at least one server blade) may provide (e.g., make available on a publicly-facing portion of a web site) at least one indication 3010 (e.g., identification of entity handling, identification of contingent transaction characteristic, description of process or party responsibilities/obligations, or a combination thereof, etc.) of repudiation handling 1084R-H (e.g., description of how to investigate or settle a situation in which a user or alleged purchaser denies approving, authorizing, requesting, or a combination thereof, etc. a product transaction—such as how to or who verifies an asserted actual location, an asserted device theft, an claimed credit card loss, or a combination thereof, etc.).

For example, an operation 404 may include an operation 5106 of providing at least one indication of contingency. For instance, at least one device 200 (e.g., a financier server device 1036, such as at least part of a data center) may provide (e.g., post to a guaranty transaction marketplace) at least one indication 3010 (e.g., a multivariate or Boolean variable in a transaction marketplace submission (TMS) 1038 or a transaction marketplace response (TMR) 1064 (e.g., of FIG. 1) of contingency 1074-I (e.g., whether a guaranty or payment obligation is automatic, is independent of external factors, is dependent on evidence production, is contingent on an asserted or purported transaction characteristic being accurate or correct or contradicted, or a combination thereof, etc.).

For example, an operation 5106 may include an operation 5108 of providing at least one contingent indication with respect to at least one guaranty for at least one product transaction. For instance, at least one device 200 (e.g., a financier server device 1036, such as a group of Dell PowerEdge servers) may provide (e.g., transmit) at least one contingent indication 1074C-I (e.g., code, label, set or cleared bit, format or form selection, transaction characteristic identification, or a combination thereof, etc. that represents a state of being dependent on something, of having something set as a precondition, of being at least partly conditioned on, or a combination thereof, etc.) with respect to (e.g., with regard to, about, pertaining to, affecting, dealing with, or a combination thereof, etc.) at least one guaranty 1054 (e.g., a contract to guarantee at least a portion of a product transaction, such as a valuation thereof) for at least one product transaction 1018 (e.g., agreement to provide a CT scan after a head trauma).

For example, an operation 5108 may include an operation 5110 of providing at least one indication that at least one obligation of at least one guaranty is contingent on at least one transaction characteristic corresponding to at least one product transaction. For instance, at least one device 200 (e.g., a financier server device 1036, such as a server virtualized on commodity processing hardware) may provide (e.g., make available to entities previously registered to participate in a guaranty system) at least one indication 3010 (e.g., a signal having data modulated thereon that is transmitted to communicate) that at least one obligation of (e.g., promise to pay or reimburse appurtenant to) at least one guaranty 1054 (e.g., agreement between a financier and a guarantor for the guarantor to pay a restaurateur) is contingent 1074C-I (e.g., dependent upon, set as a precondition for, at least partly conditioned on, or a combination thereof, etc. paying a restaurateur if an allegedly-identified customer is not actually present at a restaurant at a time of a meal transaction) on at least one transaction characteristic 1026 (e.g., vendor location, product location, customer location, or a combination thereof, etc.) corresponding to (e.g., related to, describing, representing an attribute of, or a combination thereof, etc.) at least one product transaction 1018 (e.g., providing a meal to a customer and five guests).

For example, an operation 5106 may include an operation 5112 of providing at least one non-contingent indication with respect to at least one guaranty for at least one product transaction. For instance, at least one device 200 (e.g., a financier server device 1036, such as a rack of server apparatuses) may provide (e.g., insert into a contingency-related field of a guaranty request type of transaction marketplace submission (TMS) 1038 (e.g., of FIG. 1)) at least one non-contingent indication 1074N-I (e.g., particular set or unset bit, guaranty name, value in table or matrix, guaranty offer formatting, or a combination thereof, etc. that represents a state of being independent of external factors, not conditional at least on a specified attribute of a customer, automatic, guaranteed, risk-free, not impacted by a veracity of a purported product transaction characteristic, or a combination thereof, etc.) with respect to (e.g., with regard to, about, pertaining to, affecting, dealing with, or a combination thereof, etc.) at least one guaranty 1054 (e.g., promise to cover unpaid bill) for at least one product transaction 1018 (e.g., two massages, three rounds of golf, and room service at a resort).

FIG. 5G illustrates a flow diagram 500G having any one or more of example operations 5120-5134. For example, an operation 404 may include an operation 5120 of engaging in at least one negotiation for at least one term of at least one guaranty. For instance, at least one device 200 (e.g., a financier server device 1036, such as at least one server blade) may engage in (e.g., participate in, make an offer as part of, transmit a counter-offer for, stipulate required terms for, indicate flexible terms or an acceptable range with respect to, take bids as part of, post or transmit a proffered guaranty transaction two or more times with one or more different terms, or a combination thereof, etc.) at least one negotiation 1048 (e.g., an interaction between at least two entities via at least one guaranty transaction marketplace, proffering a counter-offer to at least one guarantor, receiving a counter-offer from at least one guarantor, indicating a term is required or is flexible in a proffered guaranty transaction, sending a proposed term alteration prior to forming a guaranty transaction, or a combination thereof, etc.) for at least one term 1070 (e.g., an aspect of a proffered guaranty transaction, a proffered transaction characteristic, an offered guaranty, a guaranty transaction, or a combination thereof, etc. that affects one or more obligations or rights under a guaranty transaction; a guaranteed valuation; a fee for such a guarantee; a procedure to handle a dispute or a repudiation; one or more contingency factors; some combination thereof; or so forth) of at least one guaranty 1054 (e.g., a pledge to meet another's obligation, an assurance that another's debt will be satisfied, a promise to pay if another does not, an agreement to pay if a certain constraint is met or if a specified condition is falsified, a guarantee to pay if one or more contingencies are demonstrated to exist or to have transpired, an immediate or contemporaneous payment for a transaction that is discounted by a fee, a certification that a monetary backstop is established, or a combination thereof, etc.).

For example, an operation 5120 may include an operation 5122 of engaging in at least one negotiation for at least one fee. For instance, at least one device 200 (e.g., a financier server device 1036, such as at least a portion of a server farm) may engage in (e.g., send a different term than one previously proposed as part of) at least one negotiation 1048 (e.g., an electronically-facilitated multi-entity consideration of multiple potential guaranties having one or more different terms) for at least one fee 1072 (e.g., a price for providing a guaranty, a percentage of a transaction valuation, a fee in monetary units, a fee in rewards points, a fee in data sharing requirements, a fee in advertising opportunities, a discounted amount off of a transaction valuation, an amount to be paid currently in exchange for an obligation to possibly pay a full amount of a transaction valuation if a disagreement develops, or a combination thereof, etc.).

For example, an operation 5120 may include an operation 5124 of engaging in at least one negotiation for at least one time period. For instance, at least one device 200 (e.g., a financier server device 1036, such as at least one core of a multiprocessor, such as an Intel Xeon processor) may engage in (e.g., receive a proposed term with respect to) at least one negotiation 1048 (e.g., transmission of an indication that a desired settlement time at a given cost is 48 hours instead of 72 hours) for at least one time period 1070TP (e.g., a settlement time, a dispute resolution deadline, an elapsed time after a product transaction for which a guarantor remains liable, a time frame for resolving a repudiation, a time between when a disagreement is reported and when funds are to be provided to a vendor or a financier, or a combination thereof, etc.).

For example, an operation 5120 may include an operation 5126 of engaging in at least one negotiation for at least one guarantee type. For instance, at least one device 200 (e.g., a financier server device 1036, such as a virtualized server) may engage in (e.g., send a message including a counter-offer for) at least one negotiation 1048 (e.g., receiving a guaranty offer from a potential guarantor having a term that differs from a requested term of a proffered guaranty transaction) for at least one guarantee type 1074 (e.g., a contingent guaranty, a non-contingent guaranty, an indicated transaction characteristic on which a guaranty is contingent, a guaranty category, or a combination thereof, etc.).

For example, an operation 5120 may include an operation 5128 of engaging in at least one negotiation for at least one disagreement resolution mechanism. For instance, at least one device 200 (e.g., a financier server device 1036, such as a server rack) may engage in (e.g., participate in) at least one negotiation 1048 (e.g., receiving an offer and returning a counter-offer having at least one term in difference) for at least one disagreement 1084 (e.g., a disagreement between a customer and a vendor, a disagreement between a customer and a financier, a disagreement between a vendor and a financier, a dispute as to whether a product transaction between a customer and vendor unfolded in accordance with a written or implied contract—such as quality or timeliness of product or delivery thereof, a repudiation by a customer as to an existence of an agreement between the customer and a vendor—such as if a customer disavows making the agreement, or a combination thereof, etc.) resolution mechanism 1070RM (e.g., how a disagreement is to be handled, who investigates a repudiation, where is a dispute settled, identification of a third party, background check provider cost to be covered by whom, deadlines for various resolution stages, what forms are to be used, manual versus automated process, physical or electronic submission of information, or a combination thereof, etc.).

For example, an operation 404 may include an operation 5130 of determining to accept at least one guaranty offer. For instance, at least one device 200 (e.g., a financier server device 1036, such as a commercial server) may determine (e.g., decide, analyze data, conclude, or a combination thereof, etc.) to accept (e.g., agree to, make a binding contract with respect to, consent to terms of, transmit an affirmative response to, or a combination thereof, etc.) at least one guaranty offer 1076O (e.g., an offer to provide at least one guaranty, an invitation to provide a guarantee of payment with respect to at least one product transaction, a counter-offer to term(s) associated with a proffered guaranty transaction, a call to an application programming interface (API) for a guaranty transaction marketplace or for a financier to attempt to establish a guaranty transaction, or a combination thereof, etc.).

For example, an operation 5130 may include an operation 5132 of comparing one or more terms of one or more bids. For instance, at least one device 200 (e.g., a financier server device 1036, such as a computing apparatus built or operated in accordance with a proprietary server design) may compare (e.g., determine one or more differences, ascertain at least one similarity, weigh benefits of, apply to a machine learning system, rank, contrast values of, correlate to requested values, or a combination thereof, etc.) one or more terms 1070 (e.g., an aspect of a proffered guaranty transaction, a proffered transaction characteristic, an offered guaranty, a guaranty transaction, or a combination thereof, etc. that affects one or more obligations or rights under a guaranty transaction; a guaranteed valuation; a fee for such a guarantee; a procedure to handle a dispute or a repudiation; one or more contingency factors; some combination thereof; or so forth) of one or more bids 1082 (e.g., submitted guaranty offer, cost for a guaranty, one or more terms for a guaranty, or a combination thereof, etc. that are provided individually, as part of at least one auction, to a financier directly, to a market maker of guaranty transaction marketplace, or a combination thereof, etc.).

For example, an operation 5130 may include an operation 5134 of signaling acceptance of at least one guaranty offer to form at least one guaranty transaction. For instance, at least one device 200 (e.g., a financier server device 1036, such as a processing resources corralled from a cloud computing data center) may signal (e.g., indicate, transmit a message having, post to an electronic board accessible by a bidding guarantor an, or a combination thereof, etc.) acceptance 1078 of (e.g., agreement to, affirmance of, acknowledgement of being bound to, legal contract formation derived from, or a combination thereof, etc.) at least one guaranty offer 1076O (e.g., an offer to provide at least one guaranty, an invitation to provide a guarantee of payment with respect to at least one product transaction, a counter-offer to term(s) associated with a proffered guaranty transaction, a call to an application programming interface (API) for a guaranty transaction marketplace or for a financier to attempt to establish a guaranty transaction, or a combination thereof, etc.) to form (e.g., become bound to, establish a mutually-agreed to, create an executory contract pertaining to, develop an agreement reflecting, or a combination thereof, etc.) at least one guaranty transaction 1068 (e.g., an agreement to reimburse a financier for at least a portion of losses, a contingent contract to pay a vendor if a customer does not, a promise to pay if a particular transaction characteristic is falsified, or a combination thereof, etc.).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to a human reader. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail herein, these logical operations/functions are not representations of abstract ideas, but rather are representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats-tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en [dot] wikipedia [dot] org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en [dot] wikipedia [dot] org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood by a human reader). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of logic, such as Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en [dot] wikipedia [dot] org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en [dot] wikipedia [dot] org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configurations, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en [dot] wikipedia [dot] org/wiki/Instructions_per_second (as of Jun. 5, 2012, 21:04 GMT). Thus, programs written in machine language—which may be tens of millions of machine language instructions long—are incomprehensible to most humans. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that useful, tangible, and concrete work is done. For example, as indicated above, such machine language—the compiled version of the higher-level language—functions as a technical specification which selects out hardware logic gates, specifies voltage levels, voltage transition timings, etc., such that the useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality of logic(s), or (d) virtually any combination of the foregoing. Indeed, any physical object which has a stable, measurable, and changeable state may be used to construct a machine based on the above technical description. Charles Babbage, for example, constructed the first mechanized computational apparatus out of wood, with the apparatus powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language should not be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include computer programs or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc. . . . ), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, Verizon, AT&T, etc.), or (g) a wired/wireless services entity (e.g., Sprint, AT&T, Verizon, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user/customer 1002, a merchant/vendor 1012, a financier 1034, a guarantor 1062, a market maker 1058, a data provider 1102, or a combined funding source and wireless service provider 1108 may be shown/described herein as a single illustrated figure of a person or building, those skilled in the art will appreciate that a user/customer 1002, a merchant/vendor 1012, a financier 1034, a guarantor 1062, a market maker 1058, a data provider 1102, or a combined funding source and wireless service provider 1108 may be representative of a human user, a robotic user (e.g., computational entity), a legal entity, and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    electronically interacting with one or more guaranty market maker servers associated with a plurality of guarantors and implemented using one or more processors by at least one of making or accepting one or more calls to a guaranty-related application programming interface (API) including at least:
        electronically obtaining at least one authorization request corresponding to at least one product transaction associated with at least one customer;
        electronically accessing at least one electronic message transmitted in at least one data stream via at least one mobile device associated with the at least one customer;
        electronically deriving from the at least one electronic message one or more indicia that corroborate that the at least one customer has intent to engage in at least one product transaction and one or more indicia that corroborate suitability for engaging in one or more proffered guaranty transactions;
        electronically determining whether to proffer at least one guaranty transaction to at least one of the plurality of guarantors including at least correlating, via at least one machine learning system, (1) at least one transaction characteristic associated with the at least one product transaction to the one or more indicia that corroborate that the at least one customer has intent to engage in the at least one product transaction, and (2) at least one transaction characteristic associated with the at least one product transaction to the one or more indicia that corroborate suitability for engaging in the one or more proffered guaranty transactions;
        electronically extracting from the at least one authorization request at least one potential guarantor from among the plurality of guarantors;
        electronically formulating at least one electronic message associated with at least one transaction marketplace response at least indicative of whether to proffer at least one guaranty transaction; and
        electronically providing the at least one proffered guaranty transaction at least to the electronically extracted at least one potential guarantor.

2. The method of claim 1 wherein the electronically obtaining at least one authorization request corresponding to at least one product transaction associated with at least one customer comprises:
    electronically receiving at least one authorization request.

3. The method of claim 2 wherein the electronically receiving at least one authorization request comprises:
    electronically receiving from at least one vendor.

4. The method of claim 2 wherein the electronically receiving at least one authorization request comprises:
    electronically receiving from at least one payment authorization apparatus.

5. The method of claim 2 wherein the electronically receiving at least one authorization request comprises:
    electronically receiving at least one authorization request via at least one network.

6. The method of claim 1 wherein the electronically obtaining at least one authorization request corresponding to at least one product transaction associated with at least one customer comprises:
    electronically receiving at least one authorization request from at least one related company.

7. The method of claim 1 wherein the electronically obtaining at least one authorization request corresponding to at least one product transaction associated with at least one customer comprises:
    electronically ascertaining at least one authorization request.

8. The method of claim 1 wherein the electronically obtaining at least one authorization request corresponding to at least one product transaction associated with at least one customer comprises:
    electronically decoding at least one authorization request.

9. The method of claim 1 wherein the electronically obtaining at least one authorization request corresponding to at least one product transaction associated with at least one customer comprises:
    electronically discovering at least one inquiry regarding approval for at least one customer.

10. The method of claim 1 wherein the electronically obtaining at least one authorization request corresponding to at least one product transaction associated with at least one customer comprises:
 electronically discovering one or more messages of at least one authorization request.

11. The method of claim 10 wherein the electronically discovering one or more messages of at least one authorization request comprises:
 electronically discovering at least one request for authorization to consummate at least one product transaction.

12. The method of claim 1 wherein the electronically obtaining at least one authorization request corresponding to at least one product transaction associated with at least one customer comprises:
 electronically discovering at least one authorization request corresponding to at least one agreement to exchange at least one product for consideration.

13. The method of claim 1 wherein the electronically obtaining at least one authorization request corresponding to at least one product transaction associated with at least one customer comprises:
 at least one of:
  electronically discovering at least one authorization request that includes at least a reference to at least one transaction characteristic corresponding to at least one product transaction;
  electronically discovering at least one guaranty indicator corresponding to at least one product transaction;
  electronically discovering at least one guaranty indicator that is indicative that submission to at least one guaranty transaction marketplace is acceptable;
  electronically discovering at least one guaranty indicator that is indicative of a potential guarantor for at least one product transaction;
  electronically discovering at least one party identifier corresponding to at least one product transaction; or
  electronically discovering at least one transaction location corresponding to at least one product transaction.

14. The method of claim 1 wherein the electronically providing the at least one proffered guaranty transaction at least to the electronically extracted at least one potential guarantor comprises:
 electronically transmitting to at least one guarantor.

15. The method of claim 1 wherein the electronically providing the at least one proffered guaranty transaction at least to the electronically extracted at least one potential guarantor comprises:
 electronically submitting to at least one guaranty transaction marketplace.

16. The method of claim 15 wherein the electronically submitting to at least one guaranty transaction marketplace comprises:
 electronically transmitting to at least one guaranty market maker.

17. The method of claim 15 wherein the electronically submitting to at least one guaranty transaction marketplace comprises:
 electronically calling at least one application programming interface (API).

18. The method of claim 1 wherein the electronically providing the at least one proffered guaranty transaction at least to the electronically extracted at least one potential guarantor comprises:
 electronically making at least one proffered guaranty transaction accessible via at least one server device of a financier.

19. The method of claim 1 wherein the electronically providing the at least one proffered guaranty transaction at least to the electronically extracted at least one potential guarantor comprises:
 electronically providing at least one proffered guaranty transaction to elicit at least one proffered guaranty.

20. The method of claim 1 wherein the electronically providing the at least one proffered guaranty transaction at least to the electronically extracted at least one potential guarantor comprises:
 electronically providing at least one proffered guaranty transaction at least partially in response to at least one proffered transaction characteristic.

21. The method of claim 1 wherein the electronically providing the at least one proffered guaranty transaction at least to the electronically extracted at least one potential guarantor comprises:
 electronically providing at least one proffered guaranty transaction based at least partly on at least one authorization request.

22. The method of claim 1 wherein the electronically providing the at least one proffered guaranty transaction at least to the electronically extracted at least one potential guarantor comprises:
 at least one of:
  electronically providing at least one proffered guaranty transaction that includes at least a reference to at least one transaction characteristic; or
  electronically providing at least a reference to at least one product identification.

23. The method of claim 22 wherein the electronically providing at least one proffered guaranty transaction that includes at least a reference to at least one transaction characteristic comprises:
 at least one of
  electronically providing at least a reference to at least one party identifier; or
  electronically providing at least a reference to at least one product identification.

24. The method of claim 22 wherein the electronically providing at least one proffered guaranty transaction that includes at least a reference to at least one transaction characteristic comprises:
 electronically providing at least a reference to at least one product location.

25. The method of claim 22 wherein the electronically providing at least one proffered guaranty transaction that includes at least a reference to at least one transaction characteristic comprises:
 electronically providing at least a reference to at least one transaction type.

26. The method of claim 1 wherein the electronically providing the at least one proffered guaranty transaction at least to the electronically extracted at least one potential guarantor comprises:
 electronically providing at least one indication of disagreement handling.

27. The method of claim 26 wherein the electronically providing at least one indication of disagreement handling comprises:
 electronically providing at least one indication of repudiation handling.

28. The method of claim 1 wherein the electronically providing the at least one proffered guaranty transaction at least to the electronically extracted at least one potential guarantor comprises:
electronically providing at least one indication of contingency.

29. The method of claim 28 wherein the electronically providing at least one indication of contingency comprises:
electronically providing at least one contingent indication with respect to at least one guaranty for at least one product transaction.

30. The method of claim 29 wherein the electronically providing at least one contingent indication with respect to at least one guaranty for at least one product transaction comprises:
electronically providing at least one indication that at least one obligation of at least one guaranty is contingent on at least one transaction characteristic corresponding to at least one product transaction.

31. The method of claim 1 wherein the electronically determining whether to proffer at least one guaranty transaction to at least one of the plurality of guarantors includes:
electronically engaging in at least one negotiation for at least one term of at least one guaranty.

32. The method of claim 31 wherein the electronically engaging in at least one negotiation for at least one term of at least one guaranty comprises:
electronically engaging in at least one negotiation for at least one fee.

33. The method of claim 31 wherein the electronically engaging in at least one negotiation for at least one term of at least one guaranty comprises:
electronically engaging in at least one negotiation for at least one time period.

34. The method of claim 1 wherein the electronically determining whether to proffer at least one guaranty transaction to at least one of the plurality of guarantors includes:
electronically determining to accept at least one guaranty offer.

35. The method of claim 34 wherein the electronically determining to accept at least one guaranty offer comprises:
electronically signaling acceptance of at least one guaranty offer to form at least one guaranty transaction.

36. The method of claim 1 wherein the electronically determining whether to proffer at least one guaranty transaction to at least one of the plurality of guarantors includes:
electronically determining whether to proffer at least one guaranty transaction to at least one of the plurality of guarantors by at least matching at least one transaction characteristic associated with the at least one product transaction to at least one of a search history or a social network posting associated with the at least one customer that at least one of corroborates that the at least one customer has intent to engage in the at least one product transaction or corroborates suitability for engaging in the at least one product transaction.

37. The method of claim 1 wherein the electronically determining whether to proffer at least one guaranty transaction to at least one of the plurality of guarantors includes:
electronically determining whether to proffer at least one guaranty transaction to at least one of the plurality of guarantors by at least matching at least one transaction characteristic associated with the at least one product transaction to at least one data stream of at least one mobile device associated with the at least one customer that at least one of corroborates that the at least one customer has intent to engage in the at least one product transaction or corroborates suitability for engaging in the at least one product transaction.

38. The method of claim 1 wherein the electronically determining whether to proffer at least one guaranty transaction to at least one of the plurality of guarantors includes:
electronically determining whether to proffer at least one guaranty transaction to at least one of the plurality of guarantors by at least matching at least one transaction characteristic associated with the at least one product transaction to at least one of a merchant, a type of payment tool, a kind of good, or category of service that at least one of corroborates that the at least one customer has intent to engage in the at least one product transaction or corroborates suitability for engaging in the at least one product transaction.

39. The method of claim 1 wherein the electronically determining, via automatic machine analysis performed by at least one of the one or more guaranty market maker servers, whether to proffer at least one guaranty transaction to at least one of the plurality of guarantors includes:
electronically determining whether to proffer at least one guaranty transaction to at least one of the plurality of guarantors by at least matching at least one transaction characteristic associated with the at least one product transaction to at least one estimated location derived from trilateration that at least one of corroborates that the at least one customer has intent to engage in the at least one product transaction or corroborates suitability for engaging in the at least one product transaction.

40. The method of claim 1 wherein the electronically determining whether to proffer at least one guaranty transaction to at least one of the plurality of guarantors includes:
electronically determining whether to proffer at least one guaranty transaction to at least one of the plurality of guarantors by at least matching at least one transaction characteristic associated with the at least one product transaction to at least one interrogation of at least one mobile device associated with the at least one customer that at least one of corroborates that the at least one customer has intent to engage in the at least one product transaction or corroborates suitability for engaging in the at least one product transaction.

41. The method of claim 1 wherein the electronically determining whether to proffer at least one guaranty transaction to at least one of the plurality of guarantors includes:
electronically determining whether to proffer at least one guaranty transaction to at least one of the plurality of guarantors by at least matching at least one transaction characteristic associated with the at least one product transaction to at least positioning system coordinates associated with at least one mobile device associated with the at least one customer and at least one search history associated with the at least one customer that at least one of corroborates that the at least one customer has intent to engage in the at least one product transaction or corroborates suitability for engaging in the at least one product transaction.

42. A system comprising:
one or more guaranty market maker servers associated with a plurality of guarantors including one or more electronic devices configured for at least one of making or accepting one or more calls to a guaranty-related application programming interface (API), the one or more electronic devices including at least:

circuitry configured for electronically obtaining at least one authorization request corresponding to at least one product transaction associated with at least one customer;

circuitry configured for electronically accessing at least one electronic message transmitted in at least one data stream via at least one mobile device associated with the at least one customer;

circuitry configured for electronically deriving from the at least one electronic message one or more indicia that corroborate that the at least one customer has intent to engage in at least one product transaction and one or more indicia that corroborate suitability for engaging in one or more proffered guaranty transactions;

circuitry configured for electronically determining whether to proffer at least one guaranty transaction to at least one of the plurality of guarantors including at least correlating, via at least one machine learning system, (1) at least one transaction characteristic associated with the at least one product transaction to the one or more indicia that corroborate that the at least one customer has intent to engage in the at least one product transaction, and (2) at least one transaction characteristic associated with the at least one product transaction to the one or more indicia that corroborate suitability for engaging in the one or more proffered guaranty transactions;

circuitry configured for electronically extracting from the at least one authorization request at least one potential guarantor from among the plurality of guarantors;

circuitry configured for electronically formulating at least one electronic message associated with at least one transaction marketplace response at least indicative of whether to proffer at least one guaranty transaction; and circuitry configured for electronically providing the at least one proffered guaranty transaction at least to the electronically extracted at least one potential guarantor.

43. An arrangement comprising:

means for electronically interacting with one or more guaranty market maker servers associated with a plurality of guarantors by at least one of making or accepting one or more calls to a guaranty-related application programming interface (API) including at least:

means for electronically obtaining at least one authorization request corresponding to at least one product transaction associated with at least one customer;

means for electronically accessing at least one electronic message transmitted in at least one data stream via at least one mobile device associated with the at least one customer;

means for electronically deriving from the at least one electronic message one or more indicia that corroborate that the at least one customer has intent to engage in at least one product transaction and one or more indicia that corroborate suitability for engaging in one or more proffered guaranty transactions;

means for electronically determining whether to proffer at least one guaranty transaction to at least one of the plurality of guarantors including at least correlating, via at least one machine learning system, (1) at least one transaction characteristic associated with the at least one product transaction to the one or more indicia that corroborate that the at least one customer has intent to engage in the at least one product transaction, and (2) at least one transaction characteristic associated with the at least one product transaction to the one or more indicia that corroborate suitability for engaging in the one or more proffered guaranty transaction;

means for electronically extracting from the at least one authorization request at least one potential guarantor from among the plurality of guarantors;

means for electronically formulating at least one electronic message associated with at least one transaction marketplace response at least indicative of whether to proffer at least one guaranty transaction; and means for electronically providing the at least one proffered guaranty transaction at least to the electronically extracted at least one potential guarantor.

* * * * *